US012520217B2

(12) United States Patent
Futaki et al.

(10) Patent No.: US 12,520,217 B2
(45) Date of Patent: Jan. 6, 2026

(54) FIRST RADIO STATION, SECOND RADIO STATION, CORE NETWORK NODE, MOBILE TERMINAL, SYSTEM, METHOD, AND NON-TRANSITORY COMPUTER READABLE RECORDING MEDIUM

(71) Applicant: NEC Corporation, Tokyo (JP)

(72) Inventors: Hisashi Futaki, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 743 days.

(21) Appl. No.: 17/628,332

(22) PCT Filed: Aug. 20, 2020

(86) PCT No.: PCT/JP2020/031490
§ 371 (c)(1),
(2) Date: Jan. 19, 2022

(87) PCT Pub. No.: WO2021/044863
PCT Pub. Date: Mar. 11, 2021

(65) Prior Publication Data
US 2022/0286936 A1 Sep. 8, 2022

(30) Foreign Application Priority Data

Sep. 6, 2019 (JP) ................................ 2019-163369

(51) Int. Cl.
*H04W 4/00* (2018.01)
*H04W 4/44* (2018.01)
*H04W 36/32* (2009.01)

(52) U.S. Cl.
CPC ............. *H04W 36/32* (2013.01); *H04W 4/44* (2018.02)

(58) Field of Classification Search
CPC ... H04W 4/44; H04W 36/32; H04W 36/0083; H04W 36/08
(Continued)

(56) References Cited

U.S. PATENT DOCUMENTS 9,734,723 B1 * 8/2017 Bruno ................ G01C 21/3826
10,304,343 B2 * 5/2019 Mustafic ............... H04W 48/08
(Continued)

FOREIGN PATENT DOCUMENTS

| CN | 108886668 A | 11/2018 |
| JP | 2017-528931 A | 9/2017 |

(Continued)

OTHER PUBLICATIONS

JP Office Action for JP Application No. 2021-543694, mailed on Jun. 4, 2024 with English Translation.

(Continued)

*Primary Examiner* — Amancio Gonzalez
(74) *Attorney, Agent, or Firm* — Sughrue Mion, PLLC

(57) ABSTRACT

In order to further facilitate continuous communication with a flying mobile terminal, a first radio station according to an example aspect of the present disclosure includes a control section configured to, in a handover of a mobile terminal configured to move according to flight path information, control the handover according to the flight path information from a second radio station to the first radio station; and a communication processing section configured to transmit a message including information related to acceptance of the handover to the second radio station without receiving a request message for the handover transmitted from the second radio station.

12 Claims, 51 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 10,417,840 | B2* | 9/2019 | O'Dell | G07C 5/085 |
| 10,586,464 | B2* | 3/2020 | Dupray | G08G 5/26 |
| 10,657,827 | B2* | 5/2020 | Eyhorn | G08G 5/22 |
| 10,703,478 | B2* | 7/2020 | Hunt | G08G 5/57 |
| 10,728,337 | B2* | 7/2020 | Stone | G08G 5/0021 |
| 10,749,952 | B2* | 8/2020 | Charalambides | G08G 5/57 |
| 10,810,893 | B2* | 10/2020 | Yoshizawa | B64D 47/00 |
| 11,184,810 | B2* | 11/2021 | Reddy | H04W 76/15 |
| 11,217,105 | B2* | 1/2022 | Mahkonen | G08G 5/54 |
| 11,245,533 | B2* | 2/2022 | Colacitti | H04L 9/3242 |
| 11,290,931 | B2* | 3/2022 | Wei | H04W 36/322 |
| 11,375,472 | B2* | 6/2022 | Rydén | H04W 76/19 |
| 11,375,527 | B1* | 6/2022 | Eyuboglu | H04B 7/15528 |
| 11,485,516 | B2* | 11/2022 | Yi | G05D 1/101 |
| 11,492,110 | B2* | 11/2022 | Yi | B64D 47/02 |
| 11,498,676 | B2* | 11/2022 | Bin | G05D 1/101 |
| 11,601,861 | B2* | 3/2023 | Hong | G05D 1/0016 |
| 11,638,257 | B2* | 4/2023 | Määttanen | G08G 5/34 |
| | | | | 455/431 |
| 11,645,920 | B2* | 5/2023 | Carraway | H04L 9/3247 |
| | | | | 701/120 |
| 11,710,415 | B2* | 7/2023 | Hall | G08G 5/26 |
| | | | | 701/528 |
| 11,770,750 | B2* | 9/2023 | Hong | H04W 8/24 |
| | | | | 370/329 |
| 11,832,104 | B2* | 11/2023 | Liao | H04L 63/20 |
| 11,838,151 | B1* | 12/2023 | Jones | H04L 25/0224 |
| 11,875,688 | B2* | 1/2024 | Poscher | H04W 4/40 |
| 11,950,162 | B2* | 4/2024 | Hong | G05D 1/0016 |
| 11,961,405 | B2* | 4/2024 | Li | G08G 5/0026 |
| 11,984,037 | B2* | 5/2024 | Hong | G08G 5/55 |
| 11,997,588 | B2* | 5/2024 | Liao | G08G 5/22 |
| 12,143,852 | B2* | 11/2024 | Di Girolamo | H04L 43/14 |
| 12,167,425 | B2* | 12/2024 | Han | H04W 72/046 |
| 2011/0176509 | A1 | 7/2011 | Hole et al. | |
| 2014/0018979 | A1 | 1/2014 | Goossen | G05D 1/0016 |
| | | | | 701/3 |
| 2017/0110016 | A1* | 4/2017 | Amarasekara | H04W 4/024 |
| 2017/0168480 | A1 | 6/2017 | Wänstedt | |
| 2017/0332421 | A1 | 11/2017 | Sternberg et al. | |
| 2017/0345317 | A1* | 11/2017 | Heinonen | G06Q 10/06313 |
| 2017/0372617 | A1* | 12/2017 | Bruno | G01C 21/3826 |
| 2018/0247544 | A1 | 8/2018 | Mustafic et al. | |
| 2019/0018407 | A1 | 1/2019 | Inui et al. | |
| 2019/0150225 | A1 | 5/2019 | Mohamed et al. | |
| 2019/0182730 | A1* | 6/2019 | Yeh | H04W 36/24 |
| 2019/0289505 | A1 | 9/2019 | Thomas et al. | |
| 2020/0142432 | A1* | 5/2020 | Kwak | B60L 8/006 |
| 2020/0145977 | A1 | 5/2020 | Kumar et al. | |
| 2020/0154426 | A1 | 5/2020 | Takács et al. | |
| 2020/0192348 | A1* | 6/2020 | Koziol | H04W 36/322 |
| 2020/0219402 | A1 | 7/2020 | Shao et al. | |
| 2020/0236602 | A1 | 7/2020 | Mahkonen et al. | |
| 2020/0258397 | A1 | 8/2020 | Hong | |
| 2020/0310408 | A1* | 10/2020 | Carper | G01C 21/165 |
| 2020/0346750 | A1* | 11/2020 | Hu | G05D 1/106 |
| 2020/0389825 | A1 | 12/2020 | Higuchi et al. | |
| 2020/0413369 | A1* | 12/2020 | Wei | H04W 72/30 |
| 2021/0021334 | A1* | 1/2021 | Tang | G05D 1/101 |
| 2021/0103294 | A1 | 4/2021 | Mahkonen et al. | |
| 2021/0166571 | A1* | 6/2021 | Zhu | G08G 5/55 |
| 2021/0195495 | A1 | 6/2021 | Hong | |
| 2021/0208602 | A1* | 7/2021 | Yi | G05D 1/042 |
| 2021/0256855 | A1 | 8/2021 | Hong | |
| 2021/0286355 | A1* | 9/2021 | Chan | G05B 19/042 |
| 2021/0297921 | A1 | 9/2021 | Pragada et al. | |
| 2021/0331798 | A1* | 10/2021 | Yi | G05D 1/0676 |
| 2021/0331813 | A1* | 10/2021 | Yi | B64D 45/08 |
| 2021/0405655 | A1* | 12/2021 | Yi | G05D 1/0011 |
| 2022/0240129 | A1 | 7/2022 | Thomas et al. | |
| 2022/0279355 | A1* | 9/2022 | Roy | H04W 12/50 |
| 2022/0369363 | A1* | 11/2022 | Ferdi | H04W 4/44 |
| 2024/0089804 | A1 | 3/2024 | Thomas et al. | |
| 2025/0047750 | A1* | 2/2025 | Salkintzis | H04L 67/52 |

FOREIGN PATENT DOCUMENTS

| | | |
|---|---|---|
| JP | 2017-183875 A | 10/2017 |
| JP | 2019-021975 A | 2/2019 |
| JP | 2019-059258 A | 4/2019 |
| JP | 2019-515581 A | 6/2019 |
| JP | 2019-110381 A | 7/2019 |
| JP | 2019-519983 A | 7/2019 |
| JP | 2020-506566 A | 2/2020 |
| WO | 2018/144761 A1 | 8/2018 |
| WO | 2018/171941 A1 | 9/2018 |
| WO | 2018/189576 A1 | 10/2018 |
| WO | 2019/050500 A1 | 3/2019 |
| WO | 2019/084871 A1 | 5/2019 |
| WO | 2019/090724 A1 | 5/2019 |

OTHER PUBLICATIONS

Extended European Search Report for EP Application No. 20860153.4, dated on Oct. 5, 2022.

Fraunhofer Hhi et al.: "Handover enhancements for UAVs", 3GPP Draft; R2-1712469, 3rd Generation Partnership Project (3GPP), Mobile Competence Centre; 650, Route Des Lucioles; F-06921 Sophia-Antipolis Cedex; France, No. Reno, USA; Nov. 27, 2017-Dec. 1, 2017, Nov. 16, 2017, pp. 1-5.

JP Office Action for Japanese Patent Application No. 2021-543695, mailed on Jun. 11, 2024 with English Translation.

US Office Action for U.S. Appl. No. 17/630,186, mailed on Apr. 24, 2024.

International Search Report for PCT Application No. PCT/JP2020/031490, mailed on Oct. 20, 2020.

English translation of Written opinion for PCT Application No. PCT/JP2020/031490, mailed on Oct. 20, 2020.

International Search Report for PCT Application No. PCT/JP2020/031492, mailed on Oct. 20, 2020. (including a subject matter related to the present invention).

English translation of Written opinion for PCT Application No. PCT/JP2020/031492, mailed on Oct. 20, 2020. (including a subject matter related to the present invention).

Extended European Search Report for EP Application No. 20861022.0, dated on Oct. 4, 2022.

Irem BOR-YALINIZ et al., "Is 5G Ready for Drones: A Look into Contemporary and Prospective Wireless Networks from a Standardization Perspective", IEEE Wireless Communications, vol. 26, No. 1, Feb. 1, 2019, pp. 18-27.

US Office Action for U.S. Appl. No. 17/630,186, mailed on Aug. 28, 2024.

* cited by examiner

FIRST RADIO STATION, SECOND RADIO STATION, CORE NETWORK NODE, MOBILE TERMINAL, SYSTEM, METHOD, AND NON-TRANSITORY COMPUTER READABLE RECORDING MEDIUM

This application is a National Stage Entry of PCT/JP2020/031490 filed on Aug. 20, 2020, which claims priority from Japanese Patent Application 2019-163369 filed on Sep. 6, 2019, the contents of all of which are incorporated herein by reference, in their entirety.

BACKGROUND

Technical Field

The present disclosure relates to a first radio station, a second radio station, a core network node, a mobile terminal, a system, a method, and a non-transitory computer readable recording medium.

Background Art

At present, delivery of goods, monitoring, spraying pesticides, and the like using a drone have been under study. In order to remotely control a drone, use of a mobile communication network has also been under study.

For example, PTL 1 discloses a technique of estimating a load of a cell of a base station by an unmanned aerial vehicle (UAV), predicting whether or not requirements of services can be achieved based on the estimated load, and thereby adjusting movement based on the prediction. For example, PTL 2 discloses a technique of estimating, by a management apparatus that controls flight of a flight apparatus, a radio resource that can be allocated to the flight apparatus with reference to histories of communication status of a plurality of base stations, and thereby configuring a flight route of the flight apparatus in such a manner that the radio resource is larger than a necessary radio resource.

CITATION LIST

Patent Literature

PTL 1: JP 2017-528931 A
PTL 2: JP 2019-059258 A

SUMMARY

Technical Problem

However, in the technique disclosed in PTL 1 described above and the technique disclosed in PTL 2 described above, a flight path is adjusted based on estimation, and thus if there is a gap between the estimation and an actual situation, it may be difficult to continue communication. As a result, for example, control of a flying drone may be hindered, and safety may not be allocated.

The example object of the present disclosure is to provide a first radio station, a second radio station, a core network node, a mobile terminal, a system, a method, and a non-transitory computer readable recording medium that further facilitate continuous communication with a flying mobile terminal.

Solution to Problem

According to an example aspect of the present disclosure, a first radio station includes: a control section configured to, in a handover of a mobile terminal configured to move according to flight path information, control the handover according to the flight path information from a second radio station to the first radio station; and a communication processing section configured to trigger processing of transmitting a message including information related to acceptance of the handover to the second radio station without receiving a request message for the handover transmitted from the second radio station.

According to an example aspect of the present disclosure, a second radio station includes: a control section configured to, in a handover of a mobile terminal configured to move according to flight path information, control the handover according to the flight path information from the second radio station to a first radio station; and a first communication processing section configured to receive a message including information related to acceptance of the handover without transmitting a request message for the handover.

According to an example aspect of the present disclosure, a core network node includes: a control section configured to, in a handover of a mobile terminal configured to move according to flight path information, generate a request message for the handover according to the flight path information from a second radio station to a first radio station; and a communication processing section configured to transmit the request message to the first radio station without receiving the request message from the second radio station, wherein the request message triggers transmission of a message including information related to acceptance of the handover by the first radio station to the second radio station without receiving a request message for the handover transmitted from the second radio station.

According to an example aspect of the present disclosure, a mobile terminal includes: a flight control section configured to control movement of the mobile terminal according to flight path information; and a communication processing section configured to, in a handover of the mobile terminal from a second cell of a second radio station to a first cell of a first radio station, communicate with the second radio station configured to receive a message including information related to acceptance of the handover without transmitting a request message for the handover, for the handover according to the flight path information.

According to an example aspect of the present disclosure, a system includes: a first radio station; and a second radio station, wherein the first radio station and the second radio station are configured to control, in a handover of a mobile terminal configured to move according to flight path information, the handover according to the flight path information from the second radio station to the first radio station, the first radio station is configured to transmit a message including information related to acceptance of the handover to the second radio station without receiving a request message for the handover transmitted from the second radio station, and the second radio station is configured to receive the message without transmitting the request message.

According to an example aspect of the present disclosure, a method includes: controlling, in a handover of a mobile terminal configured to move according to flight path information, the handover according to the flight path information from a second radio station to a first radio station; and transmitting a message including information related to acceptance of the handover to the second radio station without receiving a request message for the handover transmitted from the second radio station.

According to an example aspect of the present disclosure, a method includes: controlling, in a handover of a mobile terminal configured to move according to flight path information, the handover according to the flight path information from a second radio station to a first radio station; and receiving a message including information related to acceptance of the handover without transmitting a request message for the handover.

According to an example aspect of the present disclosure, a method includes: in a handover of a mobile terminal configured to move according to flight path information, generating a request message for the handover according to the flight path information from a second radio station to a first radio station; and transmitting the request message to the first radio station without receiving the request message from the second radio station, wherein the request message triggers transmission of a message including information related to acceptance of the handover by the first radio station to the second radio station without receiving a request message for the handover transmitted from the second radio station.

According to an example aspect of the present disclosure, a method includes: controlling movement of a mobile terminal according to flight path information; and in a handover of the mobile terminal from a second cell of a second radio station to a first cell of a first radio station, communicating with the second radio station configured to receive a message including information related to acceptance of the handover without transmitting a request message for the handover, for the handover according to the flight path information.

According to an example aspect of the present disclosure, a method includes: controlling, by the first radio station and the second radio station, in a handover of a mobile terminal configured to move according to flight path information, the handover according to the flight path information from the second radio station to the first radio station; transmitting, by the first radio station, a message including information related to acceptance of the handover to the second radio station without receiving a request message for the handover transmitted from the second radio station; and receiving, by the second radio station, the message without transmitting the request message.

According to an example aspect of the present disclosure, a program causes a processor to execute: controlling, in a handover of a mobile terminal configured to move according to flight path information, the handover according to the flight path information from a second radio station to a first radio station; and transmitting a message including information related to acceptance of the handover to the second radio station without receiving a request message for the handover transmitted from the second radio station.

According to an example aspect of the present disclosure, a program causes a processor to execute: controlling, in a handover of a mobile terminal configured to move according to flight path information, the handover according to the flight path information from a second radio station to a first radio station; and receiving a message including information related to acceptance of the handover without transmitting a request message for the handover.

According to an example aspect of the present disclosure, a program causes a processor to execute: in a handover of a mobile terminal configured to move according to flight path information, generating a request message for the handover according to the flight path information from a second radio station to a first radio station; and transmitting the request message to the first radio station without receiving the request message from the second radio station, wherein the request message triggers transmission of a message including information related to acceptance of the handover by the first radio station to the second radio station without receiving a request message for the handover transmitted from the second radio station.

According to an example aspect of the present disclosure, a program causes a processor to execute: controlling movement of a mobile terminal according to flight path information; and in a handover of the mobile terminal from a second cell of a second radio station to a first cell of a first radio station, communicating with the second radio station configured to receive a message including information related to acceptance of the handover without transmitting a request message for the handover for the handover according to the flight path information.

According to an example aspect of the present disclosure, a non-transitory computer readable recording medium having recorded thereon a program that causes a processor to execute: controlling, in a handover of a mobile terminal configured to move according to flight path information, the handover according to the flight path information from a second radio station to a first radio station; and transmitting a message including information related to acceptance of the handover to the second radio station without receiving a request message for the handover transmitted from the second radio station.

According to an example aspect of the present disclosure, a non-transitory computer readable recording medium having recorded thereon a program that causes a processor to execute: controlling, in a handover of a mobile terminal configured to move according to flight path information, the handover according to the flight path information from a second radio station to a first radio station; and receiving a message including information related to acceptance of the handover without transmitting a request message for the handover.

According to an example aspect of the present disclosure, a non-transitory computer readable recording medium having recorded thereon a program that causes a processor to execute: in a handover of a mobile terminal configured to move according to flight path information, generating a request message for the handover according to the flight path information from a second radio station to a first radio station; and transmitting the request message to the first radio station without receiving the request message from the second radio station, wherein the request message triggers transmission of a message including information related to acceptance of the handover by the first radio station to the second radio station without receiving a request message for the handover transmitted from the second radio station.

According to an example aspect of the present disclosure, a non-transitory computer readable recording medium having recorded thereon a program that causes a processor to execute: controlling movement of a mobile terminal according to flight path information; and in a handover of the mobile terminal from a second cell of a second radio station to a first cell of a first radio station, communicating with the second radio station configured to receive a message including information related to acceptance of the handover without transmitting a request message for the handover for the handover according to the flight path information.

Advantageous Effects of Invention

According to each example aspect of the present disclosure, continuous communication with a flying mobile terminal is further facilitated. Note that, according to each example aspect of the present disclosure, instead of or together with the above effects, other effects may be exerted.

DESCRIPTION OF THE EXAMPLE EMBODIMENTS

Hereinafter, example aspects of the present disclosure will be described in detail with reference to the accompanying drawings. Note that, in the Specification and drawings, elements to which similar descriptions are applicable are denoted by the same reference signs, and overlapping descriptions may hence be omitted.

Figure 1:
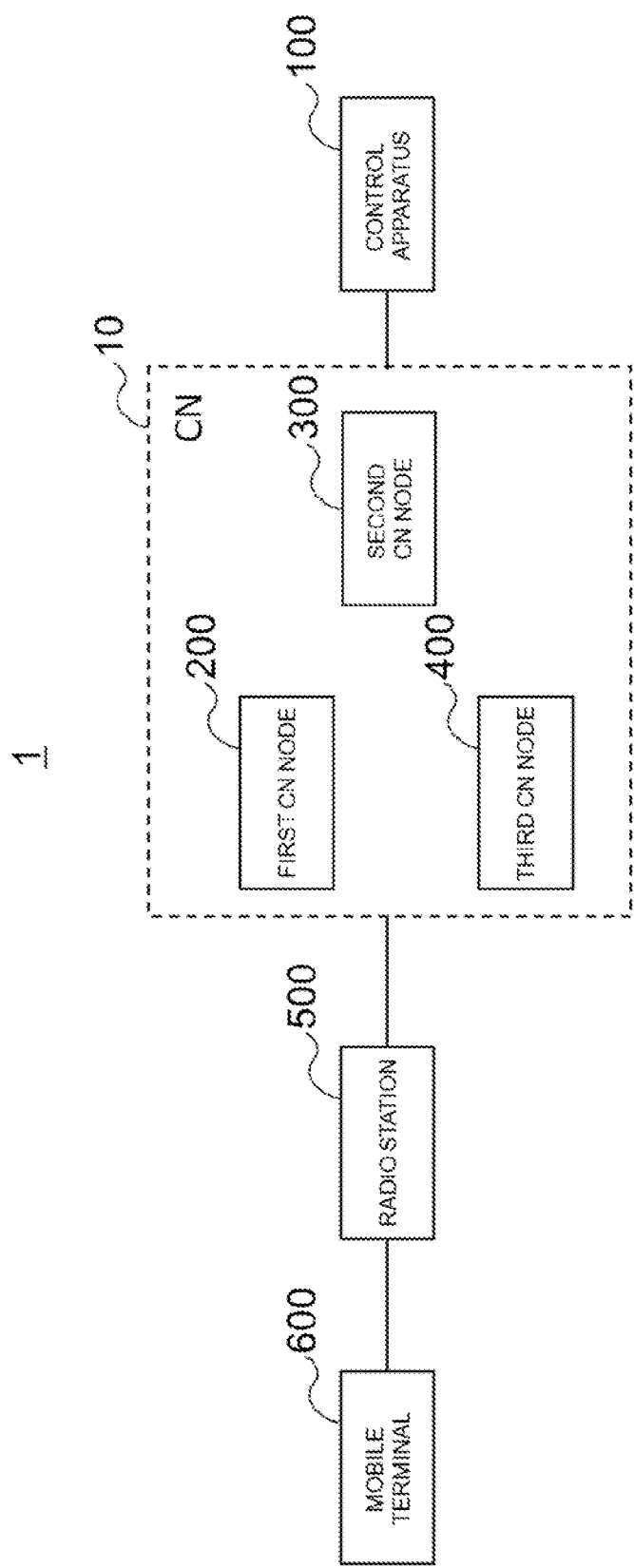
FIG. 1 is an explanatory diagram illustrating an example of a schematic configuration of a system 1 according to an example aspect of the present disclosure.

Descriptions will be given in the following order.
1. Configuration of System
   2. Configuration of Each Node
   2.1. Configuration of Control Apparatus
   2.2. Configuration of First Core Network Node
   2.3. Configuration of Second Core Network Node
   2.4. Configuration of Third Core Network Node
   2.5. Configuration of Radio Station
   2.6. Configuration of Mobile Terminal
3. Overview of Example Aspects
   4. First Example Aspect
5. Second Example Aspect
   6. Third Example Aspect
7. Fourth Example Aspect
   8. Fifth Example Aspect
   8.1. Configuration of Core Network Node
   8.2. Configuration of Radio Station
   8.3. Configuration of Mobile Terminal
   8.4. Operation Example
9. Sixth Example Aspect
   9.1. Configuration of Control Apparatus
   9.2. Configuration of First Core Network Node
   9.3. Configuration of Second Core Network Node
   9.4. Configuration of Radio Station
   9.5. Configuration of Mobile Terminal
   9.6. Operation Example
10. Seventh Example Aspect
    10.1. Configuration of Control Apparatus
    10.2. Configuration of First Core Network Node
    10.3. Configuration of Second Core Network Node
    10.4. Configuration of Radio Station
    10.5. Configuration of Mobile Terminal
    10.6. Operation Example
11. Eighth Example Aspect
    11.1. Configuration of Control Apparatus
    11.2. Configuration of First Core Network Node
    11.3. Configuration of Second Core Network Node
    11.4. Configuration of Mobile Terminal
    11.5. Operation Example
12. Ninth Example Aspect
    12.1. Configuration of Core Network Node
    12.2. Configuration of Radio Station
    12.3. Configuration of Mobile Terminal
    12.4. Operation Example 1. Configuration of System With reference to FIG. 1 to FIG. 3, an example of a configuration of a system 1 according to an example aspect of the present disclosure will be described. FIG. 1 is an explanatory diagram illustrating an example of a schematic configuration of the system 1 according to an example aspect of the present disclosure. With reference to FIG. 1, the system 1 includes a core network (CN) 10, a control apparatus 100, a radio station 500, and a mobile terminal 600. As a matter of course, the system 1 may include a plurality of radio stations 500, and may include a plurality of mobile terminals 600.

For example, the system 1 is a mobile communication system, and conforms to technical specifications (TS) of the Third Generation Partnership Project (3GPP). More specifically, for example, the system 1 may conform to technical specifications (TS) of the fifth generation (5G)/New Radio (NR). As a matter of course, the system 1 is not limited to these examples.

(1) Core Network (CN) 10

The CN 10 includes a plurality of core network (CN) nodes. Each of the plurality of CN nodes may be referred to as a network function (NF). For example, as illustrated in FIG. 1, the CN 10 includes a first CN node 200, a second CN node 300, and a third CN node 400.

For example, the first CN node 200 manages at least one of access and mobility of the mobile terminal 600. The second CN node 300 is used by an apparatus (for example, an application function (AF)) located outside the CN 10 to interact with the CN 10. The third CN node 400 manages session for the mobile terminal 600.

Figure 2:
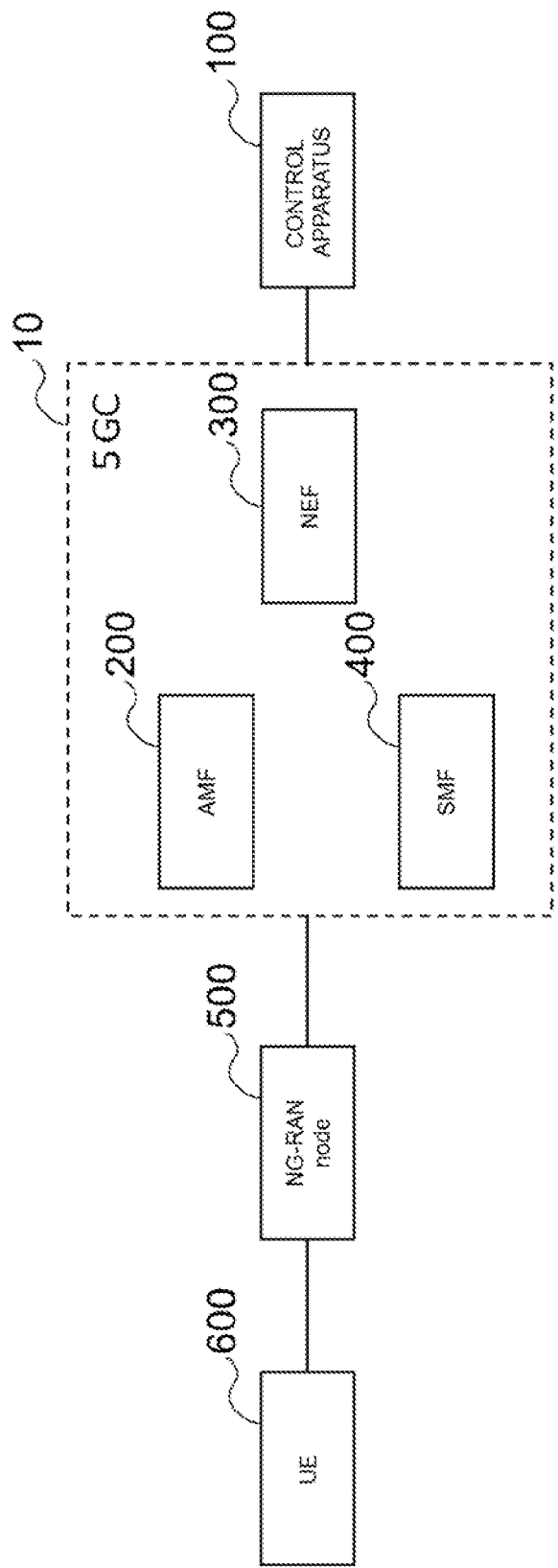
FIG. 2 is an explanatory diagram illustrating a more specific example of a schematic configuration of the system 1 according to an example aspect of the present disclosure.

With reference to FIG. 2 illustrating a more specific example, for example, the CN 10 is a 5G core network (5GC), the first CN node 200 is an access and mobility management function (AMF), the second CN node 300 is a network exposure function (NEF), and the third CN node 400 is a session management function (SMF).

As a matter of course, the first CN node 200, the second CN node 300, and the third CN node 400 are not limited to the examples described above. As a matter of course, the CN 10 may further include one or more CN nodes other than the first CN node 200, the second CN node 300, and the third CN node 400. The CN 10 may include a plurality of first CN nodes 200, may include a plurality of second CN nodes 300, and may include a plurality of third CN nodes 400. Along with movement of the mobile terminal 600, the first CN node 200 managing the mobile terminal 600 may be updated to another first CN node 200. Similarly, along with movement of the mobile terminal 600, the third CN node 400 managing a session of the mobile terminal 600 may be updated to another third CN node 400.

(2) Radio Station 500

The radio station 500 is a node of a radio access network (RAN), and communicates with a mobile terminal (for example, the mobile terminal 600) located in a cell or a coverage area of the radio station 500. For example, the radio station 500 communicates with the mobile terminal by using a radio resource allocated to the mobile terminal.

With reference to FIG. 2 illustrating a more specific example, for example, the radio station 500 is an NG-radio access network (RAN) node. As defined in TS (e.g., TS 38.300, TS 38.401) of 5G, the NG-RAN node may be a gNB or an ng-eNB, or may be a node having a term other than those defined in TS. The gNB is a node that provides a terminal of at least one of the NR user plane and control plane protocol for a user equipment (UE), and is connected to the 5GC via the NG interface. The ng-eNB is a node that provides a terminal of at least one of evolved universal terrestrial radio access (E-UTRA) user plane and control plane protocol for the UE, and is connected to the 5GC via the NG interface. Two NG-RAN nodes may be directly connected to each other via the Xn interface.

The radio station 500 may include a plurality of units (or a plurality of nodes). The plurality of units (or the plurality of nodes) may include a first unit (or a first node) that performs processing of a higher protocol layer, and a second unit (or a second node) that performs processing of a lower protocol layer. As an example, the first unit may be referred to as a central unit (CU), the second unit may be referred to as a distributed unit (DU). For example, the first unit (central unit) may perform processing of a radio resource control (RRC) layer, a service data adaptation protocol (SDAP) layer, and a packet data convergence protocol (PDCP) layer. The second unit (distributed unit) may perform processing of a radio link control (RLC) layer, a medium access control (MAC) layer, and a Physical (PHY) layer.

Alternatively, the radio station 500 may be a single unit (or a single node). In this case, the radio station 500 may be one of the plurality of units (for example, one of the first unit and the second unit), and may be connected to another unit (for example, the other of the first unit and the second unit) of the plurality of units.

(3) Mobile Terminal 600 and Control Apparatus 100

The mobile terminal 600 communicates with a radio station. For example, the mobile terminal 600 communicates with the radio station 500 when the mobile terminal 600 is located in a cell or a coverage area of the radio station 500. For example, the mobile terminal 600 communicates with the radio station 500 by using a radio resource allocated to the mobile terminal 600.

In particular, the mobile terminal 600 is capable of flying, and the control apparatus 100 plans a flight of the mobile terminal 600. For example, the control apparatus 100 determines a flight path of the mobile terminal 600, and the mobile terminal 600 moves along the flight path. The control apparatus 100 may communicate with a flying mobile terminal 600 and control the flight of the mobile terminal 600. Communication between the control apparatus 100 and the mobile terminal 600 may be performed as communication of user data, that is, user plane (UP) data, or may be performed as control signaling, that is, control plane (CP) signaling. These types of communication may be performed via a predetermined node of a core network (CN) and a radio access network (RAN) (that is, being terminated as appropriate).

In particular, the mobile terminal 600 is also referred to as a passenger air vehicle (PAV) or a manned aircraft, and may be a manned flight vehicle that can fly using a radio communication network (for example, a radio communication network using specifications of 3GPP).

For example, the control apparatus 100 generates, or acquires from another apparatus, flight path information for the mobile terminal 600. Information including all or a part included in the flight path information may be referred to as a flight plan, a flight profile, or the like. Alternatively, the flight path information itself may be referred to as a flight plan, a flight profile, or the like. The flight path information includes path information (for example, information indicating position(s) of one or more waypoints) indicating a flight path of the mobile terminal 600. The positions of each of the one or more waypoints may be represented as latitude, longitude, and altitude. The flight path information may include velocity information indicating velocity of the mobile terminal 600. The velocity information may indicate horizontal velocity of the mobile terminal 600 and vertical velocity of the mobile terminal 600. The flight path information may further include other information, such as time information indicating time for flight of the mobile terminal 600. The time information may indicate time at which the mobile terminal 600 passes through each of the one or more waypoints. In addition or alternatively, the time information may indicate flight time period of the mobile terminal 600 in one or more zones, and each of the one or more zones may be a zone between any two waypoints. The mobile terminal 600 moves according to the flight path information. The flight path information may include information indicating a list of cells used in the flight of the mobile terminal 600.

Figure 3:
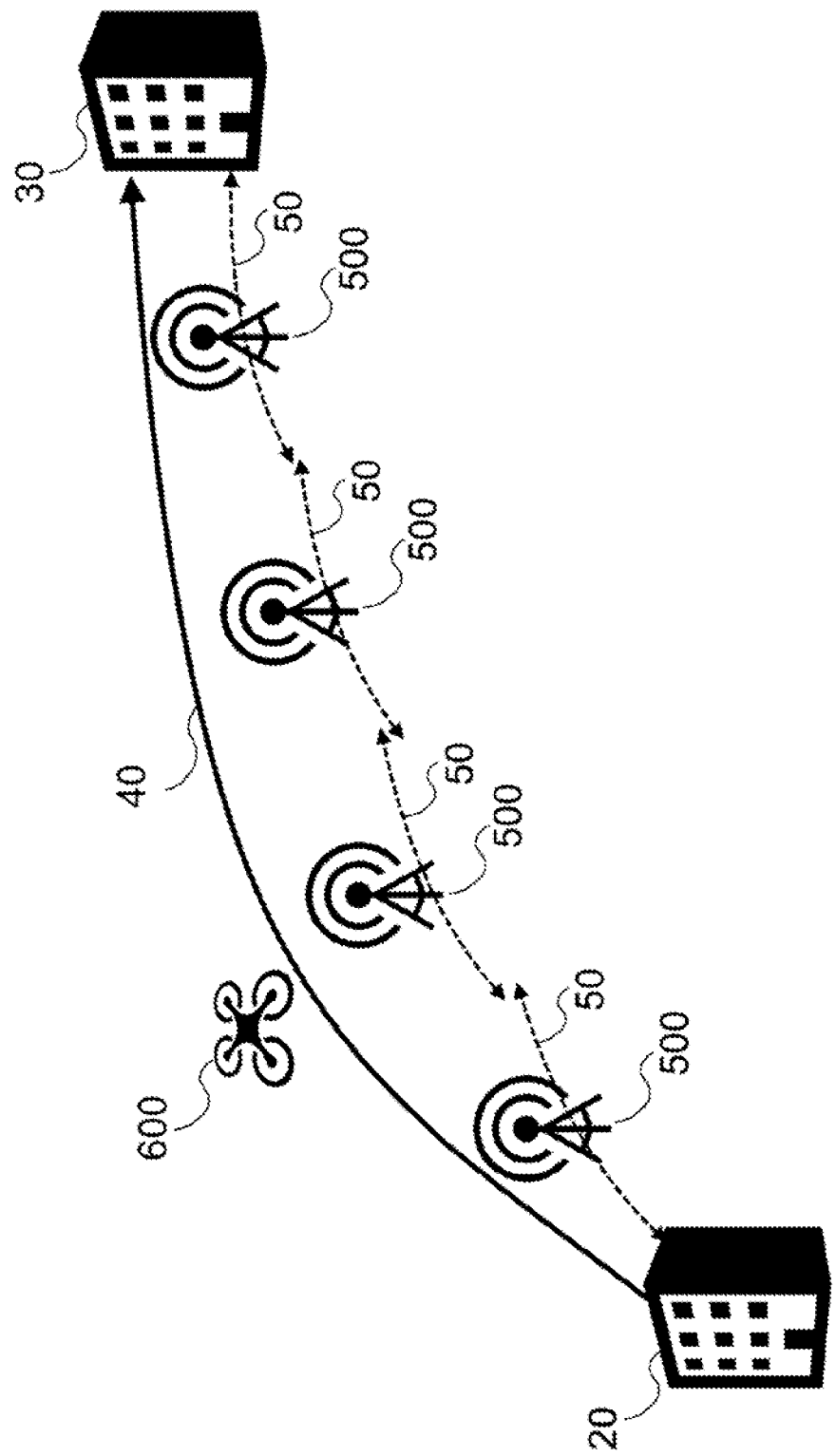
FIG. 3 is an explanatory diagram for illustrating an example of movement of a mobile terminal according to flight path information.

FIG. 3 is an explanatory diagram for illustrating an example of movement of the mobile terminal 600 according to the flight path information. With reference to FIG. 3, the mobile terminal 600 moves (that is, flies) from a departure point 20 to a destination point 30 along a flight path 40. The flight path 40 overlaps each of cells 50 of the plurality of radio stations 500, and when the mobile terminal 600 moves along the flight path 40, the mobile terminal 600 can communicate (for example, with the control apparatus 100) via these radio stations 500. In other words, when the mobile terminal 600 moves along the flight path 40, the mobile terminal 600 can communicate (for example, with the control apparatus 100) by using the plurality of cells 50.

Note that, in the example of FIG. 3, when the mobile terminal 600 moves along the flight path 40, the mobile terminal 600 uses one cell for each radio station 500. However, the example aspect of the present disclosure is not limited to the example described above. The flight path 40 may overlap two or more cells of a certain radio station 500, and when the mobile terminal 600 moves along the flight path 40, the mobile terminal 600 may communicate by using the two or more cells. The two or more cells may be cells of different areas (for example, cells of different sectors), or may be cells of different frequency bands.

With reference to FIG. 2 illustrating a specific example, for example, the mobile terminal 600 is a user equipment (UE). In particular, the mobile terminal 600 may be referred to as an aerial UE. For example, the mobile terminal 600 may be a flight apparatus (for example, a drone or a UAV), or may be a communication apparatus attached to the flight apparatus.

The control apparatus 100 is located outside the CN 10. For example, the control apparatus 100 is an application function (AF).

In the above, an example of a configuration of the system 1 according to an example aspect of the present disclosure is described. The system 1 described above is a system according to the first to fourth example aspects to be described later in particular, but may be a system according to another example aspect (fifth to ninth example aspects).

2. Configuration of Each Node

With reference to FIG. 4 to FIG. 9, a configuration of each node according to an example aspect of the present disclosure will be described. The configuration of each node described below is a configuration of each node according to the first to fourth example aspects, in particular.

2.1. Configuration of Control Apparatus

Figure 4:
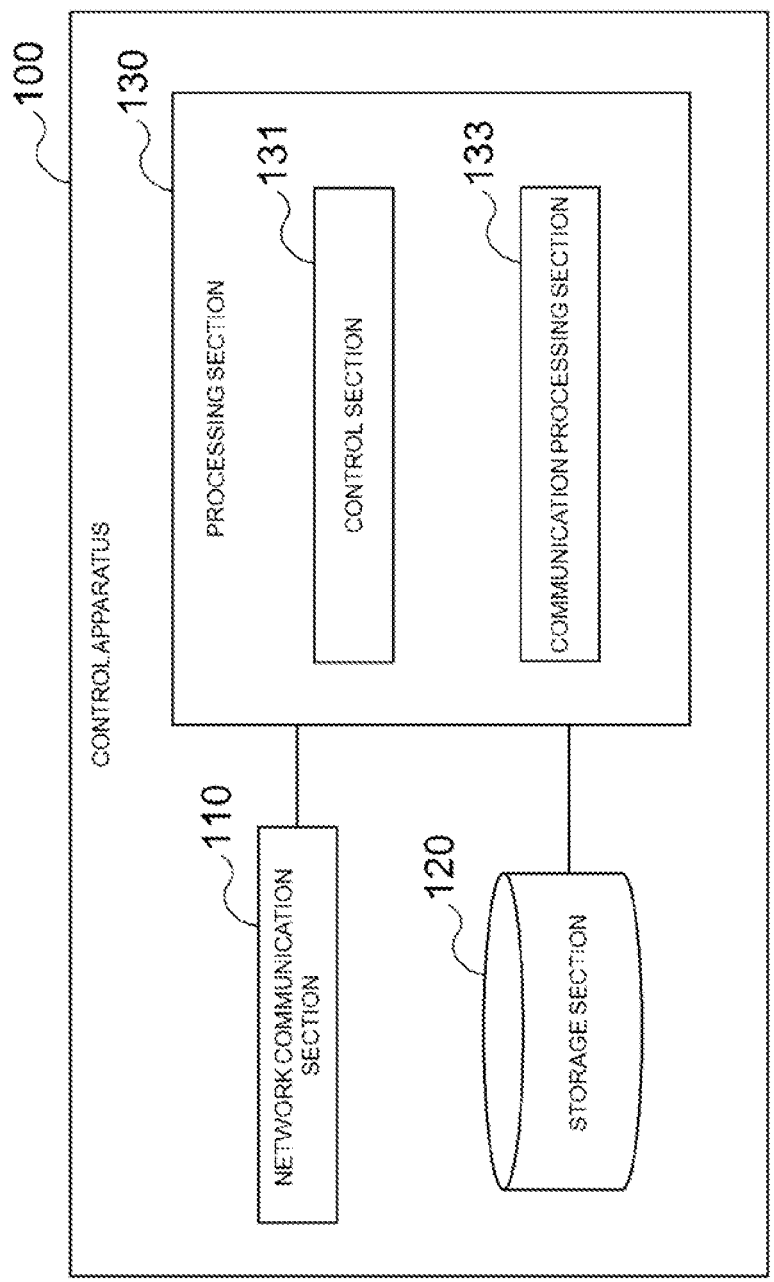
FIG. 4 is a block diagram illustrating an example of a schematic configuration of a control apparatus according to an example aspect of the present disclosure.

FIG. 4 is a block diagram illustrating an example of a schematic configuration of the control apparatus 100 according to an example aspect of the present disclosure. With reference to FIG. 4, the control apparatus 100 includes a network communication section 110, a storage section 120, and a processing section 130.

(1) Network Communication Section 110

The network communication section 110 receives a signal from a network, and transmits a signal to the network.

(2) Storage Section 120

The storage section 120 stores programs and parameters for operation of the control apparatus 100 and various pieces of data in a temporary or permanent (non-transitory) manner. The program includes one or more instructions for operation of the control apparatus 100.

(3) Processing Section 130

The processing section 130 provides various functions of the control apparatus 100. The processing section 130 includes a control section 131 and a communication processing section 133. Note that the processing section 130 may further include a constituent element other than these constituent elements. In other words, the processing section 130 may perform operation other than operations of these constituent elements. Specific operations of the control section 131 and the communication processing section 133 will be described in each example aspect.

For example, the processing section 130 (communication processing section 133) communicates with another network node (for example, a core network node) via the network communication section 110.

(4) Implementation Example

The network communication section 110 may be implemented with a network adapter, a network interface card, a transmitter, a receiver, a transceiver, and/or the like. The storage section 120 may be implemented with a memory (for example, a non-volatile memory and/or a volatile memory), a hard disk, and/or the like. The processing section 130 may be implemented with one or more processors. The control section 131 and the communication processing section 133 may be implemented with the same processor, or may be implemented with separate processors. The memory (storage section 120) may be included in the one or more processors, or may be located outside of the one or more processors. The processing section 130 and the storage section 120 may be implemented with a controller, and the controller may include one or more processors and a memory.

The control apparatus 100 may include a memory storing programs (one or more instructions), and one or more processors that can execute the programs (the one or more instructions). The one or more processors may execute the program, and thereby perform operation of the processing section 130 (operation of the control section 131 and/or the communication processing section 133). The program may be a program for causing the processor(s) to execute the operation of the processing section 130 (operation of the control section 131 and/or the communication processing section 133).

The control apparatus 100 may include a transceiver and a controller. The controller may perform the operation of the processing section 130 (operation of the control section 131 and/or the communication processing section 133), and may transmit and receive information or a message via the transceiver.

Note that the control apparatus 100 may be virtualized. In other words, the control apparatus 100 may be implemented as a virtual machine. In this case, the control apparatus 100 (the virtual machine) may operate as a physical machine (hardware) including a processor, a memory, and the like, and as a virtual machine on a hypervisor.

2.2. Configuration of First Core Network Node

Figure 5:
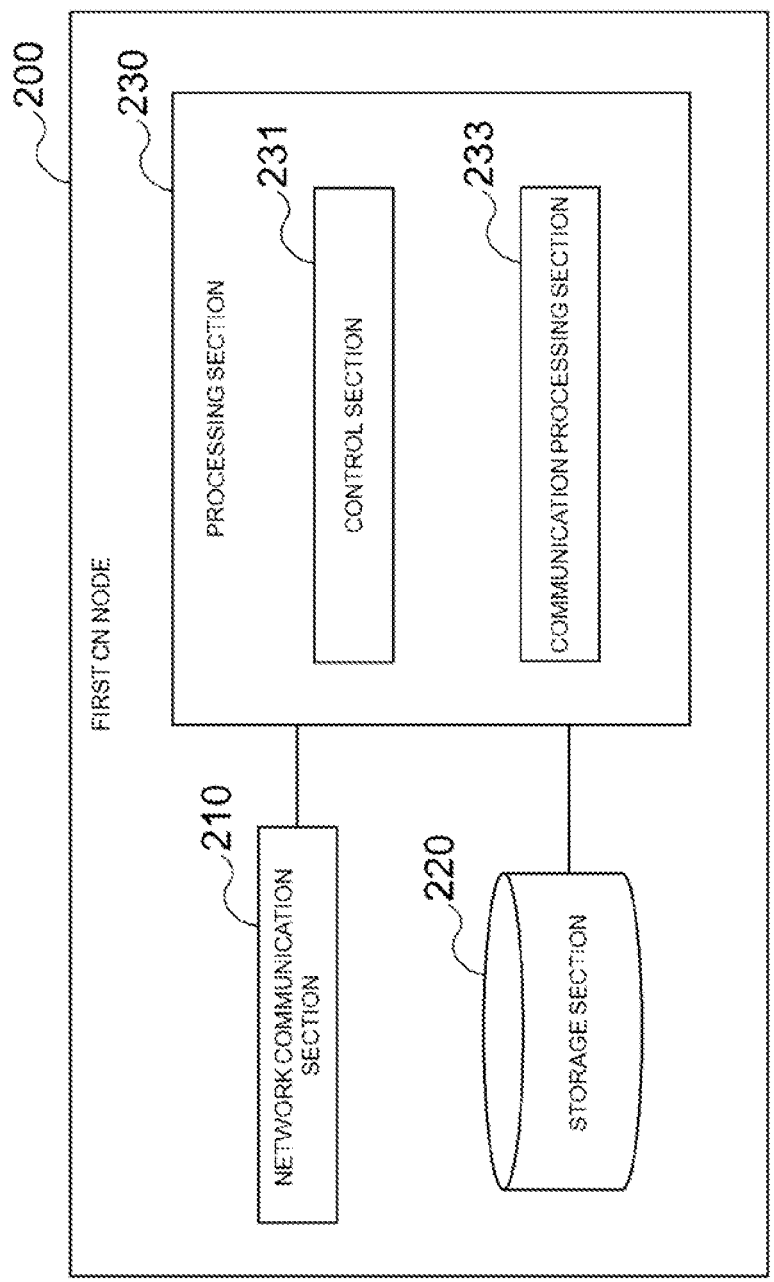
FIG. 5 is a block diagram illustrating an example of a schematic configuration of a first core network node according to an example aspect of the present disclosure.

FIG. 5 is a block diagram illustrating an example of a schematic configuration of the first CN node 200 according to an example aspect of the present disclosure. With reference to FIG. 5, the first CN node 200 includes a network communication section 210, a storage section 220, and a processing section 230.

(1) Network Communication Section 210

The network communication section 210 receives a signal from a network, and transmits a signal to the network.

(2) Storage Section 220

The storage section 220 stores programs and parameters for operation of the first CN node 200 and various pieces of data in a temporary or permanent (non-transitory) manner. The program includes one or more instructions for operation of the first CN node 200.

(3) Processing Section 230

The processing section 230 provides various functions of the first CN node 200. The processing section 230 includes a control section 231 and a communication processing section 233. Note that the processing section 230 may further include a constituent element other than these constituent elements. In other words, the processing section 230 may perform operation other than operations of these constituent elements. Specific operations of the control section 231 and the communication processing section 233 will be described in each example aspect.

For example, the processing section 230 (communication processing section 233) communicates with another network node (for example, the radio station 500 or a core network node) via the network communication section 210.

(4) Implementation Example

The network communication section 210 may be implemented with a network adapter, a network interface card, a transmitter, a receiver, a transceiver, and/or the like. The storage section 220 may be implemented with a memory (for example, a non-volatile memory and/or a volatile memory), a hard disk, and/or the like. The processing section 230 may be implemented with one or more processors. The control section 231 and the communication processing section 233 may be implemented with the same processor, or may be implemented with separate processors. The memory (storage section 220) may be included in the one or more processors, or may be located outside of the one or more processors. The processing section 230 and the storage section 220 may be implemented with a controller, and the controller may include one or more processors and a memory.

The first CN node 200 may include a memory storing programs (one or more instructions), and one or more processors that can execute the programs (the one or more instructions). The one or more processors may execute the program, and thereby perform operation of the processing section 230 (operation of the control section 231 and/or the communication processing section 233). The program may be a program for causing the processor(s) to execute the operation of the processing section 230 (operation of the control section 231 and/or the communication processing section 233).

The first CN node 200 may include a transceiver and a controller. The controller may perform the operation of the processing section 230 (operation of the control section 231 and/or the communication processing section 233), and may transmit and receive information or a message via the transceiver.

Note that the first CN node 200 may be virtualized. In other words, the first CN node 200 may be implemented as a virtual machine. In this case, the first CN node 200 (the virtual machine) may operate as a physical machine (hardware) including a processor, a memory, and the like, and as a virtual machine on a hypervisor.

2.3. Configuration of Second Core Network Node

Figure 6:
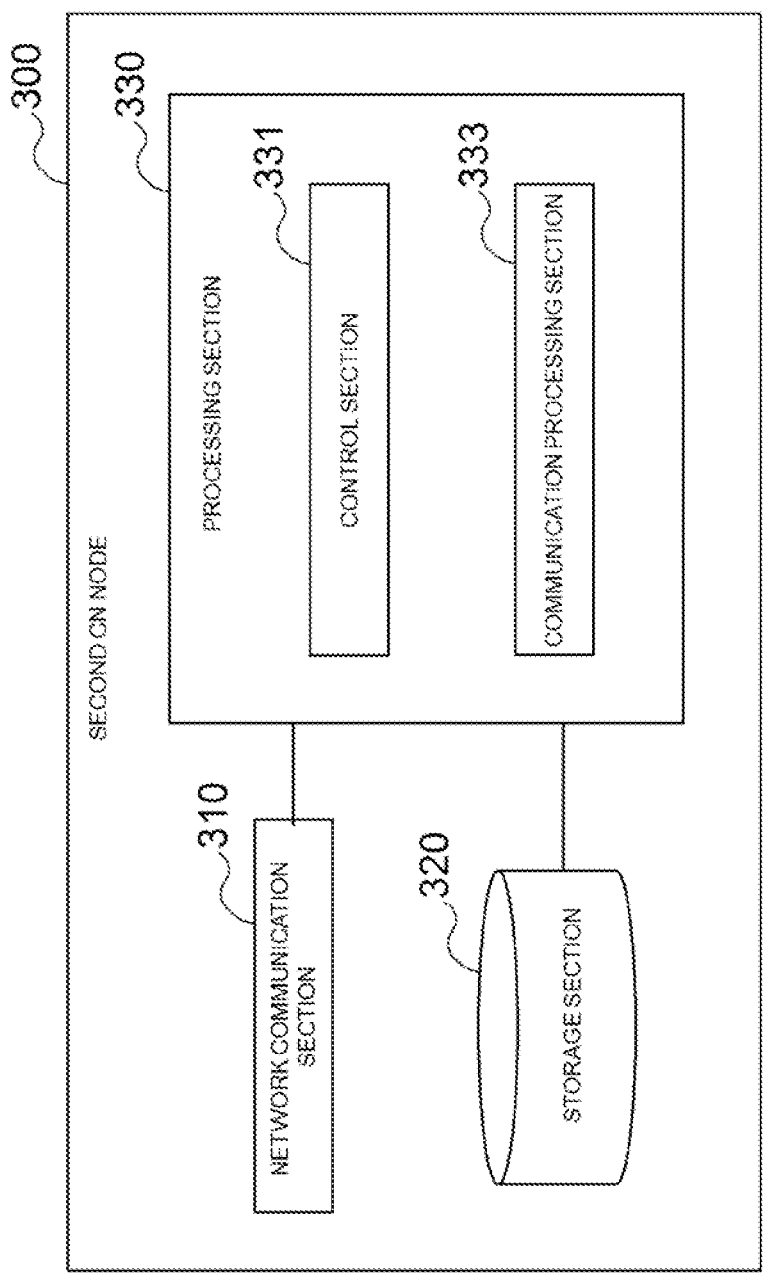
FIG. 6 is a block diagram illustrating an example of a schematic configuration of a second core network node according to an example aspect of the present disclosure.

FIG. 6 is a block diagram illustrating an example of a schematic configuration of the second CN node 300 according to an example aspect of the present disclosure. With reference to FIG. 6, the second CN node 300 includes a network communication section 310, a storage section 320, and a processing section 330.

(1) Network Communication Section 310

The network communication section 310 receives a signal from a network, and transmits a signal to the network.

(2) Storage Section 320

The storage section 320 stores programs and parameters for operation of the second CN node 300 and various pieces of data in a temporary or permanent (non-transitory) manner. The program includes one or more instructions for operation of the second CN node 300.

(3) Processing Section 330

The processing section 330 provides various functions of the second CN node 300. The processing section 330 includes a control section 331 and a communication processing section 333. Note that the processing section 330 may further include a constituent element other than these constituent elements. In other words, the processing section 330 may perform operation other than operations of these constituent elements. Specific operations of the control section 331 and the communication processing section 333 will be described in each example aspect.

For example, the processing section 330 (communication processing section 333) communicates with another network node (for example, the control apparatus 100 or a core network node) via the network communication section 310.

(4) Implementation Example

The network communication section 310 may be implemented with a network adapter, a network interface card, a transmitter, a receiver, a transceiver, and/or the like. The storage section 320 may be implemented with a memory (for example, a non-volatile memory and/or a volatile memory), a hard disk, and/or the like. The processing section 330 may be implemented with one or more processors. The control section 331 and the communication processing section 333 may be implemented with the same processor, or may be implemented with separate processors. The memory (storage section 320) may be included in the one or more processors, or may be located outside of the one or more processors. The processing section 330 and the storage section 320 may be implemented with a controller, and the controller may include one or more processors and a memory.

The second CN node 300 may include a memory storing programs (one or more instructions), and one or more processors that can execute the programs (the one or more instructions). The one or more processors may execute the program, and thereby perform operation of the processing section 330 (operation of the control section 331 and/or the communication processing section 333). The program may be a program for causing the processor(s) to execute the operation of the processing section 330 (operation of the control section 331 and/or the communication processing section 333).

The second CN node 300 may include a transceiver and a controller. The controller may perform the operation of the processing section 330 (operation of the control section 331 and/or the communication processing section 333), and may transmit and receive information or a message via the transceiver.

Note that the second CN node 300 may be virtualized. In other words, the second CN node 300 may be implemented as a virtual machine. In this case, the second CN node 300 (the virtual machine) may operate as a physical machine (hardware) including a processor, a memory, and the like, and as a virtual machine on a hypervisor.

2.4. Configuration of Third Core Network Node

Figure 7:
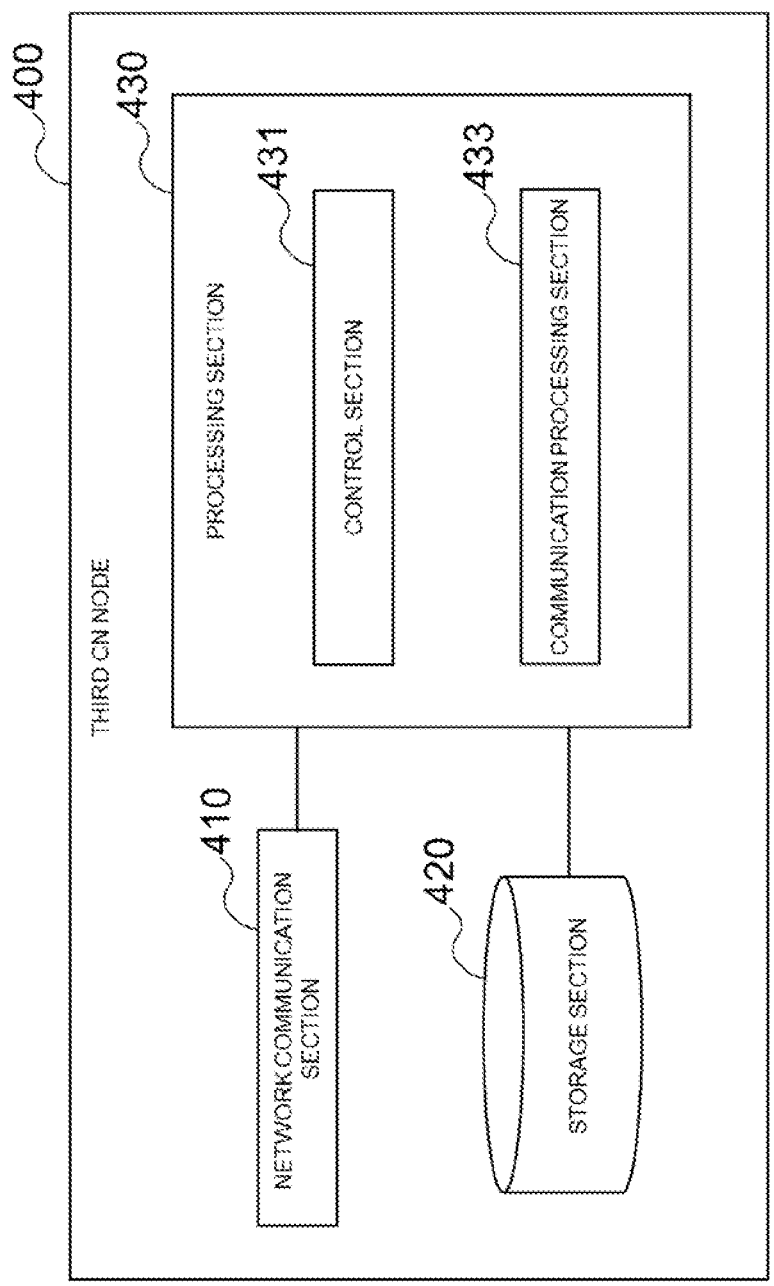
FIG. 7 is a block diagram illustrating an example of a schematic configuration of a third core network node according to an example aspect of the present disclosure.

FIG. 7 is a block diagram illustrating an example of a schematic configuration of the third CN node 400 according to an example aspect of the present disclosure. With reference to FIG. 7, the third CN node 400 includes a network communication section 410, a storage section 420, and a processing section 430.

(1) Network Communication Section 410

The network communication section 410 receives a signal from a network, and transmits a signal to the network.

(2) Storage Section 420

The storage section 420 stores programs and parameters for operation of the third CN node 400 and various pieces of data in a temporary or permanent (non-transitory) manner. The program includes one or more instructions for operation of the third CN node 400.

(3) Processing Section 430

The processing section 430 provides various functions of the third CN node 400. The processing section 430 includes a control section 431 and a communication processing section 433. Note that the processing section 430 may further include a constituent element other than these constituent elements. In other words, the processing section 430 may perform operation other than operations of these constituent elements. Specific operations of the control section 431 and the communication processing section 433 will be described in each example aspect.

For example, the processing section 430 (communication processing section 433) communicates with another network node (for example, a core network node) via the network communication section 410.

(4) Implementation Example

The network communication section 410 may be implemented with a network adapter, a network interface card, a transmitter, a receiver, a transceiver, and/or the like. The storage section 420 may be implemented with a memory (for example, a non-volatile memory and/or a volatile memory), a hard disk, and/or the like. The processing section 430 may be implemented with one or more processors. The control section 431 and the communication processing section 433 may be implemented with the same processor, or may be implemented with separate processors. The memory (storage section 420) may be included in the one or more processors, or may be located outside of the one or more processors. The processing section 430 and the storage section 420 may be implemented with a controller, and the controller may include one or more processors and a memory.

The third CN node 400 may include a memory storing programs (one or more instructions), and one or more processors that can execute the programs (the one or more instructions). The one or more processors may execute the program, and thereby perform operation of the processing section 430 (operation of the control section 431 and/or the communication processing section 433). The program may be a program for causing the processor(s) to execute the operation of the processing section 430 (operation of the control section 431 and/or the communication processing section 433).

The third CN node 400 may include a transceiver and a controller. The controller may perform the operation of the processing section 430 (operation of the control section 431 and/or the communication processing section 433), and may transmit and receive information or a message via the transceiver.

Note that the third CN node 400 may be virtualized. In other words, the third CN node 400 may be implemented as a virtual machine. In this case, the third CN node 400 (the virtual machine) may operate as a physical machine (hardware) including a processor, a memory, and the like, and as a virtual machine on a hypervisor.

2.5. Configuration of Radio Station

Figure 8:
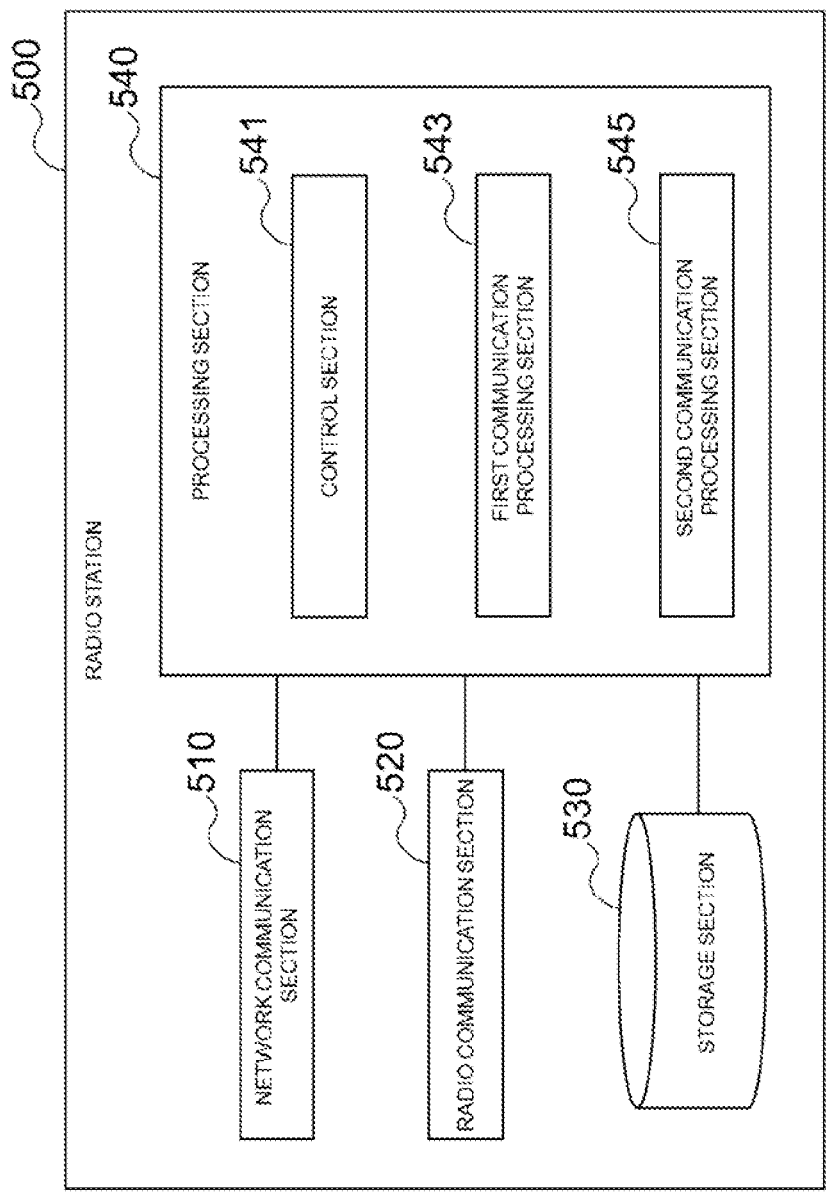
FIG. 8 is a block diagram illustrating an example of a schematic configuration of a radio station according to an example aspect of the present disclosure.

FIG. 8 is a block diagram illustrating an example of a schematic configuration of the radio station 500 according to an example aspect of the present disclosure. With reference to FIG. 8, the radio station 500 includes a network communication section 510, a radio communication section 520, a storage section 530, and a processing section 540.

(1) Network Communication Section 510

The network communication section 510 receives a signal from a network, and transmits a signal to the network.

(2) Radio Communication Section 520

The radio communication section 520 transmits and receives a radio signal. For example, the radio communication section 520 receives a radio signal from a mobile terminal, and transmits a radio signal to the mobile terminal.

(3) Storage Section 530

The storage section 530 stores programs and parameters for operation of the radio station 500 and various pieces of data in a temporary or permanent (non-transitory) manner. The program includes one or more instructions for operation of the radio station 500.

(4) Processing Section 540

The processing section 540 provides various functions of the radio station 500. The processing section 540 includes a control section 541, a first communication processing section 543, and a second communication processing section 545. Note that the processing section 540 may further include a constituent element other than these constituent elements. In other words, the processing section 540 may perform operation other than operations of these constituent elements. Specific operations of the control section 541, the first communication processing section 543, and the second communication processing section 545 will be described in each example aspect.

For example, the processing section 540 (first communication processing section 543) communicates with another network node (for example, a core network node) via the network communication section 510. For example, the processing section 540 (second communication processing section 545) communicates with the mobile terminal via the radio communication section 520.

(5) Implementation Example

The network communication section 510 may be implemented with a network adapter, a network interface card, a transmitter, a receiver, a transceiver, and/or the like. The radio communication section 520 may be implemented with an antenna, a radio frequency (RF) circuit, a transmitter, a receiver, a transceiver, and/or the like. The antenna may be a directional antenna. The storage section 530 may be implemented with a memory (for example, a non-volatile memory and/or a volatile memory), a hard disk, and/or the like. The processing section 540 may be implemented with one or more processors. The control section 541, the first communication processing section 543, and the second communication processing section 545 may be implemented with the same processor, or may be implemented with separate processors. The memory (storage section 530) may be included in the one or more processors, or may be located outside of the one or more processors. The processing section 540 and the storage section 530 may be implemented with a controller, and the controller may include one or more processors and a memory.

The radio station 500 may include a memory storing programs (one or more instructions), and one or more processors that can execute the programs (the one or more instructions). The one or more processors may execute the program, and thereby perform operation of the processing section 540 (operation of the control section 541, the first communication processing section 543, and/or the second communication processing section 545). The program may be a program for causing the processor(s) to execute the operation of the processing section 540 (operation of the control section 541, the first communication processing section 543, and/or the second communication processing section 545).

The radio station 500 may include a transceiver and a controller. The controller may perform the operation of the processing section 540 (operation of the control section 541, the first communication processing section 543, and/or the second communication processing section 545), and may transmit and receive information or a message via the transceiver.

Note that the radio station 500 may be partially or entirely virtualized. In other words, a part or all of the radio station 500 may be implemented as a virtual machine. In this case, a part or all of the radio station 500 (the virtual machine) may operate as a physical machine (hardware) including a processor, a memory, and the like, and as a virtual machine on a hypervisor.

2.6. Configuration of Mobile Terminal

Figure 9:
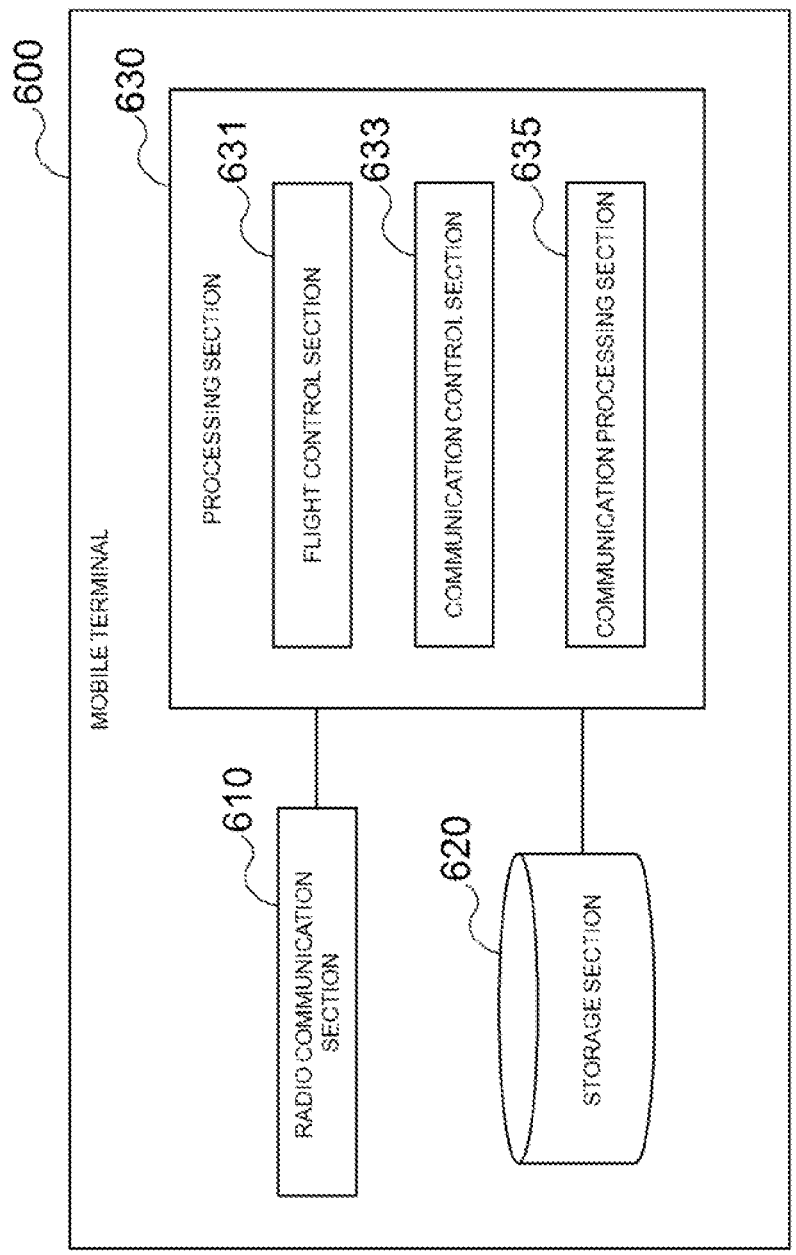
FIG. 9 is a block diagram illustrating an example of a schematic configuration of a mobile terminal according to an example aspect of the present disclosure.

FIG. 9 is a block diagram illustrating an example of a schematic configuration of the mobile terminal 600 according to an example aspect of the present disclosure. With reference to FIG. 9, the mobile terminal 600 includes a radio communication section 610, a storage section 620, and a processing section 630.

(1) Radio Communication Section 610

The radio communication section 610 transmits and receives a radio signal. For example, the radio communication section 610 receives a radio signal from a radio station, and transmits a radio signal to the radio station.

(2) Storage Section 620

The storage section 620 stores programs and parameters for operation of the mobile terminal 600 and various pieces of data in a temporary or permanent (non-transitory) manner. The program includes one or more instructions for operation of the mobile terminal 600.

(3) Processing Section 630

The processing section 630 provides various functions of the mobile terminal 600. The processing section 630 includes a flight control section 631, a communication control section 633, and a communication processing section 635. Note that the processing section 630 may further include a constituent element other than these constituent elements. In other words, the processing section 630 may perform operation other than operations of these constituent elements. Specific operations of the flight control section 631, the communication control section 633, and the communication processing section 635 will be described in each example aspect.

For example, the processing section 630 (flight control section 631) controls movement of the mobile terminal 600 according to the flight path information.

For example, the processing section 630 (communication processing section 635) communicates with a radio station via the radio communication section 610.

(4) Implementation Example

The radio communication section 610 may be implemented with an antenna, a radio frequency (RF) circuit, a transmitter, a receiver, a transceiver, and/or the like. The antenna may be a directional antenna. The storage section 620 may be implemented with a memory (for example, a non-volatile memory and/or a volatile memory), a hard disk, and/or the like. The processing section 630 may be implemented with one or more processors. The flight control section 631, the communication control section 633, and the communication processing section 635 may be implemented with the same processor, or may be implemented with separate processors. The memory (storage section 620) may be included in the one or more processors, or may be located outside of the one or more processors. As an example, the processing section 630 may be implemented in a system on chip (SoC). The processing section 630 and the storage section 620 may be implemented with a controller, and the controller may include one or more processors and a memory. As an example, the flight control section 631 may be implemented with a flight controller. The communication control section 633 and the communication processing section 635 may be implemented with the flight controller, or may be implemented with another controller.

The mobile terminal 600 may include a memory storing programs (one or more instructions), and one or more processors that can execute the programs (the one or more instructions). The one or more processors may execute the program, and thereby perform operation of the processing section 630 (operation of the flight control section 631, the communication control section 633, and/or the communication processing section 635). The program may be a program for causing the processor(s) to execute the operation of the processing section 630 (operation of the flight control section 631, the communication control section 633, and/or the communication processing section 635).

The mobile terminal 600 may include a transceiver and a controller. The controller may perform the operation of the processing section 630 (operation of the flight control section 631, the communication control section 633, and/or the communication processing section 635), and may transmit and receive information or a message via the transceiver.

Note that, when the mobile terminal 600 is not an apparatus to be attached to the flight apparatus but is the flight apparatus itself, the mobile terminal 600 may further include a flight section. The flight section may be implemented with a battery, a motor, an electric speed controller (ESC), and the like.

3. Overview of Example Aspects

Figure 10:
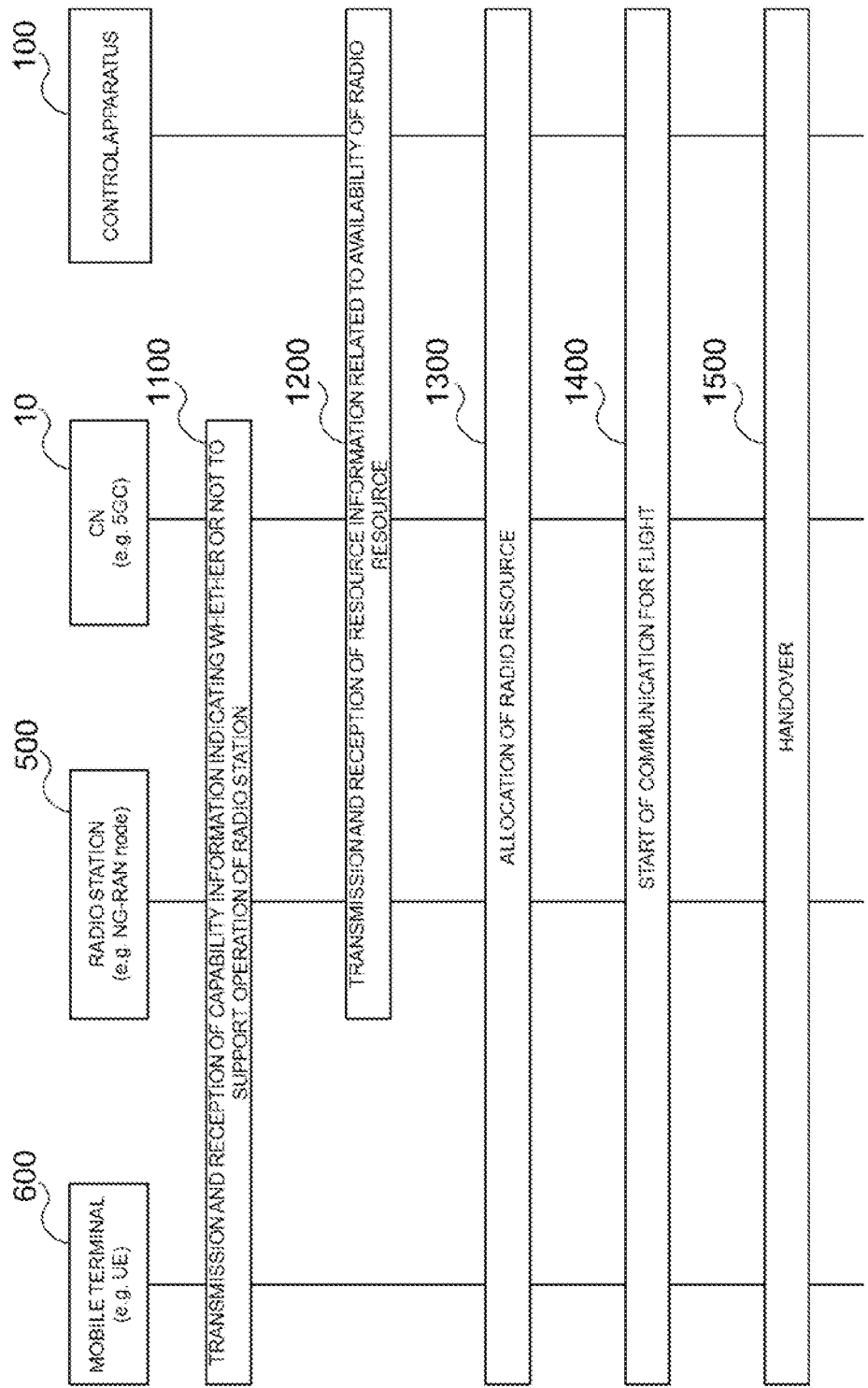
FIG. 10 is an explanatory diagram for illustrating an overview of an example aspect of the present disclosure.

With reference to FIG. 10, an overview of example aspects of the present disclosure will be described.

FIG. 10 is an explanatory diagram for illustrating an overview of example aspects of the present disclosure. With reference to FIG. 10, as the whole example aspects of the present disclosure, five operations (operation 1100, operation 1200, operation 1300, operation 1400, and operation 1500) are performed.

The first example aspect is an example aspect for the operation 1100 (transmission and reception of capability information indicating whether or not to support operation of a radio station) and the operation 1200 (transmission and reception of resource information related to availability of a radio resource). The fifth example aspect is a more generalized example aspect for the operation 1100, and the sixth example aspect is a more generalized example aspect for the operation 1200.

The second example aspect is an example aspect for the operation 1300 (allocation (reservation) of a radio resource). The seventh example aspect is a more generalized example aspect for the operation 1300.

The third example aspect is an example aspect for the operation 1400 (start of communication for flight). The eighth example aspect is a more generalized example aspect for the operation 1400.

The fourth example aspect is an example aspect for the operation 1500 (handover). The ninth example aspect is a more generalized example aspect for the operation 1500.

All of the five operations illustrated in FIG. 10 may be combined, or a part of the five operations may be combined. In other words, all of the operations according to the first to fourth example aspects may be combined, or at least a part of the operations according to the first to fourth example aspects may be combined. In contrast, one operation of the five operations illustrated in FIG. 10 may be independent without being dependent on the other four operations of the five operations. As an example, the operation (operation 1500) according to the fourth example aspect may be independent without being dependent on the operations (operations 1100 to 1400) according to the first to third example aspects. For example, as will be described below, the operations according to their respective example aspects may be performed according to conditions different from each other (or independent of each other).

For example, the operation 1100 (transmission and reception of capability information indicating whether or not to support operation of a radio station) and the operation 1200 (transmission and reception of resource information related to availability of a radio resource) are not performed for each individual flight of the mobile terminal 600, but are performed in advance for the sake of a number of flights to be planned in future. For example, the operation 1100 (transmission and reception of capability information indicating whether or not to support operation of a radio station) may be performed at the time of initial configuration or for each activation of each apparatus.

For example, the operation 1300 (allocation of a radio resource) is performed when an individual flight of the mobile terminal 600 is planned.

For example, the operation 1400 (start of communication for flight) is performed when the planned flight is started.

For example, the operation 1500 (handover) is performed during the flight of the mobile terminal 600.

4. First Example Aspect

Next, with reference to FIG. 11 to FIG. 14, the first example aspect of the present disclosure will be described.

(1) Transmission and Reception of Capability Information

(1-1) Capability of Radio Station 500

The radio station 500 (first communication processing section 543) transmits, to the first CN node 200, first capability information indicating whether or not to support the operation of the radio station 500 for performing flight management of a manned flight vehicle capable of flying using a radio communication network (for example, a radio communication network using specifications of 3GPP). The first CN node 200 (communication processing section 233) receives the first capability information from the radio station 500. For example, the first capability information may be information indicating whether or not each of various operations of the radio station 500 according to the present disclosure is supported. Specifically, the first capability information may be information indicating whether or not to support a drone service, or may be information indicating whether or not "CN initiated Handover (HO) support" is true. In another example, the first capability information may be information indicating whether or not to support a change of the flight path of the mobile terminal 600, or may be information indicating whether or not to support assistance information used for an instruction or a request for landing of the mobile terminal 600, or information indicating whether or not to support assistance information used for determination as to whether or not to let the mobile terminal 600 perform landing. For example, the first capability information may be information indicating whether or not the radio station 500 can provide resource information related to availability of a radio resource for at least one time period.

For example, the first CN node 200 (communication processing section 233) receives the capability information from each of the plurality of radio stations 500 for the first CN node 200.

For example, the radio station 500 (first communication processing section 543) transmits an NG SETUP REQUEST message including the first capability information to the first CN node 200. The first CN node 200 (communication processing section 233) receives the NG SETUP REQUEST message from the radio station 500.

As an example, the first capability information indicates that the radio station 500 can provide the above-mentioned resource information. As another example, the first capability information may indicate that the operation of the radio station 500 for performing flight management of a manned flight vehicle capable of flying using a radio communication network is not supported, and the first capability information may indicate that the radio station 500 cannot provide the resource information.

Note that specific details of the resource information will be described later in detail.

(1-2) Capability of First CN Node 200

For example, the first CN node 200 (communication processing section 233) transmits, to the radio station 500, second capability information indicating whether or not the operation of the CN node 200 for performing flight management of a manned flight vehicle capable of flying using a radio communication network (for example, a radio communication network using specifications of 3GPP) is supported. The radio station 500 (first communication processing section 543) receives the second capability information from the first CN node 200. For example, the second capability information may be information indicating whether or not each of various operations of the CN node 200 according to the present disclosure is supported. Specifically, the second capability information may be information indicating whether or not to support a drone service, or may be information indicating whether or not "CN initiated Handover (HO) support" is true. In another example, the second capability information may be information indicating whether or not to support a change of the flight path of the mobile terminal 600, or may be information indicating whether or not to support assistance information used for an instruction or a request for landing of the mobile terminal 600, or information indicating whether or not to support assistance information used for determination as to whether or not to let the mobile terminal 600 perform landing. For example, the second capability information may be information indicating whether or not the first CN node 200 supports a service related to the resource information related to availability of a radio resource for at least one time period. For example, the second capability information may be information indicating whether or not the first CN node 200 can provide the resource information related to availability of a radio resource for at least one time period.

Note that the second capability information may indicate whether or not the first CN node 200 can receive the resource information related to availability of a radio resource for at least one time period from the radio station 500.

The second capability information configured by the first CN node 200 may be configured in view of presence or absence of capability of the control apparatus 100 constituting the system 1, presence or absence of capability of the second CN node (NEF) 300, and presence or absence of capability of the third CN node (SMF) 400. Each of the control apparatus 100, the second CN node (NEF) 300, and the third CN node (SMF) 400 may notify the first CN node (AMF) 200 of its own capability information in advance, or the first CN node 200 may inquire the control apparatus 100, the second CN node (NEF) 300, and the third CN node (SMF) 400 so as to determine capability of the system 1. The capability of each apparatus may be determined based on at least one of whether or not the apparatus has the capability, whether or not there is temporarily capability at the time point when there is capability in the apparatus, and whether or not the apparatus or a physical apparatus that manages an instance of the apparatus is connected to the first CN node 200.

For example, the first CN node 200 (communication processing section 233) receives an NG SETUP RESPONSE message including the second capability information from the first CN node 200. The radio station 500 (first communication processing section 543) receives the NG SETUP RESPONSE message from the first CN node 200.

As an example, the second capability information indicates that the first CN node 200 can provide the resource information (for example, to another CN node). As another example, the second capability information may indicate that the operation of the first CN node 200 for performing flight management of a manned flight vehicle that can fly using a radio communication network is not supported, and the second capability information may indicate that the first CN node 200 cannot provide the resource information (for example, to another CN node).

Note that specific details of the resource information will be described later in detail.

(1-3) Flow of Processing

Figure 11:
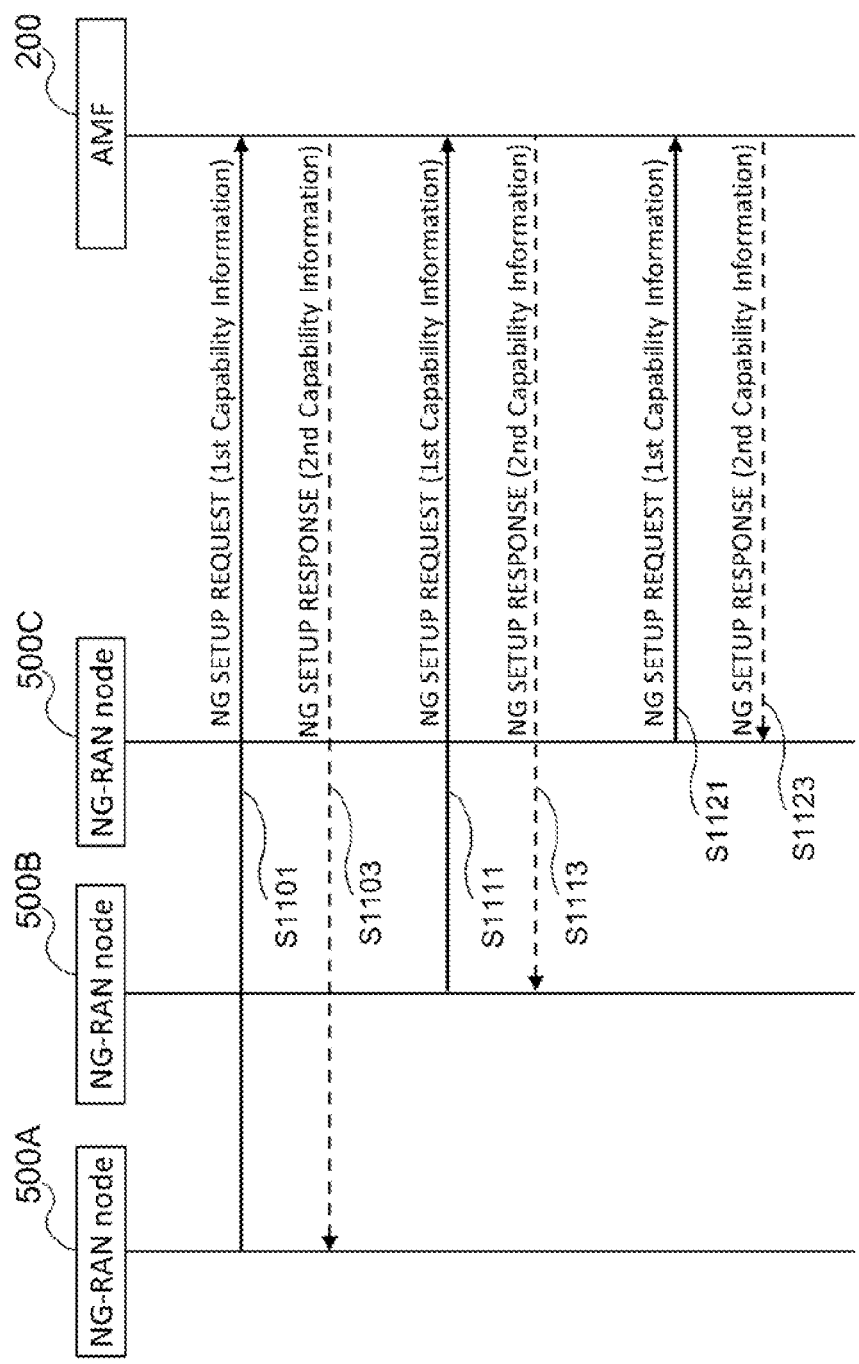
FIG. 11 is a sequence diagram for illustrating an example of a schematic flow of processing of transmission and reception of capability information according to a first example aspect.

FIG. 11 is a sequence diagram for illustrating an example of a schematic flow of processing of transmission and reception of the capability information according to the first example aspect.

In FIG. 11, for the sake of better understanding, as a specific example, the radio station 500 is illustrated as an NG-RAN node, and the first CN node 200 is illustrated as an AMF.

An NG-RAN node 500A transmits the NG SETUP REQUEST message including the first capability information to the AMF 200 (S1101).

In response to reception of the NG SETUP REQUEST message, the AMF 200 transmits the NG SETUP RESPONSE message to the NG-RAN node 500A (S1103). In the NG SETUP RESPONSE message, the second capability information may be included.

In FIG. 11, an example of a sequence related to capability negotiation performed between the NG-RAN node 500A and the AMF 200 is illustrated. However, each piece of capability information may be transmitted on the following messages.

For example, the first capability information of the NG-RAN node 500A may be transmitted to the AMF 200 on a RAN CONFIGURATION UPDATE message and/or an AMF CONFIGURATION UPDATE ACKNOWLEDGE message that is transmitted from the NG-RAN node 500A to the AMF 200. The second capability information of the AMF 200 may be transmitted to the NG-RAN node 500A on a RAN CONFIGURATION UPDATE ACKNOWLEDGE message and/or an AMF CONFIGURATION UPDATE message that is transmitted from the AMF 200 to the NG-RAN node 500A.

In addition, the first capability information of the NG-RAN node 500A may be notified to an NG-RAN node 500B. The first capability information of the NG-RAN node 500A may be transmitted to the NG-RAN node 500B on an XN SETUP REQUEST message and/or an NG-RAN NODE CONFIGURATION UPDATE message that is transmitted from the NG-RAN node 500A to the NG-RAN node 500B. The first capability information of the NG-RAN node 500B may be notified to the NG-RAN node 500A. The first capability information of the NG-RAN node 500B may be transmitted to the NG-RAN node 500A on an XN SETUP RESPONSE message and/or an NG-RAN NODE CONFIGURATION UPDATE ACKNOWLEDGE message that is transmitted from the NG-RAN node 500B to the NG-RAN node 500A.

The NG-RAN node 500A may generate third capability information of the system 1, based on the first capability information of the NG-RAN node 500A, and the second capability information of the AMF 200 connecting to the NG-RAN node 500A. Here, the third capability information may be information indicating whether or not the operation of the system 1 for performing flight management of a manned flight vehicle capable of flying using a radio communication network (for example, a radio communication network using specifications of 3GPP) is supported. Specifically, the third capability information may be information indicating whether or not to support a drone service, or may be information indicating whether or not "CN initiated Handover (HO) support" is true. In another example, the third capability information may be information indicating whether or not to support a change of the flight path of the mobile terminal 600, or may be information indicating whether or not to support assistance information used for an instruction or a request for landing of the mobile terminal 600, or information indicating whether or not to support assistance information used for determination as to whether or not to let the mobile terminal 600 perform landing.

The NG-RAN node 500A may broadcast the generated third capability information to the mobile terminals 600 on system information blocks (SIB) by using a broadcast control channel (BCCH). Note that the third capability information may be transmitted as a signal of the control plane, or may be transmitted as data of the user plane. When the NG-RAN node 500A is connected to a plurality of AMFs 200, the third capability information may be generated by using the second capability information supported by at least one of the AMFs 200.

The first capability information, the second capability information, and the third capability information may be handled as network slice information in the system 1. In this case, the capability of supporting a flying mobile terminal (or aerial UE or drone) may be associated with a specific value of network slice selection assistance information (NS-SAI). Alternatively, the capability of supporting a flying mobile terminal (or aerial UE or drone) may be associated with a specific value of a standardised slice/service type (SST) being a sub-field of the NSSAI. In this case, the first capability information, the second capability information, and the third capability information are handled with an information element such as Requested NSSAI, Subscribed NSSAI, Configured NSSAI, and Allowed NSSAI.

Requested NSSAI includes one or more pieces of single-network slice selection assistance information (S-NSSAI) that the UE transmits to the network. Allowed NSSAI includes one or more pieces of S-NSSAI that the network permits its use.

Configured NSSAI includes one or more pieces of S-NSSAI indicated as being applicable to one or more public land mobile networks (PLMNs) for the UE. Subscribed NSSAI includes the S-NSSAI based on subscriber information indicating subscription of a certain PLMN for the UE to use.

Similarly to the NG-RAN node 500A, for each of the NG-RAN node 500B and the NG-RAN node 500C as well, transmission and reception of messages are performed in a similar manner (S1111, S1113, S1121, and S1123).

Note that, in the example of FIG. 11, "NG-RAN node" may be replaced by "radio station", and "AMF" may be replaced by "first CN node". Each of "NG SETUP REQUEST" and "NG SETUP RESPONSE" may be replaced by "message".

In the example of FIG. 11, transmission and reception of the first capability information (Steps S1101, S1111, and S1121) may be performed, and transmission and reception of the second capability information (Steps S1103, S1113, and S1123) may not be performed.

(1-4) First Example Alteration

First Capability Information

As described above, for example, the first capability information may indicate whether or not to support the operation of the radio station 500 for performing flight management of a manned flight vehicle capable of flying using a radio communication network (for example, a radio communication network using specifications of 3GPP). However, the first capability information is not limited to this example.

The first capability information may indicate whether or not the radio station 500 supports a flying mobile terminal (or aerial UE or drone). In addition, when the radio station 500 supports a flying mobile terminal (or aerial UE or drone), the radio station 500 may be able to provide the resource information.

Second Capability Information

As described above, for example, the second capability information may indicate whether or not to support the operation of the first core network node 200 for performing flight management of a manned flight vehicle capable of flying using a radio communication network (for example, a radio communication network using specifications of 3GPP). However, the second capability information is not limited to this example.

The second capability information may indicate whether or not the first CN node 200 supports a flying mobile terminal (or aerial UE or drone). In addition, when the first CN node 200 supports a flying mobile terminal (or aerial UE or drone), the first CN node 200 may be able to provide the resource information.

Third Capability Information

As described above, for example, the third capability information may indicate whether or not to support the operation of the system 1 for performing flight management of a manned flight vehicle that can fly using a radio communication network (for example, a radio communication network using specifications of 3GPP). However, the third capability information is not limited to this example.

The third capability information may indicate whether or not the system 1 supports a flying mobile terminal (or aerial UE or drone). In addition, when the system 1 supports a flying mobile terminal (or aerial UE or drone), the system 1 may be able to provide the resource information.

In the above, transmission and reception of the capability information according to the first example aspect is described. When the first capability information is not transmitted from the radio station 500 to the first CN node 200, the first CN node 200 may request information (for example, resource information) for the flight management to the radio station 500, regardless of whether or not to support the operation of the radio station 500 for performing flight management of a manned flight vehicle that can fly using a radio communication network (for example, a radio communication network using specifications of 3GPP). Here, if the radio station 500 is incapable of providing the information for the flight management, the request for the information for the flight management is useless. Thus, at the time of transmission and reception of the information for the flight management, useless signaling may occur, and a communication resource and a processing resource of each node may be useless. In contrast, when the first capability information is transmitted from the radio station 500 to the first CN node 200 as described above, the first CN node 200 can determine whether or not to support the operation of the radio station 500 for performing flight management of a manned flight vehicle capable of flying using a radio communication network (for example, a radio communication network using specifications of 3GPP). Thus, occurrence of useless signaling can be prevented, and accordingly, a communication resource and a processing resource of each node can be prevented from becoming useless.

When the second capability information is not transmitted from the first CN node 200 to the radio station 500, the radio station 500 may provide information (for example, resource information) for the flight management for the first CN node 200, regardless of whether or not to support the operation of the first CN node 200 for performing flight management of a manned flight vehicle that can fly using a radio communication network (for example, a radio communication network using specifications of 3GPP). Here, if the first CN node 200 is incapable of providing the information for the flight management, the provision of the information for the flight management by the radio station 500 is useless. Thus, at the time of transmission and reception of the information for the flight management, a communication resource and a processing resource of each node may be useless. In contrast, when the second capability information is transmitted from the first CN node 200 to the radio station 500 as described above, the radio station 500 can determine whether or not to support the operation of the first CN node 200 for performing flight management of a manned flight vehicle that can fly using a radio communication network (for example, a radio communication network using specifications of 3GPP). Thus, occurrence of useless signaling can be prevented, and accordingly, a communication resource and a processing resource of each node can be prevented from becoming useless.

When the third capability information is not transmitted from the system 1 to the mobile terminal 600, the mobile terminal 600 involuntary accesses the system 1, regardless of whether or not the system 1 supports the flying mobile terminal. Thus, even if the mobile terminal 600 desires communication for flight, the mobile terminal 600 results in communicating with the system 1 that does not support the flying mobile terminal, and accordingly, a communication resource and a processing resource of each node and the time period before connecting to a desired system is useless. In contrast, as described above, when the third capability information is transmitted from the system 1 to the mobile terminal 600, the mobile terminal 600 can determine whether or not the system 1 supports the flying mobile terminal. Thus, connection to an undesired (unsupporting) system 1 can be prevented, and accordingly, a communication resource and a processing resource of each node can be prevented from becoming useless.

Note that the capability information described above may be referred to as support information. In other words, the first capability information, the second capability information, and the third capability information may be referred to as first support information, second support information, and third support information, respectively. The capability information described above may be an information element (IE) having any term. The information element may be explicit information, or may be implicit information. For example, the first capability information may be an information element explicitly indicating whether or not the radio station 500 can provide the information for the flight management, or may be an information element implicitly indicating whether or not the radio station 500 can provide the information for the flight management. For example, the second capability information may be an information element explicitly indicating whether or not the first CN node 200 can provide the information for the flight management, or may be an information element implicitly indicating whether or not the first CN node 200 can provide the information for the flight management.

Note that the first capability information described above may be, for example, used for selection of the radio station 500 by the CN node 200. Further, the second capability information described above may be, for example, used for selection of the CN node 200 by the radio station 500.

(2) Transmission and Reception of Resource Information

The radio station 500 (first communication processing section 543) transmits the resource information related to availability of a radio resource for at least one time period. The at least one time period is at least one time period in future. The control apparatus 100 (communication processing section 133) receives the resource information.

For example, the radio station 500 (first communication processing section 543) transmits the resource information to the first CN node 200.

(2-1) Resource Information

For Each Time Period/For Each Frequency Band

For example, the resource information is information related to availability of a radio resource for each time period.

For example, the resource information is information related to availability of a radio resource for each frequency band for at least one time period.

For example, the resource information is information related to availability of a radio resource, which is per time period and per frequency band.

For example, the resource information is information related to availability of a radio resource, which is per time period and per cell. Note that the resource information and location information indicating a position covered by the radio station 500 or the cell may be transmitted to the first CN node 200. Note that, together with the resource information, information related to transmission power may be transmitted to the first CN node 200. Note that the information related to transmission power may be average transmission power, maximum transmission power, or the like. Note that, together with the resource information, the information related to transmission power and the location information of the radio station 500 may be transmitted to the first CN node 200.

Note that the frequency band may be a component carrier (CC). Alternatively, the frequency band may be a partial band (bandwidth part (BWP)) included in the CC. Alternatively, the frequency band may be a band including a plurality of CCs.

Note that the resource information related to availability of a radio resource described above may indicate that the radio resource is available for the mobile terminal. Note that the resource information related to availability of a radio resource described above may indicate that the radio station can allocate the radio resource. Note that the resource information related to availability of a radio resource described above may indicate that the radio station tentatively reserves the radio resource.

Details

First Example

As a first example, the resource information is information indicating whether or not the radio resource is available. In other words, the resource information indicates that the radio resource is available, or indicates that the radio resource is unavailable.

For example, the resource information indicates that the radio resource of each frequency band is available for each time period. As an example, let T1 and T2 be target time period, and F1, F2, and F3 be a target frequency band. In this case, the resource information indicates whether or not the radio resource is available for each of the frequency bands F1, F2, and F3 at the time period T1, and also indicates whether or not the radio resource is available for each of the frequency bands F1, F2, and F3 at the time period T2.

Second Example

As a second example, the resource information may be information indicating a degree of availability of the radio resource. As an example, the resource information indicates whether availability of the radio resource is high, intermediate, or low.

For example, the resource information indicates the degree of availability of the radio resource of each frequency band for each time period. As an example, let T1 and T2 be target time period, and F1, F2, and F3 be a target frequency band. In this case, the resource information indicates whether the availability of the radio resource is high, intermediate, or low for each of the frequency bands F1, F2, and F3 at the time period T1, and also indicates whether the availability of the radio resource is high, intermediate, or low for each of the frequency bands F1, F2, and F3 at the time period T2.

In the example described above, as the degree of availability of the radio resource, three degrees (high, intermediate, and low) are defined. However, as a matter of course, the degree of availability of the radio resource is not limited to this example. As the degree of availability of the radio resource, four or more degrees may be defined. Note that, for example, the degree of availability may be indicated as a linear value in the range from 0 to 100, or may be indicated as a linear value from −100 to 100. In addition to the types described above, with the use of a special value, a situation in which the availability is unknown, abnormal, or irregular may be indicated. Note that the special value may be, for example, expressed as a flag using 1 bit. Note that the special value may be 101 when the degree of availability is expressed from 0 to 100, for example. Alternatively, the special value may be 101 or −101 when the degree of availability is expressed from −100 to 100, for example.

(2-2) Transmission to Control Apparatus

The resource information is transmitted from the first CN node 200 to the control apparatus 100 that generates or acquires the flight path information for the mobile terminal 600.

More specifically, for example, the resource information is transmitted from the radio station 500 to the control apparatus 100 via operations, administration and maintenance (OAM). Further, for example, the resource information is transmitted from the radio station 500 to the first CN node 200 (for example, an AMF), transmitted from the first CN node 200 to the second CN node 300 (for example, an NEF), and is transmitted from the second CN node 300 to the control apparatus 100.

In this case, the first CN node 200 (communication processing section 233) receives the resource information from the radio station 500, and transmits the resource information to the second CN node 300. The second CN node 300 (communication processing section 333) receives the resource information from the first CN node 200, and transmits the resource information to the control apparatus 100. The control apparatus 100 (communication processing section 133) receives the resource information from the second CN node 300.

The resource information may be transmitted in response to some trigger. For example, specific examples of the trigger of transmission of the resource information will be given below. However, the trigger is not limited to the examples below.

First Example: Transmission in Response to a Request

As a first example, the radio station 500 (first communication processing section 543) transmits the resource information to the first CN node 200 in response to a request for the resource information.

For example, the control apparatus 100 (communication processing section 133) transmits a message for requesting the resource information to the second CN node 300. For example, the message for requesting the resource information may be an Nnef_Radio_condition_request message, or may be a message defined with another term. The second CN node 300 (communication processing section 333) transmits the message for requesting the resource information to the first CN node 200 in response to the request for the resource information from the control apparatus 100. The message for requesting the resource information may be an Namf_Radio_condition request message, or may be a message defined with another term. The first CN node 200 (communication processing section 233) requests the resource information from the radio station 500, in response to the request for the resource information from the second CN node 300. In this case, the first CN node 200 (communication processing section 233) may request the resource information from the radio station 500 by transmitting a RAN STATUS REQUEST message or a message defined with another term. The radio station 500 (first communication processing section 543) transmits the resource information to the first CN node 200 in response to the request for the resource information from the first CN node 200. In this case, the radio station 500 may transmit a RAN STATUS RESPONSE message including the resource information or a message defined with another term.

For example, the first CN node 200 (control section 231) determines whether or not the radio station 500 can provide the resource information, based on the first capability information. If the radio station 500 can provide the resource information, the first CN node 200 (communication processing section 233) transmits a message for requesting the resource information to the radio station 500. In contrast, if the radio station 500 cannot provide the resource information, the first CN node 200 (communication processing section 233) may transmit a response message indicating rejection of the request for the resource information to the second CN node 300. In addition, the second CN node 300 (communication processing section 333) may transmit a response message indicating rejection of the request for the resource information to the control apparatus 100.

According to transmission in response to a request as described above, for example, the control apparatus 100 can acquire the resource information on demand.

Second Example: Periodic Transmission

As a second example, the radio station 500 (first communication processing section 543) may periodically transmit the resource information to the first CN node 200.

For example, the control apparatus 100 (communication processing section 133) may transmit period information indicating a period of transmission of the resource information to the second CN node 300. For example, the period information may be included in the Nnef_Radio_condition_request message and transmitted, or may be included in a message defined with another term and transmitted. The second CN node (communication processing section 333) may receive the period information from the control apparatus 100, and transmit the period information to the first CN node 200. For example, the period information may be included in the Namf_Radio_condition_request message and transmitted, or may be included in a message defined with another term and transmitted. The first CN node 200 (communication processing section 233) may receive the period information from the second CN node 300, and transmit the period information to the radio station 500. For example, the period information may be included in the RAN STATUS REQUEST message and transmitted, or may be included in a message defined with another term and transmitted. The radio station 500 (first communication processing section 543) may receive the period information from the first CN node 200, and transmit the resource information to the first CN node 200 (communication processing section 233) with the period indicated by the period information.

According to periodic transmission as described above, for example, the control apparatus 100 can acquire the resource information without individual requests.

(2-3) Target of Resource Information

For example, the radio station 500 (first communication processing section 543) receives target information indicating a target of the resource information, and transmits the resource information for the target indicated by the target information to the first CN node 200.

More specifically, for example, the control apparatus 100 (communication processing section 133) transmits the target information to the second CN node 300. For example, the target information may be included in the Nnef_Radio_condition_request message and transmitted, or may be included in a message defined with another term and transmitted. The second CN node 300 (communication processing section 333) receives the target information from the control apparatus 100, and transmits the target information to the first CN node 200. For example, the target information may be included in the Namf_Radio_condition_request message and transmitted, or may be included in a message defined with another term and transmitted. The first CN node 200 (communication processing section 233) receives the target information from the second CN node 300, and transmits the target information to the radio station 500. For example, the target information may be included in the RAN STATUS REQUEST message and transmitted, or may be included in a message defined with another term and transmitted. The radio station 500 (first communication processing section 543) receives the target information from the first CN node 200, and transmits the resource information for the target indicated by the target information to the first CN node 200. The first CN node 200 (communication processing section 233) receives the resource information for the target from the radio station 500. The second CN node 300 (communication processing section 333) receives the resource information for the target from the first CN node 200. The control apparatus 100 (communication processing section 133) receives the resource information for the target from the second CN node 300.

For example, the target indicated by the target information includes one or more time periods and/or one or more frequency bands. In other words, the target information includes information indicating the one or more time periods and/or information indicating the one or more frequency bands. As an example, the target is, as described above, the time periods T1 and T2 and the frequency bands F1, F2, and F3.

The target indicated by the target information may include the radio station 500 or a cell of the radio station 500. In other words, the target information may include information (for example, a cell identity (cell ID)) for identifying the radio station 500 or the cell of the radio station 500.

According to the target information as described above, for example, the control apparatus 100 can acquire desired resource information.

(2-4) Flow of Processing

Overview

Figure 12:
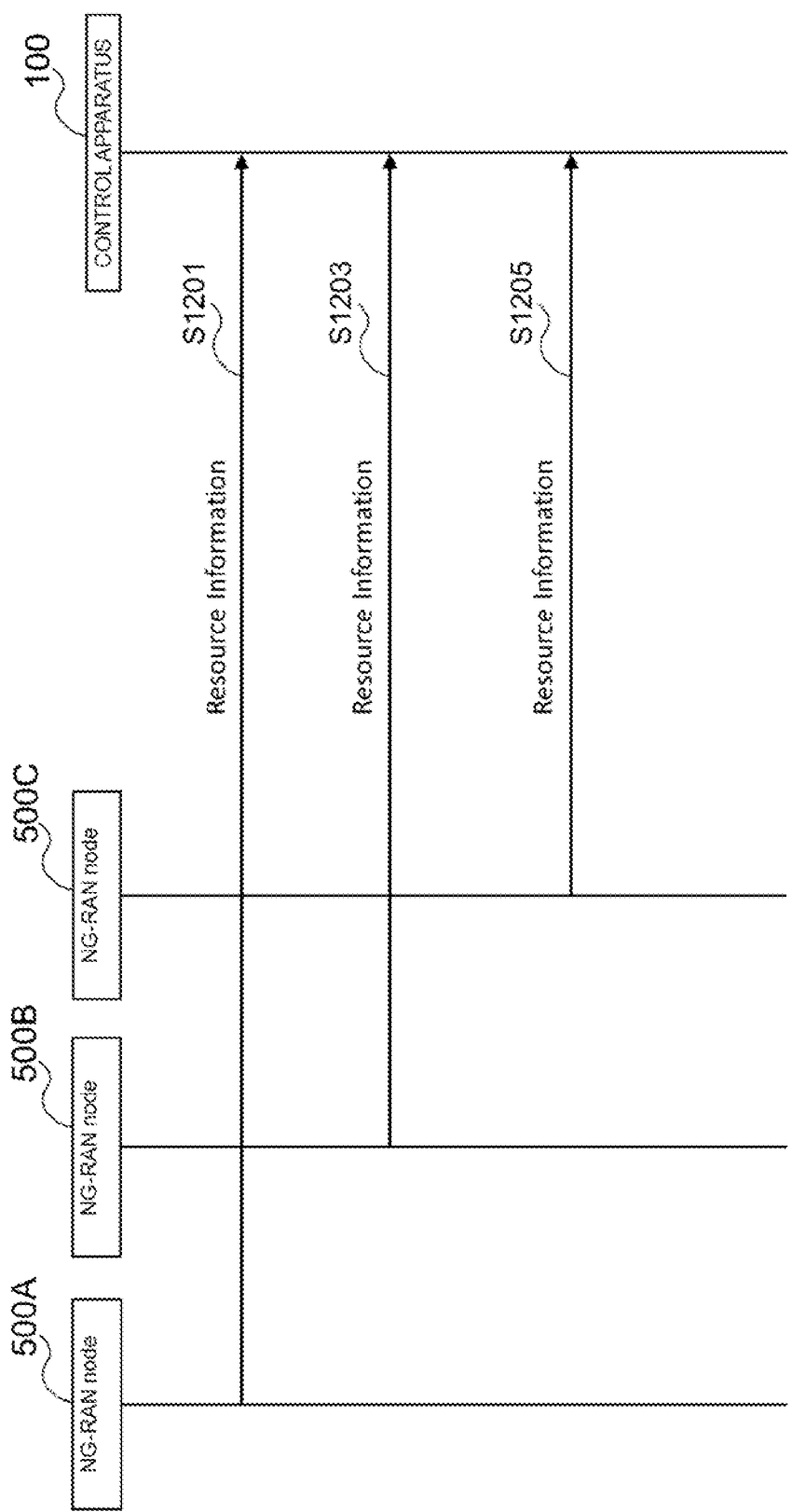
FIG. 12 is a first sequence diagram for illustrating an example of a schematic flow of processing of transmission and reception of resource information according to the first example aspect.

FIG. 12 is a first sequence diagram for illustrating an example of a schematic flow of processing of transmission and reception of the resource information according to the first example aspect. The first sequence diagram is a schematic sequence diagram.

In FIG. 12, for the sake of better understanding, as a specific example, the radio station 500 is illustrated as an NG-RAN node.

The resource information related to availability of a radio resource for at least one time period is transmitted from the NG-RAN node 500A to the control apparatus 100 (S1201). The NG-RAN node 500A may execute the processing of S1201 for each carrier.

As with the NG-RAN node 500A, from each of the NG-RAN node 500B and the NG-RAN node 500C as well, the resource information is transmitted to the control apparatus 100 (S1203 and 1205).

Note that, in the example of FIG. 12, "NG-RAN node" may be replaced by "radio station".

Details

Figure 13:
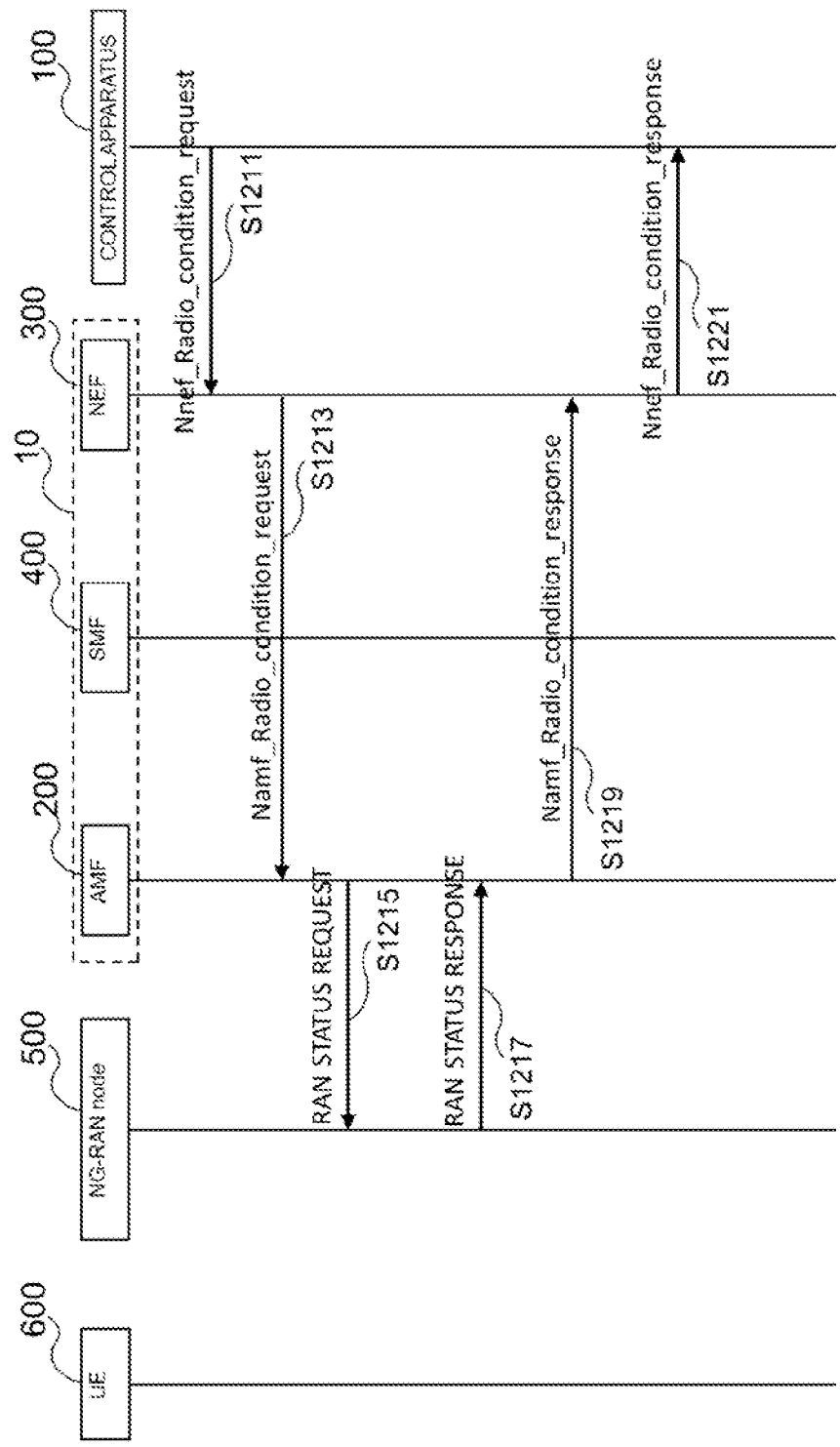
FIG. 13 is a second sequence diagram for illustrating an example of a schematic flow of processing of transmission and reception of the resource information according to the first example aspect.

FIG. 13 is a second sequence diagram for illustrating an example of a schematic flow of processing of transmission and reception of the resource information according to the first example aspect. The second sequence diagram is a sequence diagram illustrating an example in which the resource information is transmitted in response to a trigger.

In FIG. 13, for the sake of better understanding, as a specific example, the radio station 500 is illustrated as an NG-RAN node, the first CN node 200 is illustrated as an AMF, the second CN node 300 is illustrated as an NEF, the third CN node 400 is illustrated as an SMF, and the mobile terminal 600 is illustrated as a UE.

The control apparatus 100 transmits the Nnef_Radio_condition_request message for requesting the resource information related to availability of a radio resource for at least one time period to the NEF 300 (S1211). Geographical location information may be added to the Nnef_Radio_condition_request message. The geographical location information is Global Positioning System (GPS) information, or information indicating waypoints (hereinafter referred to as waypoint information) of the flight of the mobile terminal 600. For example, the waypoint information is also GPS information.

In response to reception of the Nnef_Radio_condition_request message, the NEF 300 transmits the Namf_Radio_condition_request message for requesting the resource information to the AMF 200 (S1213). When the geographical location information is included in the Nnef_Radio_condition_request message, the NEF 300 may transmit the Namf_Radio_condition_request message to the AMF 200 managing the position (area), based on the location information. In the Namf_Radio_condition_request message, the geographical location information may be included.

In response to reception of the Namf_Radio_condition_request message, the AMF 200 transmits the RAN STATUS REQUEST message for requesting the resource information to the NG-RAN node 500 (S1215). When the geographical location information is included in the Namf_Radio_condition_request message, the AMF 200 may determine the NG-RAN node 500 to which the RAN STATUS REQUEST message is to be transmitted, based on the location information. Note that the location information may include GPS information of a plurality of positions or a plurality of pieces of waypoint information, and a plurality of NG-RAN nodes 500 may be identified. Note that, based on the capability information of the NG-RAN node 500 described above, the AMF 200 may determine the NG-RAN node 500 to which the RAN STATUS REQUEST message is to be transmitted.

In response to reception of the RAN STATUS REQUEST message, the NG-RAN node 500 transmits the RAN STATUS RESPONSE message including the resource information to the AMF 200 (S1217).

In response to reception of the RAN STATUS RESPONSE message, the AMF 200 transmits an Namf_Radio_condition_response message including the resource information to the NEF 300 (S1219).

In response to reception of the Namf_Radio_condition_response message, the NEF 300 transmits an Nnef_Radio_condition_response message including the resource information to the control apparatus 100 (S1221).

The control apparatus 100 receives the Nnef_Radio_condition_response message, and acquires the resource information.

The Nnef_Radio_condition_request message, the Namf_Radio_condition_request message, and the RAN STATUS RESPONSE message may include the target information (for example, the time period information, the frequency information, and/or the cell ID). In this case, the resource information may be resource information for the target (for example, one or more time periods, one or more frequency bands, one or more cells, and/or the like) indicated by the target information.

The Nnef_Radio_condition_request message, the Namf_Radio_condition_request message, and the RAN STATUS RESPONSE message may include the period information. In this case, the transmission of Steps S1217, S1219, and S1221 may be performed periodically.

Note that, in the example of FIG. 13, "NG-RAN node" may be replaced by "radio station", "AMF" may be replaced by "first CN node", "NEF" may be replaced by "second CN node", "SMF" may be replaced by "third CN node", and "UE" may be replaced by "mobile terminal". Each of the messages illustrated in FIG. 13 may be replaced by "message".

(2-5) Second Example Alteration

As described above, the target may include the radio station 500 or a cell of the radio station 500, and the target information may include information (for example, a cell ID) for identifying the radio station 500 or the cell of the radio station 500. However, the target information is not limited to this example.

The target information may include location information indicating one or more positions, and the target may include one or more radio stations 500 corresponding to the one or more positions. For example, the first CN node 200 may identify the one or more radio stations 500, based on the location information. Then, the first CN node 200 may transmit a message for requesting the resource information to the one or more radio stations 500.

(2-6) Third Example Alteration

As described above, for example, the resource information is transmitted from the first CN node 200 to the second CN node 300. However, transmission of the resource information is not limited to this example.

The resource information may be transmitted from the first CN node 200 to the third CN node 400, and from the third CN node 400 to the second CN node 300.

The first CN node 200 (communication processing section 233) may transmit the resource information to the third CN node 400, the third CN node 400 (communication processing section 433) may receive the resource information from the first CN node 200 and transmit the resource information to the second CN node 300, and the second CN node 300 (communication processing section 333) may receive the resource information from the third CN node 400. In this manner, the first CN node 200 (communication processing section 233) may indirectly transmit the resource information to the second CN node 300, and the second CN node 300 (communication processing section 333) may indirectly receive the resource information from the first CN node 200.

(2-7) Fourth Example Alteration

As described above, for example, the resource information is transmitted from the radio station 500 to the control apparatus 100 by using signaling in the CN 10. However, transmission of the resource information is not limited to this example.

The resource information may be transmitted from the radio station 500 to the control apparatus 100 via operations, administration and maintenance (OAM). In this case, the control apparatus 100 may be a node of the OAM.

Figure 14:
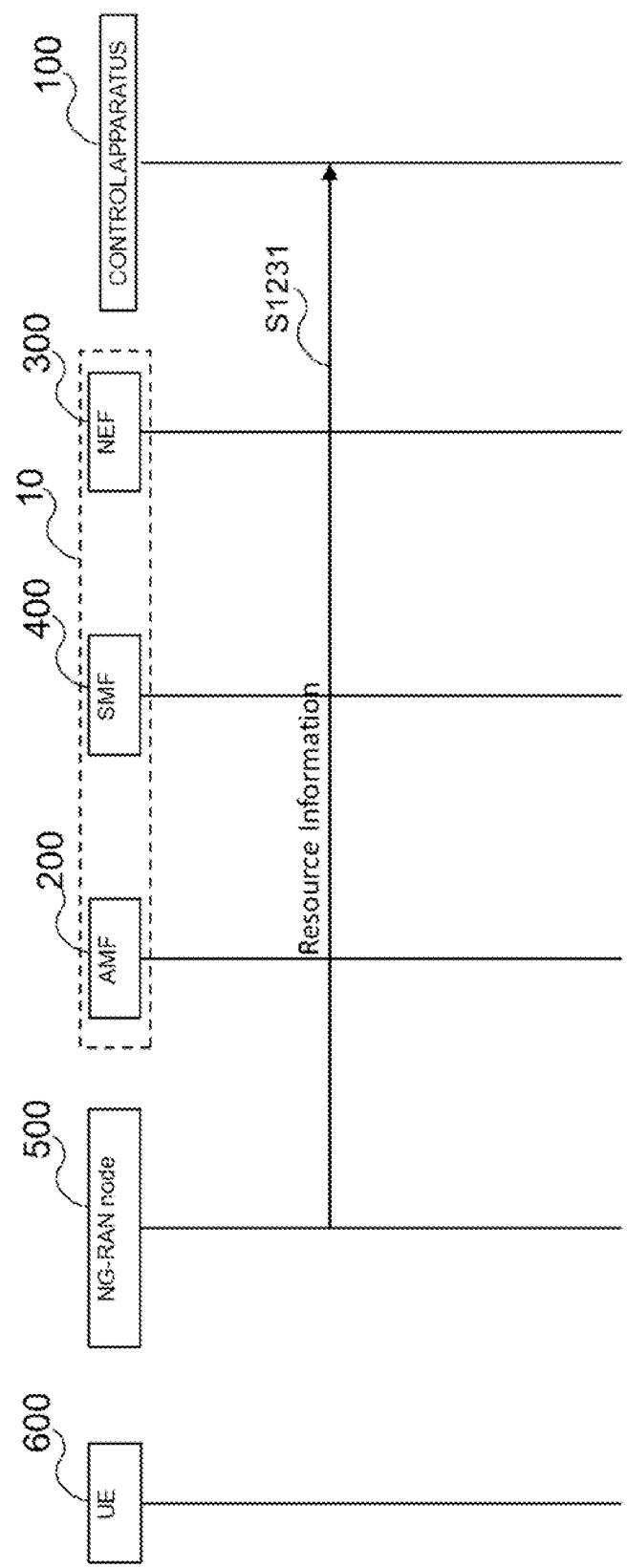
FIG. 14 is a sequence diagram for illustrating an example of a schematic flow of processing of transmission and reception of the resource information according to a fourth example alteration of the first example aspect.

FIG. 14 is a sequence diagram for illustrating an example of a schematic flow of processing of transmission and reception of the resource information according to the fourth example alteration of the first example aspect.

In FIG. 14, for the sake of better understanding, as a specific example, the radio station 500 is illustrated as an NG-RAN node.

The NG-RAN node 500 transmits the resource information related to availability of a radio resource for at least one time period to the control apparatus 100 via the OAM (S1231).

Note that, in the example of FIG. 14, "NG-RAN node" may be replaced by "radio station".

In the above, transmission and reception of the resource information according to the first example aspect is described. When the resource information is not transmitted to the control apparatus 100, the control apparatus 100 plans a flight of the mobile terminal 600 (for example, determines a flight path of the mobile terminal 600) without knowing availability of the radio resource. Thus, it may be difficult for the control apparatus 100 to determine the flight path in which the radio resource can be allocated. In contrast, when the resource information is transmitted to the control apparatus 100 as described above, the control apparatus 100 can know availability of the radio resource to a certain degree, and accordingly, it can be made easier to determine the flight path in which the radio resource can be allocated. As a result, it can be made easier to determine the flight path in which the flight of the mobile terminal 600 and safety of crew members boarding the mobile terminal 600 are allocated.

5. Second Example Aspect

Next, with reference to FIG. 15 to FIG. 17, the second example aspect of the present disclosure will be described.

(1) Request for Allocation of Resource

The control apparatus 100 (communication processing section 133) executes a procedure for requesting the radio station 500 to allocate a radio resource for the mobile terminal 600 moving according to the flight path information. For example, based on the flight path information, the control apparatus 100 transmits a first request message for requesting allocation of the radio resource to the radio station 500 via the OAM. For example, based on the flight path information, the control apparatus 100 transmits the first request message for requesting allocation of the radio resource to the CN 10 connected to the radio station 500 securing the radio resource.

In the following, an example of operation of a case in which the control apparatus 100 transmits the first request message to the CN 10 will be described. An example of operation of a case in which the control apparatus 100 transmits the first request message to the radio station 500 via the OAM will be described in (5) Second Example Alteration.

(1-1) Information Included in First Request Message

First Identification Information (Identification Information for Mobile Terminal 600)

For example, the first request message includes first identification information for identifying the mobile terminal 600. For example, the first identification information is a temporary UE ID.

Second Identification Information (Identification Information for Flight)

For example, the allocation of the radio resource is allocation of a radio resource for a flight of the mobile terminal 600, and the first request message includes second identification information for identifying the flight of the mobile terminal 600. For example, the second identification information is a flight ID or a flight number (that is normalized for each mobile terminal 600, for example). The second identification information is managed by the mobile terminal 600 and is distributed to the apparatuses constituting the system 1. Each of the apparatuses constituting the system 1 may recognize a unique flight in the system 1 by combining the first identification information and the second identification information. As another method of managing a unique flight in the system 1, the control apparatus 100 may issue second identification information to the mobile terminal 600 and manage the second identification information. In this case, the first request message does not include the second identification information for identifying the flight of the mobile terminal 600. In this case, the control apparatus 100 distributes the second identification information to the apparatuses in the system 1 including the mobile terminal 600.

Frequency Information

For example, the radio resource is a radio resource in a specific frequency band, and the first request message includes frequency information indicating the specific frequency band.

The frequency band may be a component carrier (CC). Alternatively, the frequency band may be a partial band (bandwidth part (BWP)) included in the CC. Alternatively, the frequency band may be a band including a plurality of CCs.

As a matter of course, the frequency information may indicate a plurality of frequency bands. The frequency information may indicate the plurality of frequency bands in order of priority. Note that, as an example, by giving high priority to a low frequency, radio connection with a flying mobile terminal can be stabilized.

According to the frequency information as described above, the CN 10 can request that a radio resource of a desired frequency band be allocated for the radio station 500.

Time Period Information

For example, the radio resource is a radio resource in a specific time period, and the first request message includes time period information indicating the specific time period.

For example, the specific time period includes a time period in which the mobile terminal 600 moving according to the flight path information is to communicate with the radio station 500.

According to the time period information as described above, the CN 10 can request that a radio resource of a desired time period (that is, a time period in which the mobile terminal 600 is to communicate with the radio station 500) be allocated for the radio station 500.

Location Information

For example, the first request message includes location information indicating a position, and the radio station 500 securing the radio resource supports the location information. In other words, the CN 10 identifies or determines the radio station 500 that allocates the radio resource, based on the location information.

For example, the location information is a cell identifier (cell ID). In this case, the radio station 500 securing the radio resource is identified based on the cell identifier. Note that the location information may include a plurality of cell identifiers, and a plurality of radio stations 500 may be identified.

Alternatively, the location information is Global Positioning System (GPS) information, or information indicating waypoints (hereinafter referred to as waypoint information) of the flight of the mobile terminal 600. For example, the waypoint information is also GPS information. In this case, the radio station 500 securing the radio resource is determined based on the GPS information or the waypoint information. Note that the location information may include GPS information of a plurality of positions or a plurality of pieces of waypoint information, and a plurality of radio stations 500 may be identified.

Session Attribute Information

For example, the first request message includes session attribute information necessary for communication between the mobile terminal 600 and the control apparatus 100. The session attribute information may be expressed as quality of service (QoS) information. The session attribute information may include information of a QoS profile indicating a type of resource and an amount of resources. The information of a QoS profile may include a 5G QoS identifier (5QI), allocation and retention priority (ARP), a reflective QoS attribute (RQA), a guaranteed flow bit rate (GFBR)—UL and DL, a maximum flow bit rate (MFBR)—UL and DL, and/or a maximum packet loss rate—UL and DL.

According to the location information as described above, the CN 10 can determine a desired radio station, and can request that a radio resource of a desired cell be allocated for the desired radio station.

(1-2) Request to Radio Station

For example, in response to reception of the first request message in the CN 10, the first CN node 200 (communication processing section 233) transmits the second request message for requesting the allocation of the radio resource to the radio station 500 securing the radio resource.

More specifically, for example, the control apparatus 100 (communication processing section 133) transmits the first request message to the second CN node 300, and the second CN node 300 (communication processing section 333) receives the first request message from the control apparatus 100. In response to reception of the first request message, the second CN node 300 (communication processing section 333) transmits a third request message for requesting the allocation of the radio resource to the first CN node 200, and the first CN node 200 (communication processing section 233) receives the third request message from the second CN node 300. In response to reception of the third request message, the first CN node 200 (communication processing section 233) transmits the second request message for requesting the allocation of the radio resource to the radio station 500, and the radio station 500 (first communication processing section 543) receives the second request message. In response to reception of the second request message, the radio station 500 (control section 541) performs the allocation of the radio resource.

Information Included in Third Request Message

For example, the third request message transmitted by the second CN node 300 includes the above-described information included in the first request message transmitted by the control apparatus 100.

Specifically, for example, the third request message includes the first identification information, the second identification information, the frequency information, the time period information, the location information, and/or the session attribute information.

For example, the first CN node 200 (control section 231) identifies or determines the radio station 500 securing the radio resource (that is, the radio station 500 to which the first CN node 200 transmits the second request message), based on the location information.

Information Included in Second Request Message

For example, the second request message transmitted by the second CN node 300 includes the above-described information included in the first request message and the third request message.

Specifically, for example, the second request message includes the first identification information, the second identification information, the frequency information, the time period information, and/or the session attribute information.

Note that two or more messages of the first request message, the second request message, and the third request message may include the same information. Two or more messages of the first request message, the second request message, and the third request message may be the same message.

(2) Response to Request for Allocation of Resource

The control apparatus 100 (communication processing section 133) receives a first response message for allocation of the radio resource. For example, the control apparatus 100 receives the first response message for allocation of the radio resource from the radio station 500 via the OAM. For example, the control apparatus 100 receives the first response message for the allocation of the radio resource from the CN 10.

In the following, an example of operation of a case in which the control apparatus 100 receives the first response message from the CN 10 will be described. An example of operation of a case in which the control apparatus 100 receives the first response message from the radio station 500 via the OAM will be described in (5) Second Example Alteration.

(2-1) Information Included in First Response Message

For example, the first response message includes information indicating whether or not the radio resource is allocated. More specifically, for example, the information is information indicating that the radio resource has been allocated (for example, information indicating "OK") or information indicating that the radio resource has not been allocated (for example, information indicating "Reject").

For example, the first response message may include information indicating an allocated radio resource.

(2-2) Response from Radio Station

For example, the radio station 500 (first communication processing section 543) transmits a second response message for the allocation of the radio resource to the first CN node 200, and the first CN node 200 (communication processing section 233) receives the second response message from the radio station 500. In response to reception of the second response message, the first CN node 200 (communication processing section 233) transmits a third response message for the allocation of the radio resource to the second CN node 300, and the second CN node 300 (communication processing section) receives the third response message from the first CN node 200. In response to reception of the third response message, the second CN node 300 (communication processing section) transmits the first response message to the control apparatus 100.

Information Included in Second Response Message

For example, the second response message transmitted by the radio station 500 includes the above-described information included in the first response message.

Specifically, for example, the second response message includes information indicating whether or not the radio resource is allocated. The second response message may include information indicating an allocated radio resource.

Information Included in Third Response Message

For example, the third response message transmitted by the first CN node 200 includes the above-described information included in the first response message and the second response message.

Specifically, for example, the third response message includes information indicating whether or not the radio resource is allocated. The third response message may include information indicating an allocated radio resource.

Note that two or more messages of the first response message, the second response message, and the third response message may include the same information. Two or more messages of the first response message, the second response message, and the third response message may be the same message.

(3) Flow of Processing

Overview

Figure 15:
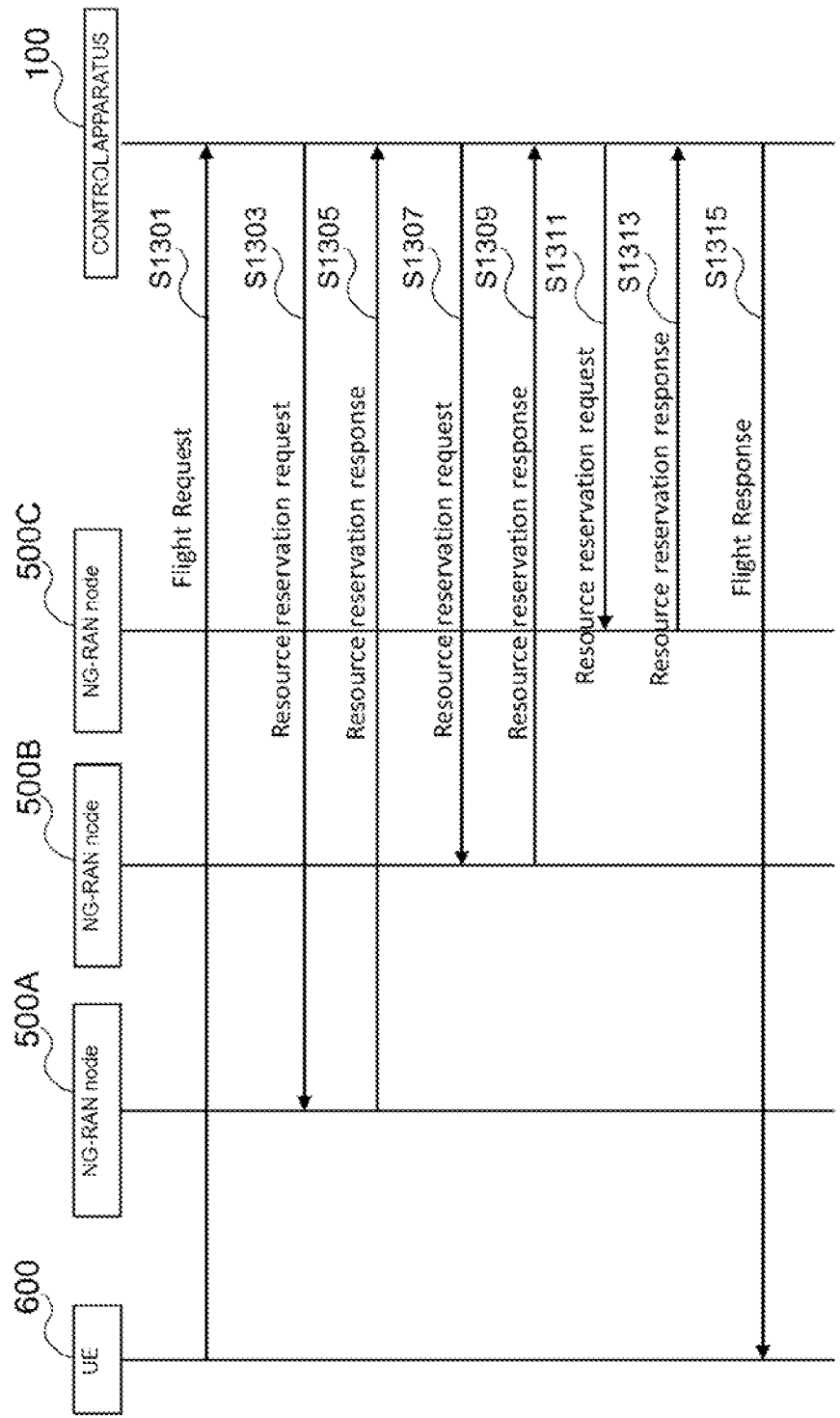
FIG. 15 is a first sequence diagram for illustrating an example of a schematic flow of processing of allocation of a radio resource according to a second example aspect.

FIG. 15 is a first sequence diagram for illustrating an example of a schematic flow of processing of allocation of a radio resource according to the second example aspect. The first sequence diagram is a schematic sequence diagram.

In FIG. 15, for the sake of better understanding, as a specific example, the radio station 500 is illustrated as an NG-RAN node, and the mobile terminal 600 is illustrated as a UE.

The UE 600 transmits a flight request for a flight of the UE 600 to the control apparatus 100 (S1301). The transmission is transmission in the application layer. The control apparatus 100 plans the flight in response to the flight request. For example, the control apparatus 100 determines a path of the flight.

A request message for requesting allocation of a radio resource for the UE 600 is transmitted from the control apparatus 100 to the NG-RAN node 500A (S1303). For example, the request message includes the first identification information, the second identification information, the frequency information, the time period information, and/or the location information. In addition, in the request message, flight related information and flight path information may be included.

In addition, a response message to the request message is transmitted from the NG-RAN node 500A to the control apparatus 100 (S1305). For example, the response message includes information indicating that the radio resource has been allocated.

Similarly to the NG-RAN node 500A, for each of the NG-RAN node 500B and the NG-RAN node 500C as well, the request message and the response message are transmitted and received (S1307 to S1313).

The control apparatus 100 transmits a response (flight response) to the flight request to the UE 600 (S1315). The transmission of the flight response is transmission in the application layer. For example, the flight response includes information indicating acceptance of the flight of the UE 600 (for example, information indicating "OK"). For example, the flight response includes the first identification information and the second identification information. Note that the flight response may include the flight path information and the flight related information for the mobile terminal 600 that are generated or acquired by the control apparatus 100. In this manner, the mobile terminal 600 may acquire the flight path information.

Note that, in the example of FIG. 15, "NG-RAN node" may be replaced by "radio station", and "UE" may be replaced by "mobile terminal".

Details

Figure 16:
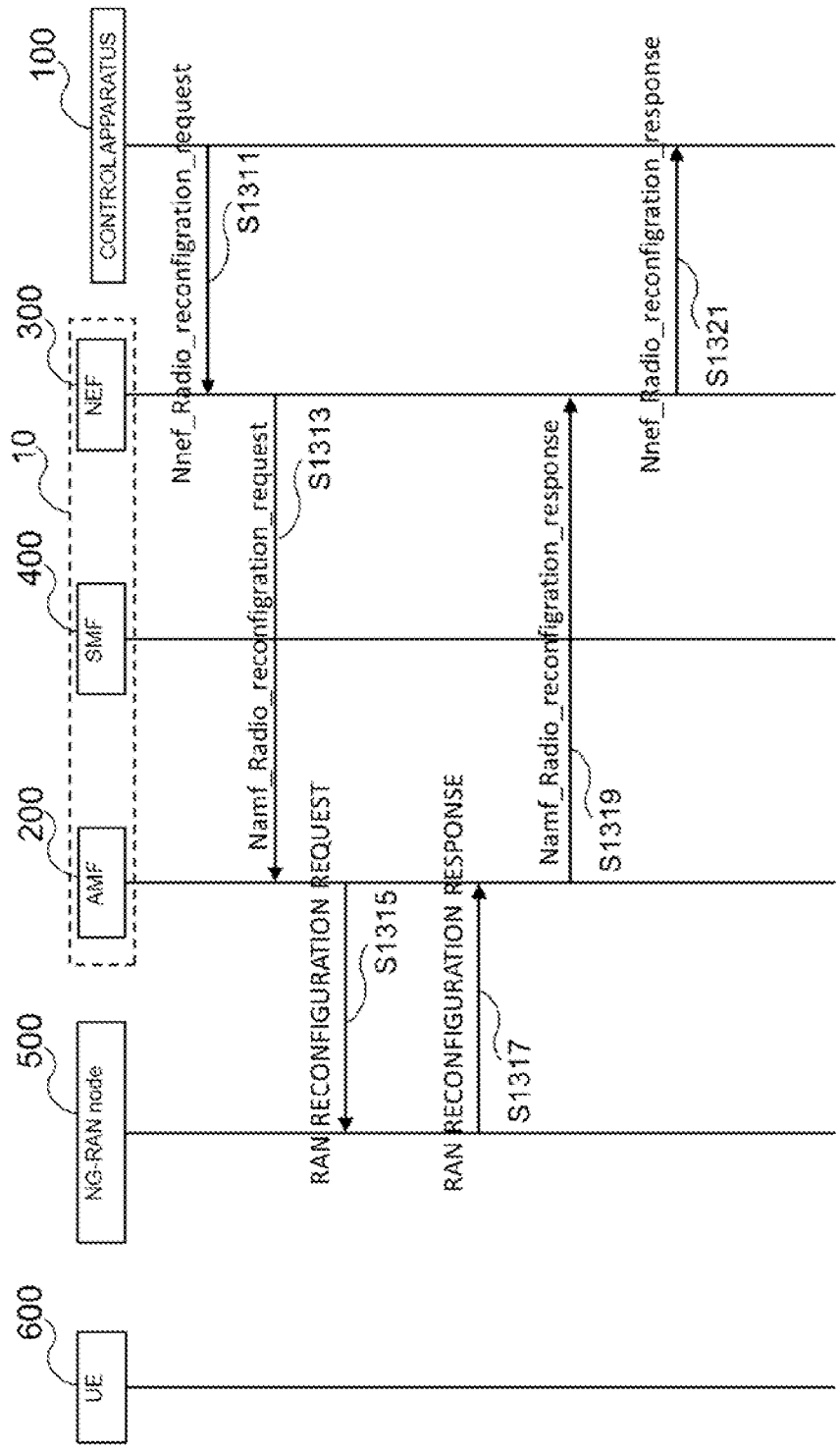
FIG. 16 is a second sequence diagram for illustrating an example of a schematic flow of processing of allocation of a radio resource according to the second example aspect.

FIG. 16 is a second sequence diagram for illustrating an example of a schematic flow of processing of allocation of a radio resource according to the second example aspect. The second sequence diagram is a sequence diagram illustrating an example of a case in which the control apparatus 100 receives the first response message for the allocation of the radio resource from the CN 10, and in particular, Steps S1303 and S1305 of the first sequence diagram illustrated in FIG. 15 will be described in further detail.

In FIG. 16, for the sake of better understanding, as a specific example, the radio station 500 is illustrated as an NG-RAN node, the first CN node 200 is illustrated as an AMF, the second CN node 300 is illustrated as an NEF, the third CN node 400 is illustrated as an SMF, and the mobile terminal 600 is illustrated as a UE.

The control apparatus 100 transmits the above-described first request message (for example, an Nnef_Radio_reconfiguration_request message or a message defined with another term) for requesting allocation of a radio resource for the UE 600 to the CN 10 (specifically, the NEF 300) (S1311).

In response to reception of the first request message (Nnef_Radio_reconfiguration_request message), the NEF 300 transmits the above-described third request message (for example, an Namf_Radio_reconfiguration_request message or a message defined with another term) for requesting allocation of a radio resource for the UE 600 to the AMF 200 (S1313). The NEF 300 determines the AMF 200 to which the third request message is to be transmitted, based on the first identification information configured for the first request message (Nnef_Radio_reconfiguration_request message).

In response to reception of the third request message (Namf_Radio_reconfiguration_request message), the AMF 200 transmits the above-described second request message (for example, the RAN RECONFIGURATION REQUEST message or a message defined with another term) for requesting allocation of a radio resource for the UE 600 to the NG-RAN node 500 (S1315).

Each of the Nnef_Radio_reconfiguration_request message, the Namf_Radio_reconfiguration_request message, and the RAN RECONFIGURATION REQUEST message includes the first identification information for identifying the UE 600, the second identification information for identifying a flight of the UE 600, the frequency information indicating a specific frequency band, the time period information indicating a specific time period, the location information indicating a position, and/or the session attribute information.

In response to reception of the RAN RECONFIGURATION REQUEST message, the NG-RAN node 500 allocates a radio resource for the UE 600. Then, the NG-RAN node 500 transmits the above-described second response message (for example, RAN RECONFIGURATION RESPONSE message or a message defined with another term) for the allocation of the radio resource to the AMF 200 (S1317).

The AMF 200 transmits the above-described third response message (for example, an Namf_Radio_reconfiguration_response message or a message defined with another term) for the allocation of the radio resource to the NEF 300 (S1319).

The NEF 300 transmits the above-described first response message (for example, an Nnef_Radio_reconfiguration_response message or a message defined with another term) for the allocation of the radio resource to the control apparatus 100 (S1321).

Each of the RAN RECONFIGURATION RESPONSE message, the Namf_Radio_reconfiguration_response message, and the Nnef_Radio_reconfiguration_response message includes, for example, information indicating that the radio resource has been allocated. Each of these messages may further include information indicating the allocated radio resource.

Note that, in the example of FIG. 16, "NG-RAN node" may be replaced by "radio station", "AMF" may be replaced by "first CN node", "NEF" may be replaced by "second CN node", "SMF" may be replaced by "third CN node", and "UE" may be replaced by "mobile terminal". Each of the messages illustrated in FIG. 16 may be replaced by "message".

Note that the NG-RAN node 500 that has allocated the radio resource may perform the following operation for operation of a self-organizing network (SON) defined in 3GPP, for example.

For example, when the NG-RAN node 500 that has allocated a radio resource receives a proposition of turning off a cell of an adjacent RAN node and/or the adjacent RAN node, the NG-RAN node 500 may transmit a negative response. This can prevent increase of the load of the NG-RAN node 500 that has allocated the radio resource based on the adjacent RAN node being turned off.

For example, the NG-RAN node 500 that has allocated the radio resource may transmit an activation request to a cell of an adjacent RAN node and/or an adjacent NG-RAN node 500 that are turned off in the SON. When the adjacent RAN node is activated, the load of the NG-RAN node 500 that has allocated the radio resource can be distributed, and stable communication can be provided for a flying UE.

(4) First Example Alteration

As described above, for example, the third request message is transmitted from the second CN node 300 to the first CN node 200, and the third response message is transmitted from the first CN node 200 to the second CN node 300. However, transmission of the third request message and the third response message is not limited to this example.

The second CN node 300 (communication processing section 333) may transmit the third request message to the third CN node 400 in response to reception of the first request message transmitted from the control apparatus 100. In response to reception of the third request message, the third CN node 400 (communication processing section 433) may transmit a further request message (fourth request message) for requesting allocation of a radio resource for the UE 600 to the first CN node 200.

In response to reception of the second request message transmitted from the radio station 500, the first CN node 200 (communication processing section 233) may transmit the third response message to the third CN node 400. In response to reception of the third response message, the third CN node 400 (communication processing section 433) may transmit a further response message (fourth response message) for the allocation of the radio resource to the second CN node 300.

(5) Second Example Alteration

As described above, for example, the request message and the response message for allocation of a radio resource are transmitted using signaling in the CN 10. However, transmission of the request message and the response message is not limited to this example.

The request message may be transmitted from the control apparatus 100 to the radio station 500 via the OAM. The response message may be transmitted from the radio station 500 to the control apparatus 100 via the OAM. In this case, the control apparatus 100 may be a node of the OAM.

Figure 17:
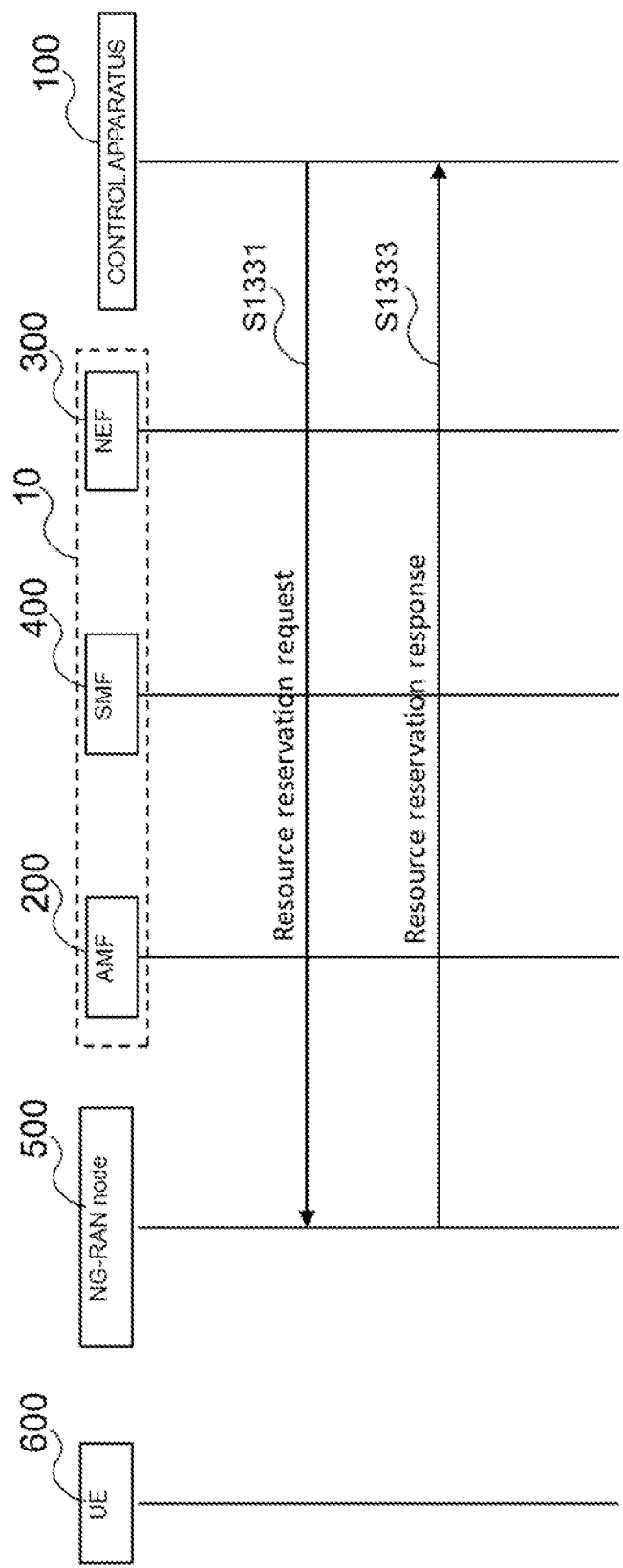
FIG. 17 is a sequence diagram for illustrating an example of a schematic flow of processing of allocation of a radio resource according to a second example alteration of a second example aspect.

FIG. 17 is a sequence diagram for illustrating an example of a schematic flow of processing of allocation of a radio resource according to the second example alteration of the second example aspect. In the sequence diagram, in particular, Steps S1303 and S1305 of the first sequence diagram illustrated in FIG. 15 will be described in further detail.

In FIG. 17, for the sake of better understanding, as a specific example, the radio station 500 is illustrated as an NG-RAN node.

The control apparatus 100 transmits a request message (for example, a resource allocation request message) for requesting allocation of a radio resource for the UE 600 to the NG-RAN node 500 via the OAM (S1331). For example, the request message includes the first identification information, the second identification information, the frequency information, the time period information, the location information, and/or the session attribute information (QoS information).

The NG-RAN node 500 transmits a response message (for example, a resource allocation response message) for the allocation of the radio resource to the control apparatus 100 via the OAM (S1333). For example, the response message includes information indicating that the radio resource has been allocated. The response message may further include information indicating the allocated radio resource.

Note that, in the example of FIG. 17, "NG-RAN node" may be replaced by "radio station".

In the above, the second example aspect is described. When allocation of a radio resource for the mobile terminal 600 moving according to the flight path information is not requested, the radio resource is not allocated, which may make it difficult for the mobile terminal 600 to continuously communicate during a flight. As a result, it may be difficult to appropriately control the flight of the mobile terminal 600 from the outside. In contrast, when allocation of a radio resource for the mobile terminal 600 is requested in advance according to the flight path information as described above, the radio resource on the flight path of the mobile terminal 600 is allocated in advance, and thus the mobile terminal 600 can more easily continuously communicate during a flight. As a result, it can be made easier to ensure the flight of the mobile terminal 600 and safety of crew members boarding the mobile terminal 600.

6. Third Example Aspect

Next, with reference to FIG. 18, the third example aspect of the present disclosure will be described.

(1) Request for Paging of Mobile Terminal

The control apparatus 100 (communication processing section 133) transmits a first request message for requesting paging of the mobile terminal 600 to the CN 10 for the sake of the flight for the mobile terminal 600 in which the radio resource is allocated.

(1-1) Information Included in Request Message

First Identification Information (Identification Information for Mobile Terminal 600)

For example, the first request message includes first identification information for identifying the mobile terminal 600. For example, the first identification information is a temporary UE ID.

Second Identification Information (Identification Information for Flight)

For example, the first request message includes second identification information for identifying the flight of the mobile terminal 600. For example, the second identification information is a flight ID or a flight number (that is normalized for each mobile terminal 600, for example).

Flight Related Information

For example, the first request message includes flight related information related to the flight of the mobile terminal 600.

Relationship between Flight Related Information and Flight Path Information

The flight related information is information that is stored and used in the CN 10 (for example, the first CN node 200, the second CN node 300, and/or the third CN node 400) and/or the radio station 500.

In contrast, the flight path information described above is information that is transmitted by the control apparatus 100 to the mobile terminal 600 and is used by the mobile terminal 600 for a flight. The flight path information may be generated by the control apparatus 100, or may be acquired from another apparatus by the control apparatus 100.

As described above, information including all or a part included in the flight path information may be referred to as a flight plan, a flight profile, or the like. Similarly, information including all or a part included in the flight related information may also be referred to as a flight plan, a flight profile, or the like. Alternatively, the flight path information itself or the flight related information itself may be referred to as a flight plan, a flight profile, or the like.

The flight related information may be the same as the flight path information described above. Alternatively, the flight related information may be different from the flight path information described above. For example, the flight related information may include the flight path information described above, or may be included in the flight path information described above. Alternatively, the flight related information may only partially overlap the flight path information described above, or may be completely different from the flight path information described above.

Flight Related Information Stored and Used in Each Node

The flight related information stored in each CN node (each of the first CN node 200, the second CN node 300, and the third CN node 400) may be the same as or different from the flight related information stored in another CN node. Each CN node may store the flight related information including information necessary for itself. The flight related information may be information such that at least one of the first identification information and the second identification information is identified in each CN node.

The flight related information stored and used in the radio station 500 may be different from the flight related information stored in the CN 10. The radio station 500 may store the flight related information including information necessary for itself. As an example, the radio station 500 may include information for its own cell, and the flight related information stored in the CN 10 may include information for cells of a plurality of radio stations 500. The flight related information may be information such that at least one of the first identification information and the second identification information is identified in the radio station 500.

Note that the flight related information stored and used in the radio station 500 may be the same as the flight related information stored in the CN 10.

Identification Information

The first identification information and the second identification information may be included in the flight related information, or may be included as another piece of information different from the flight related information in the first request message.

Path Information

For example, the flight related information includes path information indicating a path of the flight of the mobile terminal 600.

As a first example, the path information indicates, as a path of the flight, one or more cells on the path of the flight, and the one or more cells used by the mobile terminal 600 in the flight. In other words, the one or more cells are a list of cells (that is, a list of handovers) used by the mobile terminal 600 in the flight. In the case of the example of FIG. 3, the one or more cells are a list of four cells 50. The list may be a sequence of the cells (that is, a list of cells with order).

As a second example, the path information may indicate one or more waypoints of the flight as the path of the flight. The path information may indicate each of the one or more waypoints by using latitude, longitude, and altitude.

Note that the flight related information may include both of first path information indicating the one or more cells and second path information indicating the one or more waypoints.

Time Information

For example, the flight related information includes time information indicating time for the flight.

As a first example, the time information indicates time for the flight for each of the one or more cells (that is, one or more cells on the path of the flight, and the one or more cells used by the mobile terminal 600 in the flight). More specifically, for example, the time information indicates a time period in which the radio resource is allocated for the mobile terminal for each of the one or more cells.

For example, in the case of the example of FIG. 3, the radio resource is allocated for the mobile terminal 600 at the following time for four cells, and the flight related information includes time information indicating the following time for the four cells.

First cell 50:15:00-15:05
Second cell 50:15:02-15:10
Third cell 50:15:08-15:15
Fourth cell 50:15:12-15:20

These pieces of time information have a relationship that there is time information indicating each of time before and after time at which at least a part of time indicated by certain time information overlaps except time information including any time of the departure and destination points of the flight of the mobile terminal 600.

In addition or alternatively, the time information may indicate time at which the mobile terminal 600 enters and the time at which the mobile terminal 600 exits for each of the one or more cells. In addition or alternatively, the time information may indicate a time period in which the mobile terminal 600 passes through (or stays) for each of the one or more cells.

As a second example, the time information indicates time for the flight for one or more waypoints of the flight. More specifically, for example, the time information may indicate time at which the mobile terminal 600 passes through for each of one or more waypoints of the flight. The one or more waypoints may be a part of all the waypoints of the flight. Alternatively, the one or more waypoints may be all the waypoints of the flight. In addition or alternatively, the time information may indicate flight time of the mobile terminal 600 in one or more zones, and each of the one or more zones may be a zone between any two waypoints.

Velocity Information

The flight related information may include velocity information indicating velocity of the mobile terminal 600. For example, the velocity information may indicate horizontal velocity of the mobile terminal 600 and vertical velocity of the mobile terminal 600.

For example, the velocity information may indicate velocity of the mobile terminal 600 for each of one or more waypoints. Alternatively, the velocity information may indicate velocity of the mobile terminal 600 for one or more zones, and the one or more zones may be a zone between any two waypoints.

Frequency Information

The flight related information may include frequency information indicating a specific frequency band. The specific frequency band may be a frequency band used by the mobile terminal 600 in the flight.

The frequency information may indicate a plurality of frequency bands. The frequency information may indicate the plurality of frequency bands in order of priority. Note that, as an example, by giving high priority to a low frequency, radio connection with a flying mobile terminal can be stabilized.

Configuration Information

For example, the flight related information includes configuration information indicating a configuration for the mobile terminal 600.

For example, the configuration information indicates a configuration for the mobile terminal 600 for each of the one or more cells (that is, one or more cells on the path of the flight, and the one or more cells used by the mobile terminal 600 in the flight). For example, the configuration information is information included in a radio resource control (RRC) Reconfiguration message.

Session Attribute Information

For example, the flight related information includes attribute information of a session for communication in the flight of the mobile terminal 600. For example, the session attribute information includes information indicating quality of the session. As an example, the session is a packet data unit (PDU) session, and the session attribute information includes a quality of service (QoS) class identifier (QCI) or a 5G QoS identifier (5QI) for the PDU session.

Radio Resource Information

For example, the flight related information includes radio resource information indicating a radio resource for communication in the flight of the mobile terminal 600.

(1-2) Paging

For example, in response to reception of the first request message in the CN 10, the first CN node 200 (communication processing section 233) performs the paging of the mobile terminal 600 via the radio station 500.

More specifically, for example, the control apparatus 100 (communication processing section 133) transmits the first request message for requesting the paging to the second CN node 300, and the second CN node 300 (communication processing section 333) receives the first request message from the control apparatus 100. In response to reception of the first request message, the second CN node 300 (communication processing section 333) transmits a second request message for requesting the paging to the third CN node 400. In response to reception of the second request message, the third CN node 400 (communication processing section 433) transmits a further request message (third request message) to the first CN node 200, and the first CN node 200 (communication processing section 233) receives the third request message from the third CN node 400. In response to reception of the third request message, the first CN node 200 (communication processing section 233) performs the paging of the mobile terminal 600 via the radio station 500.

For example, each of the second request message and the third request message includes the first identification information, the second identification information, and/or the flight related information.

Note that two or more messages of the first request message, the second request message, and the third request message may include the same information. Two or more messages of the first request message, the second request message, and the third request message may be the same message.

Note that (1) Request for Paging of Mobile Terminal describes paging processing of paging the mobile terminal 600 from the control apparatus 100 (communication processing section 133). However, when the mobile terminal 600 is in a CM-CONNECTED state instead of a CM-IDLE state, a NOTIFICATION message is transmitted from the AMF 200 to the mobile terminal 600, and transmission of a Service request message from the mobile terminal 600 is prompted. In this case (1) Request for Paging of Mobile Terminal need not be executed.

(2) Request for Start of Communication

The mobile terminal 600 (communication processing section 635) transmits a message for requesting start of communication for the flight of the mobile terminal 600 in which a radio resource is allocated to the first CN node 200. For example, the message is a Service request message.

Transmission according to Paging

For example, the mobile terminal 600 (communication processing section 635) transmits the message for requesting start of the communication to the first CN node 200 according to the paging of the mobile terminal 600.

Transmission not Using Paging as Trigger

"(1) Request for Paging of Mobile Terminal" describes paging processing of paging the mobile terminal 600 from the control apparatus 100 (communication processing section 133). However, for example, the mobile terminal 600 may perform a configuration of a PDU session without receiving the paging processing described above. In that case, the configuration of the PDU session is started by the mobile terminal 600 transmitting the message (for example, the Service request message) for requesting start of the communication to the first CN node 200 according to at least one of the flight related information and the flight path information. For example, the mobile terminal 600 may transmit the message (for example, the Service request message) for requesting start of the communication to the first CN node 200 by using at least one of the flight path information and the flight related information included in the flight response received in S1315 in the second example aspect.

Configuration of Session

For example, in response to reception of the message, the first CN node 200 (the control section 231 and the communication processing section 233) configures a session for the mobile terminal 600 together with the third CN node 400. For example, the session is a packet data unit (PDU) session.

Transmission of Flight Related Information

For example, after receiving the message (for example, the Service request message) for requesting start of the communication, the first CN node 200 (communication processing section 233) transmits the flight related information to the radio station 500, and the radio station 500 (first communication processing section 543) receives the flight related information.

In addition, the radio station 500 (second communication processing section 545) may transmit the flight related information to the mobile terminal 600.

Transmission of Flight Path Information

The flight path information described above (that is, the information generated or acquired by the control apparatus 100 and used by the mobile terminal 600 for a flight) may be transmitted to the mobile terminal 600 after transmission of the message (for example, the Service request message) for requesting start of the communication. For example, when the message for requesting start of the communication is received in the first CN node 200, the CN 10 may notify the control apparatus 100. The control apparatus 100 may transmit the flight path information to the mobile terminal 600 according to the notification from the CN 10.

Alternatively, as described with reference to FIG. 15 in the second example aspect, the flight path information may be transmitted in advance in the flight response for the flight request from the mobile terminal 600. In this case, the mobile terminal 600 (communication processing section 635) may include the flight path information in the message (for example, the Service request message) for requesting start of the communication. In this manner, the mobile terminal 600 may provide the flight path information to the CN 10 (first CN node 200).

(3) Flow of Processing

Figure 18:
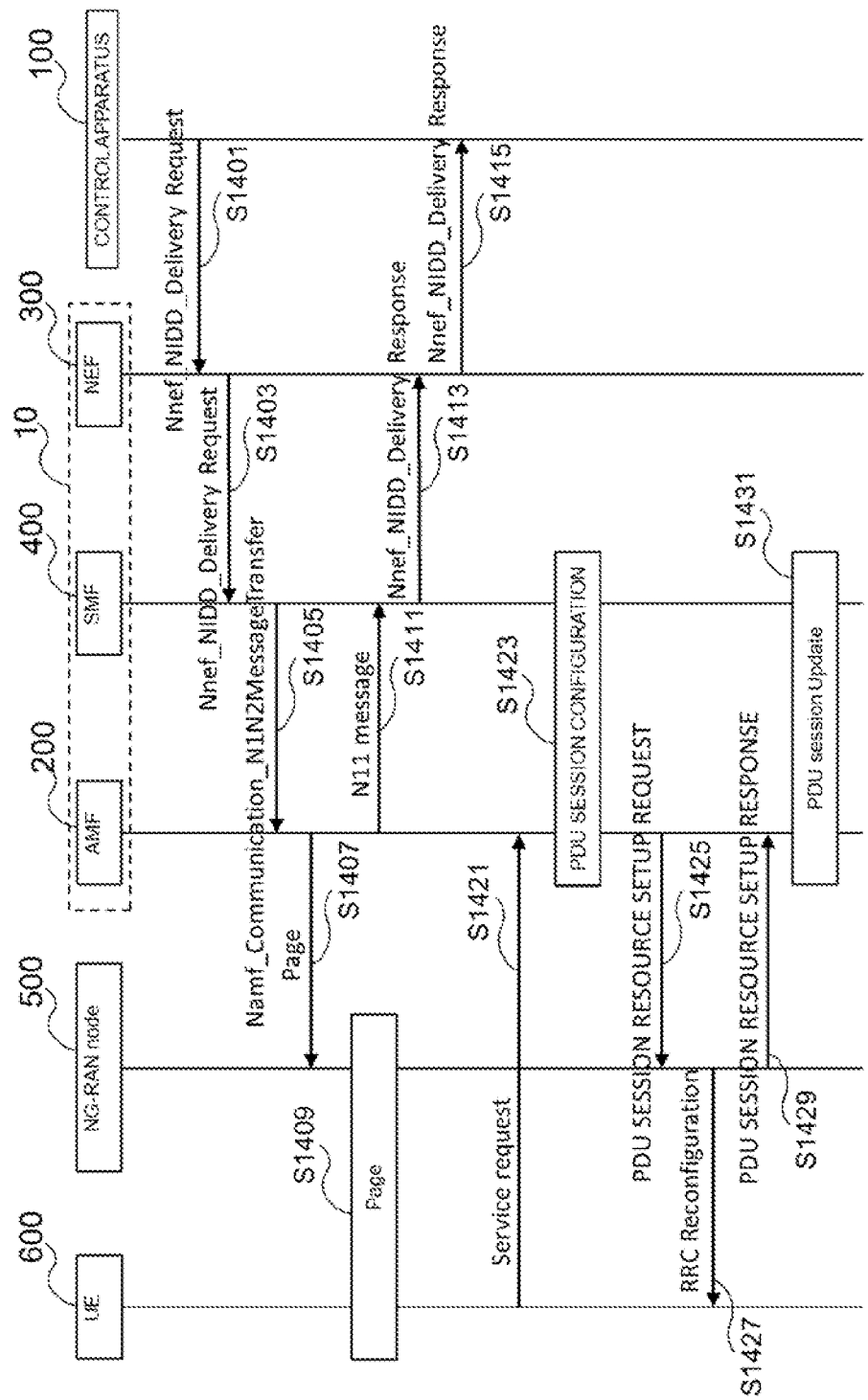
FIG. 18 is a sequence diagram for illustrating an example of a schematic flow of processing according to the third example aspect.

FIG. 18 is a sequence diagram for illustrating an example of a schematic flow of processing according to the third example aspect.

In FIG. 18, for the sake of better understanding, as a specific example, the radio station 500 is illustrated as an NG-RAN node, the first CN node 200 is illustrated as an AMF, the second CN node 300 is illustrated as an NEF, the third CN node 400 is illustrated as an SMF, and the mobile terminal 600 is illustrated as a UE.

The control apparatus 100 transmits the above-described first request message (for example, an Nnef_NIDD_Delivery Request message or a message defined with another term) for requesting paging of the UE 600 for a flight of the UE 600 and the flight in which a radio resource is allocated to the CN 10 (specifically, the NEF 300) (S1401).

In response to reception of the Nnef_NIDD_Delivery Request message, the NEF 300 transmits the above-described second request message (for example, the Nnef_NIDD_Delivery Request message or a message defined with another term) to the SMF 400 (S1403).

In response to reception of the Nnef_NIDD_Delivery Request message, the SMF 400 transmits the above-described third request message (for example, an Namf_Communication_N1N2MessageTransfer message or a message defined with another term) for requesting paging of the UE 600 to the AMF 200 (S1405).

Each of the Nnef_NIDD_Delivery Request message and the Namf_Communication_N1N2MessageTransfer message includes the first identification information for identifying the UE 600, the second identification information for identifying the flight of the UE 600, and/or the flight related information related to the flight of the mobile terminal 600.

In response to reception of the third request message (for example, the Namf_Communication_N1N2Message Transfer message or a message defined with another term), the AMF 200 performs paging of the UE 600 via the NG-RAN node 500 (S1407 and S1409).

The AMF 200 transmits an N11 message to the SMF 400 (S1411), the SMF 400 transmits an Nnef_NIDD_Delivery Response message to the NEF 300 (S1413), and the NEF 300 transmits the Nnef_NIDD_Delivery Response message to the control apparatus 100 (S1415).

The UE 600 transmits the Service request message to the AMF 200 (S1421).

The AMF 200 and the SMF 400 configure a PDU session for the UE 600 (S1423).

The AMF 200 transmits a PDU SESSION RESOURCE SETUP REQUEST message to the NG-RAN node 500 (S1425). The PDU SESSION RESOURCE SETUP REQUEST message includes the first identification information, the second identification information, and/or the flight related information.

The NG-RAN node 500 transmits an RRC Reconfiguration message to the UE 600 (S1427). The RRC Reconfiguration message may include the first identification information, the second identification information, and/or the flight related information.

The NG-RAN node 500 transmits a PDU SESSION RESOURCE SETUP Response message to the AMF 200 (S1429).

The AMF 200 and the SMF 400 update the PDU session (S1431).

Note that, in the example of FIG. 18, "NG-RAN node" may be replaced by "radio station", "AMF" may be replaced by "first CN node", "NEF" may be replaced by "second CN node", "SMF" may be replaced by "third CN node", and "UE" may be replaced by "mobile terminal". Each of the messages illustrated in FIG. 18 may be replaced by "message".

In the example of FIG. 18, when the UE 600 performs the configuration of the PDU session without receiving processing of the paging, each of the processes of S1401, S1403, S1405, S1407, S1409, S1411, S1413, and S1415 illustrated in FIG. 18 need not be executed, and it is only necessary that the UE 600 transmit the Service request message to the first CN node 200 (S1421).

(4) Example Alteration

As described above, for example, the second CN node 300 transmits the second request message to the third CN node 400, and the third CN node 400 transmits the third request message) to the first CN node 200. However, transmission of the request message is not limited to this example.

In response to reception of the first request message from the control apparatus 100, the second CN node 300 (communication processing section 333) may transmit the second request message to the first CN node 200. The first CN node 200 (communication processing section 233) may receive the second request message from the second CN node 300. In response to reception of the second request message, the first CN node 200 (communication processing section 233) may perform the paging of the mobile terminal 600 via the radio station 500.

The second request message may be the Namf_Communication_N1N2MessageTransfer message.

In the above, the third example aspect is described.

In the present example aspect, at least one of the mobile terminal 600 and the control apparatus 100 requests start of communication, based on at least one of the flight path information and the flight related information. At least one of the flight path information and the flight related information is information for securing that the radio resource in the flight path of the mobile terminal 600 is allocated, and thus by performing the request for start of communication based on these, the mobile terminal 600 may be able to more easily continuously communicate during a flight. As a result, it can be made easier to ensure the flight of the mobile terminal 600 and safety of crew members boarding the mobile terminal 600.

For example, when the paging of the mobile terminal 600 is not requested, the flight of the mobile terminal 600 is voluntarily started in the mobile terminal 600. Thus, it may be difficult for the control apparatus 100 to control the flight of the mobile terminal 600 from the start time point. In contrast, as described in (1) of the third example aspect, when the paging of the mobile terminal 600 is requested, the flight of the mobile terminal 600 is started in response to a request from the network. Thus, the control apparatus 100 is enabled to control the flight of the mobile terminal 600 from the start time point.

7. Fourth Example Aspect

Next, with reference to FIG. 19 to FIG. 31, the fourth example aspect of the present disclosure will be described.

The fourth example aspect is an example aspect for a handover of the mobile terminal 600 that moves according to the flight path information. The handover is a handover between two radio stations 500. In the following, a target radio station of the two radio stations 500 is referred to as a "first radio station 500A", and a source radio station of the two radio stations 500 is referred to as a "second radio station 500B".

(1) Procedure for Handover

The first radio station 500A (control section 541) controls a handover of the mobile terminal 600 that moves according to the flight path information, the handover being a handover according to the flight path information from the second radio station 500B (source radio station) to the first radio station 500A (target radio station). The second radio station 500B (control section 541) also controls the handover.

(1-1) Handover

Source Cell and Target Cell

As described above, the handover is a handover from the second radio station 500B to the first radio station 500A. To describe more specifically, for example, the handover is a handover from a cell (that is, a source cell) of the second radio station 500B to a cell (that is, a target cell) of the first radio station 500A. The second radio station 500B and the first radio station 500A may be the same radio station. In other words, the handover may be a handover between cells in the same radio station 500.

Handover according to Flight Path Information

As described above, the handover is a handover according to the flight path information. To describe more specifically, for example, the flight path information includes path information of the flight path of the mobile terminal 600 (for example, information indicating a waypoint), and the handover is a handover that is scheduled on the assumption that the mobile terminal 600 moves along the flight path.

Note that the flight path information may include information indicating a list of cells used in the flight of the mobile terminal 600, and the handover may be a handover between two cells included in the list. The handover may be a handover between cells indicated by information in which information indicating a waypoint indicates the same waypoint and indicating a cell associated with information indicated by each waypoint illustrated by the path information indicating the flight path of the mobile terminal 600, for example (between cells of the same frequency or between cells of different frequencies).

(1-2) Allocation of Radio Resource in First Radio Station

For example, the first radio station 500A (control section 541) allocates a radio resource for the mobile terminal 600 in the first radio station 500A.

More specifically, for example, the first radio station 500A (control section 541) allocates the radio resource, based on the flight related information related to the flight of the mobile terminal 600.

(a) Flight Related Information

For example, the flight related information includes information similar to the flight related information described in the third example aspect.

For example, the flight related information includes first identification information for identifying the mobile terminal 600. For example, the flight related information includes second identification information for identifying the flight of the mobile terminal 600.

For example, the flight related information includes the path information indicating the path of the flight of the mobile terminal 600, the time information indicating time for the flight of the mobile terminal 600, the velocity information indicating velocity of the mobile terminal 600, the frequency information indicating a specific frequency band, the configuration information indicating a configuration for the mobile terminal 600, the attribute information of a session for communication in the flight of the mobile terminal 600, and/or the radio resource information indicating a radio resource for communication in the flight of the mobile terminal 600. Detailed description of various pieces of information is, for example, similar to description of various pieces of information in the third example aspect. Thus, overlapping description is omitted herein. Note that various pieces of information are not limited to the example described in the third example aspect.

For example, in particular, the flight related information includes the path information, the time information, the configuration information, the session attribute information, and/or the radio resource information for one or more cells of the first radio station 500A on the path of the flight and the one or more cells used by the mobile terminal 600 in the flight (including a target cell).

Note that the relationship between the flight related information and the flight path information is, for example, similar to the relationship described in the third example aspect. Thus, overlapping description is omitted herein. Note that the relationship is not limited to the example described in the third example aspect.

Note that although the description in the third example aspect is referred to, the reference is merely reference for the sake of omitting description, and it should be noted that the fourth example aspect is not dependent on the third example aspect. The fourth example aspect may be independent of the third example aspect. Alternatively, the fourth example aspect may be combined with the third example aspect. When the fourth example aspect and the third example aspect are combined together, the flight related information in the fourth example aspect may be the same as the flight related information in the third example aspect.

(b) Method of Allocation of Resource

For example, the first radio station 500A (control section 541) may determine whether or not the radio resource can be allocated based on the flight related information, and allocate the radio resource based on the results. Note that the first radio station 500A (control section 541) may allocate the resource without performing the determination as to whether or not the radio resource can be allocated. An example thereof will be described later.

As an example, the first radio station 500A (control section 541) determines whether or not the radio resource can be allocated so that quality indicated by the session attribute information is satisfied at time indicated by the time information in each of one or more cells of the first radio station 500A indicated by the path information.

For example, the first radio station 500A (control section 541) determines that the radio resource can be allocated. In this case, the first radio station 500A (control section 541) allocates the radio resource.

For example, the first radio station 500A (control section 541) can determine that the radio resource cannot be allocated. The processing of this case will be described later in detail.

(c) Radio Resource

For example, the radio resource (allocated by the first radio station 500A) is a resource of at least one of time and frequency. In other words, the radio resource is a radio resource in a narrow sense. As an example, the radio resource is a time frequency resource.

Alternatively, the radio resource may include a resource of at least one of time and frequency (radio resource in a narrow sense) and a resource for processing of the first radio station 500A. In other words, the radio resource may be a radio resource in a broad sense. The resource for processing of the first radio station 500A may include a transport network layer (TNL) resource of the first radio station 500A, a processing load of the first radio station 500A, and/or the like.

(1-3) Transmission and Reception of Message

The first radio station 500A (first communication processing section 543) triggers (or starts; the same applies hereinafter) processing for transmitting a message including information (hereinafter referred to as acceptance information) related to acceptance of the handover to the second radio station 500B.

The message may be a message of X2AP or XnAP that the first radio station 500A directly transmits to the second radio station 500B, may be a message transmitted from the CN 10 to the second radio station 500B, or may be a message transmitted from the first radio station 500A to the second radio station 500B via the CN 10.

When the message is a message of X2AP or XnAP, the first radio station 500A may directly trigger the processing of transmitting the message to the second radio station 500B. When the message is a message transmitted from the CN 10 to the second radio station 500B, the first radio station 500A may trigger, for the CN 10, processing of requesting transmission of at least one of the message and another message including the message to the second radio station 500B. When the message is a message transmitted from the first radio station 500A to the second radio station 500B via the CN 10, the first radio station 500A may trigger processing of transmitting the message to the CN 10.

The second radio station 500B (first communication processing section 543) receives the message including the acceptance information.

For example, the message including the acceptance information is a message for notifying the second radio station 500B that the first radio station 500A is ready for the handover. As an example, the message including the acceptance information is a Handover Ready Notification message. As a matter of course, the message including the acceptance information may be a message with another term (for example, a Handover Preparation Notification message, a Handover Allowance Indication message, or the like).

(a) Example of Transmission Method

Direct Transmission

The message including the acceptance information may be directly transmitted from the first radio station 500A to the second radio station 500B.

The first radio station 500A (first communication processing section 543) may directly transmit the message including the acceptance information to the second radio station 500B.

The second radio station 500B (first communication processing section 543) may receive the message including the acceptance information from the first radio station 500A.

Figure 19:
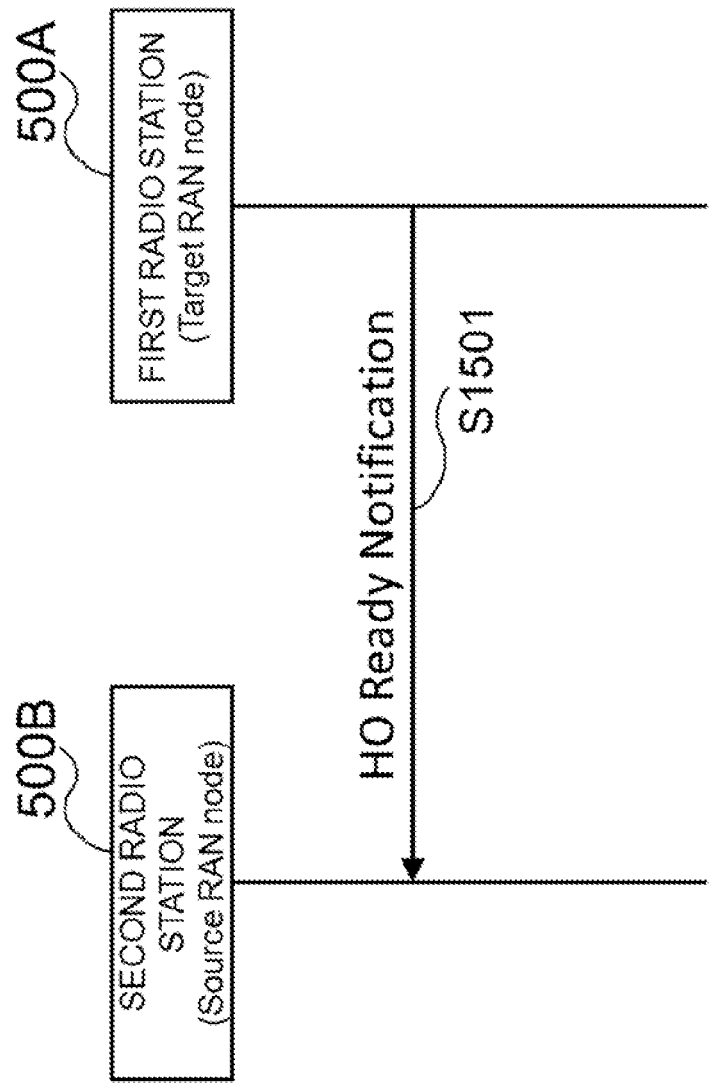
FIG. 19 is a sequence diagram for illustrating a first example of transmission of a Handover Ready Notification message according to a fourth example aspect.

FIG. 19 is a sequence diagram for illustrating an example of direct transmission of transmission of the message (for example, the Handover Ready Notification message or a message defined with another term) including the acceptance information according to the fourth example aspect. The first radio station 500A (target RAN node) transmits the message (for example, the Handover Ready Notification message or a message defined with another term) including the acceptance information to the second radio station 500B (source RAN node) (S1501).

Indirect Transmission

The message including the acceptance information may be transmitted from the first radio station 500A to the second radio station 500B via the first CN node 200. In other words, the message including the acceptance information may be transmitted from the first radio station 500A to the first CN node 200, and may be transmitted from the first CN node 200 to the second radio station 500B.

The first radio station 500A (first communication processing section 543) may transmit the message including the acceptance information to the second radio station 500B via the first CN node 200. In other words, the first radio station 500A (first communication processing section 543) may transmit the message including the acceptance information to the first CN node 200, and the first CN node 200 may transmit the message including the acceptance information to the second radio station 500B. The first CN node 200 may transmit the message itself including the acceptance information to the second radio station 500B. Alternatively, the first CN node 200 may transmit another message including the message including the acceptance information to the second radio station 500B. As an example, the message including the acceptance information may be encapsulated in such another message. In this case, the message including the acceptance information may be included in a transparent container in such another message.

The second radio station 500B (first communication processing section 543) may receive the message including the acceptance information from the first CN node 200 receiving the message including the acceptance information from the first radio station 500A.

Figure 20:
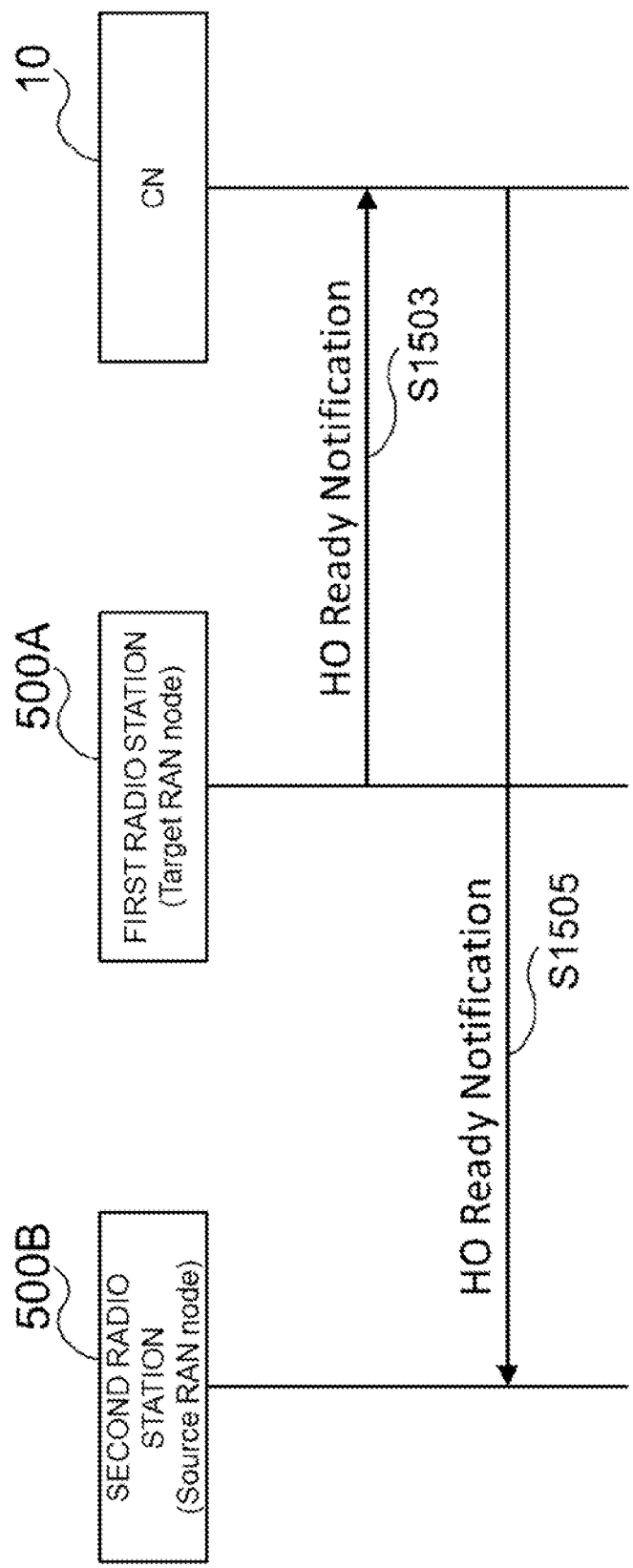
FIG. 20 is a sequence diagram for illustrating a second example of transmission of the Handover Ready Notification message according to the fourth example aspect.

FIG. 20 is a sequence diagram for illustrating an example of indirect transmission of transmission of the message (for example, the Handover Ready Notification message or a message defined with another term) including the acceptance information according to the fourth example aspect. The first radio station 500A (target RAN node) transmits the message including the acceptance information (the Handover Ready Notification message or a message defined with another term) to the CN 10 (first CN node 200) (S1503). The CN 10 (first CN node 200) transmits the message including the acceptance information (the Handover Ready Notification message or a message defined with another term) to the second radio station 500B (source RAN node) (S1505). Note that the CN 10 (first CN node 200) may transmit the Handover Ready Notification message itself to the second radio station 500B (source RAN node). Alternatively, the CN 10 (first CN node 200) may transmit another message including the Handover Ready Notification message to the second radio station 500B (source RAN node).

Additional Notes

The first radio station 500A may transmit another message to the first CN node 200 in order to trigger transmission of the message including the acceptance information. In such another message, at least one of the acceptance information and the message including the acceptance information may be included. When the CN node 200 receives another message triggering transmission of the message including the acceptance information, the CN node 200 may transmit the message including the acceptance information to the second radio station 500B.

The first radio station 500A (first communication processing section 543) may cause the first CN node 200 to transmit the message including the acceptance information to the second radio station 500B by transmitting, to the first CN node 200, another message triggering transmission of the message including the acceptance information from the first CN node 200 to the second radio station 500B. In other words, the first CN node 200 may perform processing of transmitting the message in response to reception of such another message.

The second radio station 500B (first communication processing section 543) may receive the message including the acceptance information from the first CN node 200 receiving such another message from the first radio station 500A.

As an example, the message including the acceptance information may be the Handover Ready Notification message, and such another message may be a Handover Ready Indication message.

Figure 21:
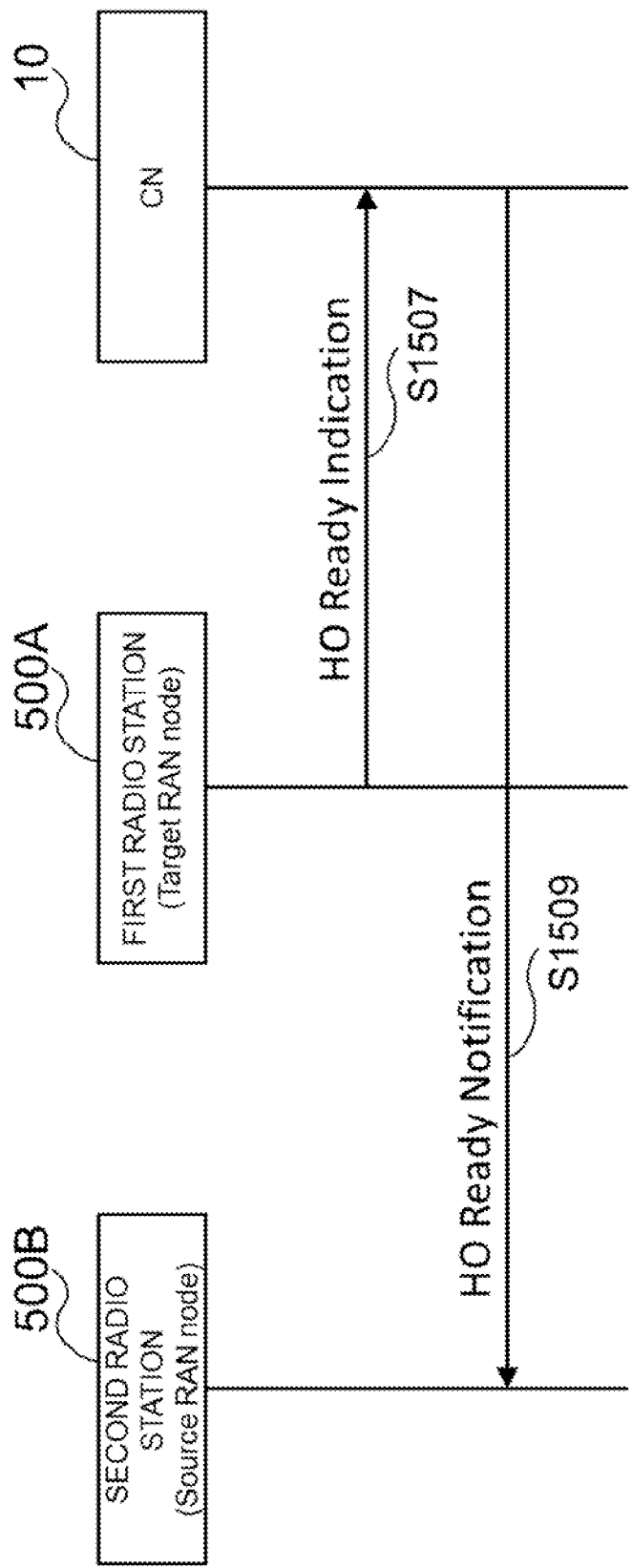
FIG. 21 is a sequence diagram for illustrating a third example of transmission of the Handover Ready Notification message according to the fourth example aspect.

FIG. 21 is a sequence diagram for illustrating another example of transmission of a message (for example, the Handover Ready Notification message or a message defined with another term) including the acceptance information according to the fourth example aspect. The first radio station 500A (target RAN node) transmits a message (for example, the Handover Ready Indication message or a message defined with another term) including the acceptance information to the CN 10 (first CN node 200) (S1507). The CN 10 (first CN node 200) transmits a message (for example, the Handover Ready Notification message or a message defined with another term) including the acceptance information to the second radio station 500B (source RAN node) (S1509).

(b) Transmission without Reception of Request Message

The first radio station 500A (first communication processing section 543) triggers processing for transmitting the message including the acceptance information to the second radio station 500B without receiving a request message for the handover transmitted from the second radio station 500B.

The second radio station 500B (first communication processing section 543) receives the message including the acceptance information without transmitting the request message for the handover.

For example, the second radio station 500B (first communication processing section 543) may transmit the request message for the handover when receiving the message including the acceptance information without transmitting (that is, even without transmitting) a request message for the handover before receiving the message including the acceptance information.

For example, the first radio station 500A (first communication processing section 543) may receive the request message for the handover transmitted from the second radio station 500B when transmitting the message including the acceptance information to the second radio station 500B without receiving (that is, even without receiving) the request message for the handover transmitted from the second radio station 500B before transmitting the message including the acceptance information for the second radio station 500B to the second radio station 500B.

For example, the request message for the handover is a Handover Request message, and a response message for the request message for the handover is a Handover Request Acknowledge message.

(c) Acceptance Information

Information for Allocation of Radio Resource

For example, the acceptance information includes information indicating that the radio resource is allocated for the mobile terminal 600.

Specifically, for example, when the first radio station 500A (control section 541) determines that the radio resource can be allocated, and allocates the radio resource, the acceptance information includes the information indicating that the radio resource is allocated.

Alternatively, the acceptance information may include information indicating that the radio resource for the mobile terminal 600 in the first radio station 500A is not allocated.

Specifically, when the first radio station 500A (control section 541) determines that the radio resource cannot be allocated, the acceptance information may include information indicating that the radio resource cannot be allocated.

Information related to Target Cell

The acceptance information may include information related to a target cell of the handover (that is, a cell of the first radio station 500A).

Specifically, for example, the information related to the target cell may include identification information (cell ID) for identifying the target cell. For example, the information related to the target cell may include information related to a frequency band of the target cell. The information may be any one of or a combination of a carrier frequency of the target cell, a frequency band, and information related to a synchronization signal. The information related to a synchronization signal may be information indicating a frequency position of an SS/PBCH Block (SSB).

(1-4) Flow of Processing

Figure 22:
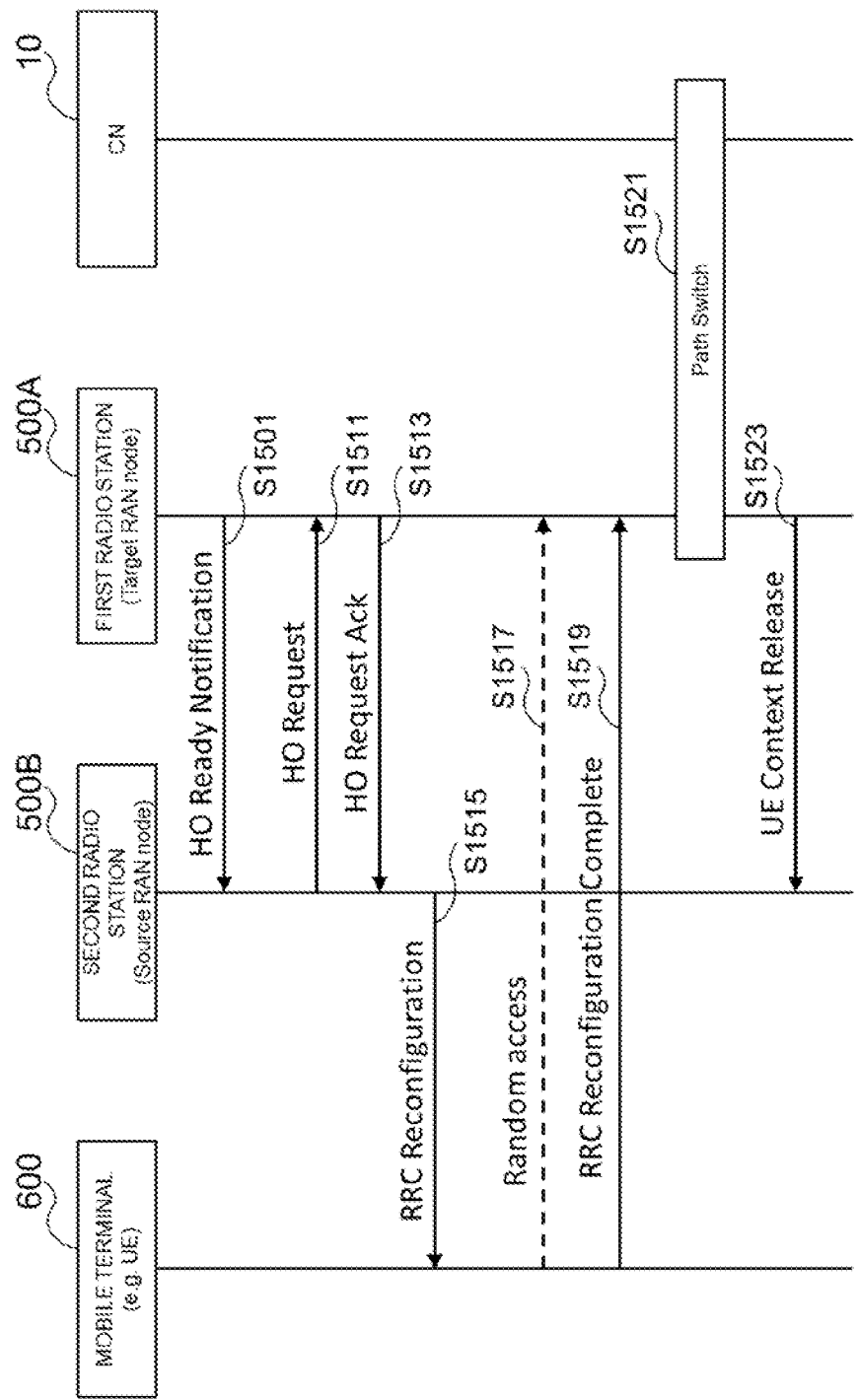
FIG. 22 is a sequence diagram for illustrating an example of a schematic flow of processing of a handover according to the third example aspect.

FIG. 22 is a sequence diagram for illustrating an example of a schematic flow of processing of a handover according to the fourth example aspect.

The processing is processing of a handover of the mobile terminal 600 from the second radio station 500B (source radio station) to the first radio station 500A (target radio station). For example, the processing is started after it is confirmed or determined that the radio resource for the mobile terminal 600 in the first radio station 500A is allocated, or after it is confirmed or determined that acceptance of the handover of the mobile terminal 600 is possible.

As described with reference to FIG. 19, the first radio station 500A transmits a Handover Ready Notification message to the second radio station 500B (S1501). The Handover Ready Notification message includes information (acceptance information) related to acceptance of the handover.

In response to reception of the Handover Ready Notification message, the second radio station 500B transmits a Handover Request message to the first radio station 500A (S1511).

In response to reception of the Handover Request message, the first radio station 500A transmits a Handover Request Acknowledge message to the second radio station 500B (S1513).

In response to reception of the Handover Request Acknowledge message, the second radio station 500B transmits an RRC Reconfiguration message to the mobile terminal 600 (S1515).

The mobile terminal 600 performs random access to the target cell (cell of the first radio station 500A) (S1517). In addition, the mobile terminal 600 transmits an RRC Reconfiguration Complete message to the first radio station 500A (S1519).

The first radio station 500A and the CN 10 perform path switch (S1521). The first radio station 500A transmits a UE Context Release message to the second radio station 500B (S1523).

(1-5) First Example Alteration

As described above, for example, the first radio station 500A (control section 541) determines whether or not the radio resource can be allocated based on the flight related information, and allocates the radio resource based on the results. However, the fourth example aspect is not limited to this example.

The first radio station 500A (control section 541) may invariably allocate the radio resource without determining whether or not the radio resource can be allocated.

(For example, according to the method as described in the second example aspect, or another method,) allocation of the radio resource for the mobile terminal 600 may be allocated in advance in a time (or a time frame) when the mobile terminal 600 uses or passes through at the time of planning a flight. In such a case, for example, the radio resource may be invariably allocated.

In this case, the acceptance information may not include information indicating that the radio resource for the mobile terminal 600 is allocated or information indicating that the radio resource for the mobile terminal 600 in the first radio station 500A cannot be allocated, and may include information related to the target cell of the handover (that is, a cell of the first radio station 500A).

(1-6) Second Example Alteration

As described above, for example, the second radio station 500B (first communication processing section 543) may transmit the request message for the handover after receiving the message including the acceptance information without transmitting the request message for the handover before receiving the message including the acceptance information. For example, the first radio station 500A (first communication processing section 543) may receive the request message for the handover transmitted from the second radio station 500B when transmitting the message including the acceptance information to the second radio station 500B without receiving the request message for the handover transmitted from the second radio station 500B before transmitting the message including the acceptance information for the second radio station 500B to the second radio station 500B. However, the fourth example aspect is not limited to this example.

The second radio station 500B (first communication processing section 543) need not transmit the request message for the handover even after receiving the message including the acceptance information not only before receiving the message including the acceptance information.

The first radio station 500A (first communication processing section 543) may be configured not to receive the request message for the handover transmitted from the second radio station 500B even after transmitting the message including the acceptance information to the second radio station 500B not only before transmitting the message including the acceptance information for the second radio station 500B to the second radio station 500B.

In such a case, the message including the acceptance information may trigger execution of the handover by the second radio station 500B and the mobile terminal 600 instead of a response message (for example, the Handover Request Acknowledge message) to the request message for the handover. For example, the message including the acceptance information may trigger transmission of the message for execution of the handover by the second radio station 500B to the mobile terminal 600. In other words, in response to reception of the message including the acceptance information, the second radio station 500B (second communication processing section 545) may transmit the message for execution of the handover to the mobile terminal 600. The message for execution of the handover may be an RRC Reconfiguration message, or may be another message.

As described above, the acceptance information may include information related to a target cell of the handover (that is, a cell of the first radio station 500A). In particular, in the second example alteration, the information related to the target cell may include information indicating a configuration for the mobile terminal 600 in the target cell. The information indicating the configuration may be information included in the message (for example, the RRC Reconfiguration message) for execution of the handover.

With reference to FIG. 22 again, in the second example alteration, the transmission the Handover Request (S1511) and the transmission of the Handover Request Acknowledge (S1513) need not be performed. In other words, according to reception of the Handover Ready Notification message (S1501), the second radio station 500B may transmit the RRC Reconfiguration message to the mobile terminal 600 (S1515).

According to the second example alteration, for example, signaling can be reduced in the handover procedure, and the handover procedure can be more promptly performed.

(1-7) Third Example Alteration (For example, as described with reference to FIG. 22,) the procedure for the handover according to the fourth example aspect is started by the first radio station 500A. However, the fourth example aspect is not limited to the example as described above.

The procedure for the handover according to the fourth example aspect may be started by the first CN node 200.
Operation of First CN Node 200

The first CN node 200 (control section 231) may generate a request message for the handover. The first CN node 200 (communication processing section 233) may transmit the request message to the first radio station 500A without receiving the request message from the second radio station 500B. In other words, the request message is generated by the first CN node 200, and is transmitted to the first radio station 500A, without being transmitted from the second radio station 500B to the first CN node 200.

(For example, according to the method described in the third example aspect, or another method,) the first CN node 200 may store the flight related information, and the first CN node 200 (control section 231) may determine start of the handover based on the flight related information. As an example, the first CN node 200 (control section 231) may determine start of the handover, based on the time information included in the flight related information.
Operation of First Radio Station 500A The request message may trigger that the second radio station 500B transmits a message including information (acceptance information) related to acceptance of the handover, even if the first radio station 500A does not receive a request message for the handover transmitted from the second radio station 500B.

Figure 23:
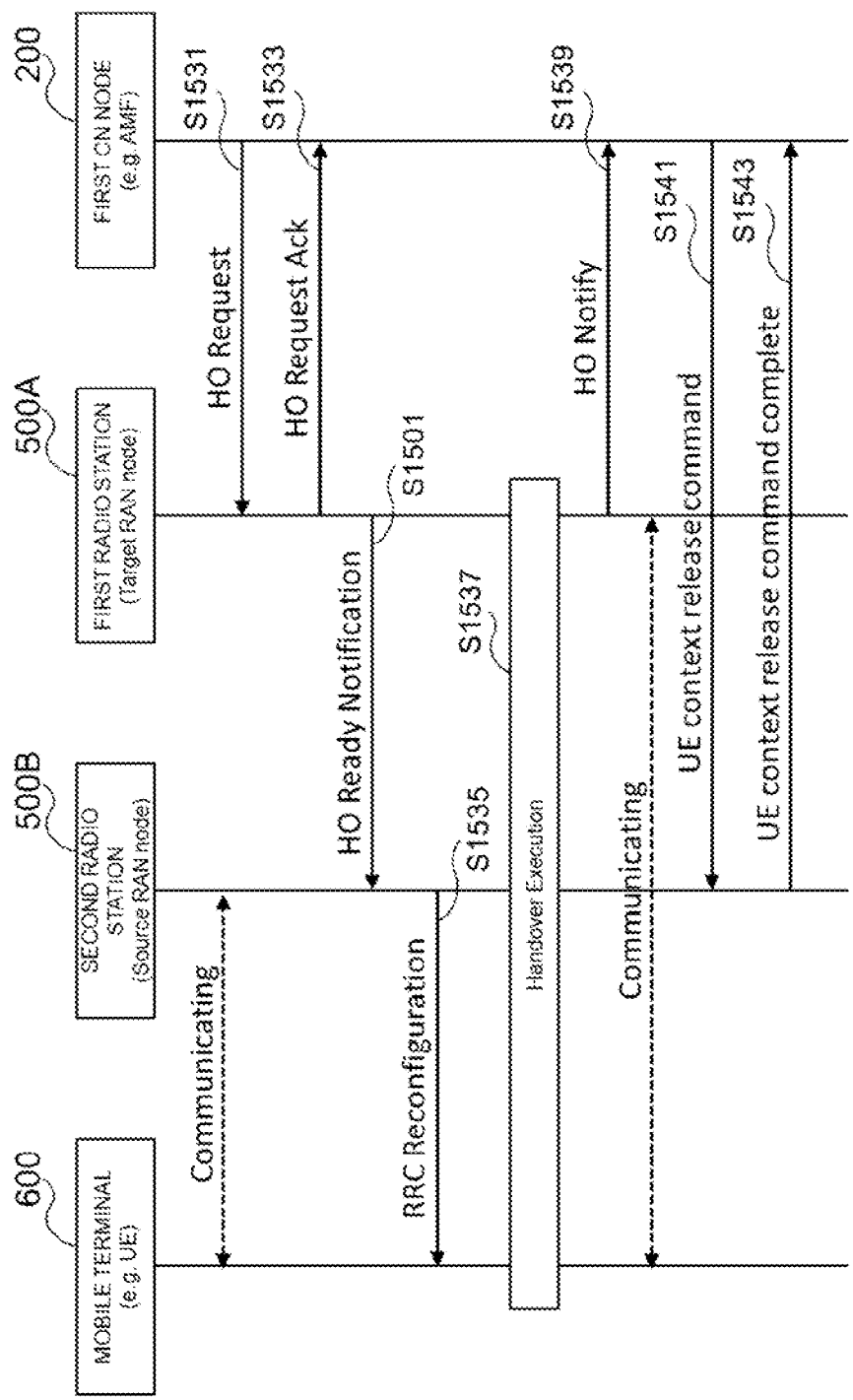
FIG. 23 is a sequence diagram for illustrating an example of a schematic flow of processing of a handover according to a third example alteration of the third example aspect.

The first radio station 500A (first communication processing section 543) may receive the request message transmitted from the first CN node 200, and transmit the message including the acceptance information to the second radio station 500B in response to reception of the request message transmitted from the first CN node 200.
Message The request message transmitted by the first CN node 200 may be a Handover Request message, and the message including the acceptance information transmitted by the first radio station 500A may be a Handover Ready Notification message. The request message transmitted by the first CN node 200 may include the flight related information and the flight path information.
Flow of Processing FIG. 23 is a sequence diagram for illustrating an example of a schematic flow of processing of the handover according to the third example alteration of the fourth example aspect.

The processing is processing of a handover of the mobile terminal 600 from the second radio station 500B (source radio station) to the first radio station 500A (target radio station).

The first CN node 200 determines start of the handover, generates a Handover Request message, and transmits the Handover Request message to the first radio station 500A (S1531).

In response to reception of the Handover Request message, the first radio station 500A transmits a Handover Request Acknowledge message to the first CN node 200 (S1533).

As described with reference to FIG. 19, the first radio station 500A transmits a Handover Ready Notification message to the second radio station 500B (S1501). The Handover Ready Notification message includes information (acceptance information) related to acceptance of the handover. The acceptance information includes information indicating a configuration for the mobile terminal 600 in a target cell of the handover.

In response to reception of the Handover Ready Notification message, the second radio station 500B transmits an RRC Reconfiguration message to the mobile terminal 600 (S1535). The RRC Reconfiguration message includes the information indicating the configuration.

Alternatively, the second radio station 500B may transmit a Handover Ready Notification message to the mobile terminal 600, instead of the RRC Reconfiguration message. The Handover Ready Notification message may include the information indicating the configuration.

The mobile terminal 600, the first radio station 500A, and the second radio station 500B executes the handover (S1537).

The first radio station 500A transmits a Handover Notify message to the first CN node 200 (S1539). The first CN node 200 may adjust timing of transmission of the next Handover Request message, based on reception of the Handover Notify message.

The mobile terminal 600 communicates with the first radio station 500A.

The first CN node 200 transmits a UE context release command message to the second radio station 500B (S1541), and the second radio station 500B transmits a UE context release command complete message to the first CN node 200 (S1543).
Allocation of Radio Resource (For example, according to the method as described in the second example aspect, or another method,) the radio resource for the mobile terminal 600 may be allocated in advance at the time of planning a flight. In such a case, for example, the request message (for example, the Handover Request message) transmitted by the first CN node 200 for the handover may be invariably accepted without being rejected.

According to the third example alteration, for example, all of the handovers of the flight of the mobile terminal 600 can be collectively controlled in the CN 10.

(1-8) Fourth Example Alteration

The handover may be a conditional handover (CHO), instead of a normal handover.

In the conditional handover (CHO), the source radio station (second radio station 500B) transmits a handover request message (CHO request) of the mobile terminal 600 for the target radio station (first radio station 500A) earlier than the conventional handover. For example, in order that a trigger for executing a measurement report from a terminal is applied earlier than the conventional handover, the source radio station may configure an offset value or a threshold (e.g., RSRP Threshold, RSRQ Threshold) related to radio quality of the target cell (and radio quality of the source cell) to be small in configuration of an event (e.g., Event Ax, Bx defined in LTE or NR) for the measurement report. Then, when the source radio station receives the measurement report, the source radio station may transmit the handover request message (CHO request). The target radio station transmits a response message (CHO request acknowledgement) for the handover request including a target cell configuration (CHO Configuration) for the CHO of the mobile terminal 600 to the source radio station. The source radio station transmits the target cell configuration to the mobile terminal 600 together with an execution condition of the CHO (CHO execution condition). Then, the mobile terminal 600 determines whether or not the execution condition of the CHO is satisfied, and when it is satisfied, the mobile terminal 600 initiates (executes) the handover to the target cell.

Here, the configuration of the target cell may be, for example, a bearer configuration, or a radio resource configuration (cell group configuration, radio resource configuration). The execution condition of the CHO may be, for example, specified by a relationship of radio quality (for example, RSRP, RSRQ, SINR) between the source cell and the target cell. Examples thereof may include a case in which the radio quality of the target cell has become larger than the radio quality of the source cell by a predetermined (or specified) offset value, or a case in which such a situation has continued for a predetermined (or specified) period of time. Instead, it may be specified for the radio quality of any one of the source cell and the target cell. Examples thereof may include a case in which the radio quality of the target cell has become a predetermined (or specified) absolute value, or a case in which such a situation has continued for a predetermined (or specified) period of time.

Note that the source radio station may simultaneously indicate a plurality of target cells (candidates) for the mobile terminal 600, and notify each of the target cells (candidates) of an individual execution condition of the CHO and target cell configuration. The plurality of target cells may be a plurality of cells managed by one target radio station, or may be specified over a plurality of different target radio stations. In contrast, when a plurality of target cells (candidates) are indicated, the mobile terminal 600 may determine whether or not the respectively notified execution conditions of the CHO are satisfied, and may execute the handover for the target cell (candidate) that satisfies the execution condition of the CHO.

The acceptance information may include information related to the target cell configuration for the conditional handover (CHO). As described above, the acceptance information may include the information related to the target cell, the information related to the target cell may include information related to the target cell configuration for the CHO, and those may be equivalent (that is, may be replaced). In this manner, the condition information may be transmitted to the second radio station 500B.

In addition, as described above, the second radio station 500B (second communication processing section 545) may transmit message (for example, the RRC Reconfiguration message) for execution of the handover to the mobile terminal 600, and the message of execution of the handover may include the condition information. In this manner, the condition information may be transmitted to the mobile terminal 600.

The mobile terminal 600 (communication control section 633) may control the handover, based on the condition information. For example, the mobile terminal 600 (communication control section 633) may determine whether or not to perform random access to the target cell, based on the condition information.

Through the conditional handover as described above, for example, the mobile terminal 600 is enabled to more securely maintain connection with the network.

In the above, the procedure for the handover in the fourth example aspect is described. When the message including the acceptance information is not transmitted to the second radio station 500B, as with a general procedure, the second radio station 500B transmits a request message for the handover without knowing whether or not the radio resource for the mobile terminal 600 in the first radio station 500A is allocated. Thus, even if the request message is transmitted, the radio resource is not necessarily allocated, and the mobile terminal 600 may not necessarily be able to communicate in the target cell during a flight. In contrast, when the message including the acceptance information is transmitted to the second radio station 500B as described above, the second radio station 500B can start execution of the handover without transmitting a request message for the handover or transmitting the request message, knowing that the radio resource for the mobile terminal 600 in the first radio station 500A is allocated. Thus, the mobile terminal 600 is enabled to more securely communicate in the target cell during a flight. As a result, it can be made easier to ensure the flight of the mobile terminal 600 and safety of crew members boarding the mobile terminal 600.

(2) Change of Flight Path (2-1) Determination of Allocation of Radio Resource in First Radio Station As described above, for example, the first radio station 500A (control section 541) determines whether or not the radio resource for the mobile terminal 600 in the first radio station 500A can be allocated.

For example, the first radio station 500A (control section 541) determines that the radio resource can be allocated, or determines that the radio resource cannot be allocated.

(2-2) Change of Flight Path

For example, when the radio resource cannot be allocated, the first radio station 500A (first communication processing section 543) performs a change of the flight path of the mobile terminal 600.

The change of the flight path is a change of the flight path of the mobile terminal 600 in a coverage area of the first radio station 500A.

The changed flight path of the mobile terminal 600 may be referred to as an alternative path, and it can be said that the change of the flight path of the mobile terminal 600 is selection of the alternative path. The change of the flight path of the mobile terminal 600 (that is, selection of the alternative path) may be referred to as re-routing.

First Example

As a first example, the change of the flight path may be a change of a cell in which the mobile terminal 600 uses the radio resource.

More specifically, for example, the change of the flight path may be a change of a cell in which the mobile terminal 600 uses the radio resource such that the change does not include a change of a waypoint of the mobile terminal 600. As an example, when a radio resource of a first cell of a first frequency band cannot be allocated but a radio resource of a second cell of a first frequency band or a second frequency band geographically overlapping the first cell can be allocated, the cell in which the mobile terminal 600 uses the radio resource is changed from the first cell to the second cell.

Second Example

As a second example, the change of the flight path may be a change of the waypoint of the mobile terminal 600.

More specifically, along with the change of the waypoint of the mobile terminal 600, the cell in which the mobile terminal 600 uses the radio resource may also be changed. As an example, when a radio resource of the first cell (for example, a cell of a first sector) cannot be allocated but a radio resource of the second cell (for example, a cell of a second sector) geographically adjacent to the first cell can be allocated, the waypoint of the mobile terminal 600 may be changed so that the mobile terminal 600 passes through the second cell instead of the first cell. In addition, the target cell (the second cell) after the change along with the change of the waypoint may be the frequency band as the first cell, or may be a different frequency band.

Method of Change of Flight Path (Selection of Alternative Path)

For example, the flight related information may include not only the path information (information indicating the path of the flight of the mobile terminal 600) but also alternative path information indicating one or more alternative paths of the flight of the mobile terminal 600. The first radio station 500A (first communication processing section 543) may select the alternative path indicated by the alternative path information. The selection of the alternative path as described above may be referred to as prepared re-routing.

Alternatively, the first radio station 500A (first communication processing section 543) may select the alternative path by itself. The selection of the alternative path as described above may be referred to as dynamic re-routing.

(2-3) Notification of Change of Flight Path

For example, when the radio resource cannot be allocated, the first radio station 500A (first communication processing section 543) triggers processing of notifying the second radio station 500B of the change of the flight path of the mobile terminal 600.

First Example

For example, the first radio station 500A (first communication processing section 543) may directly notify the second radio station 500B of the change of the flight path to thereby notify the second radio station 500B of the change of the flight path.

Figure 24:
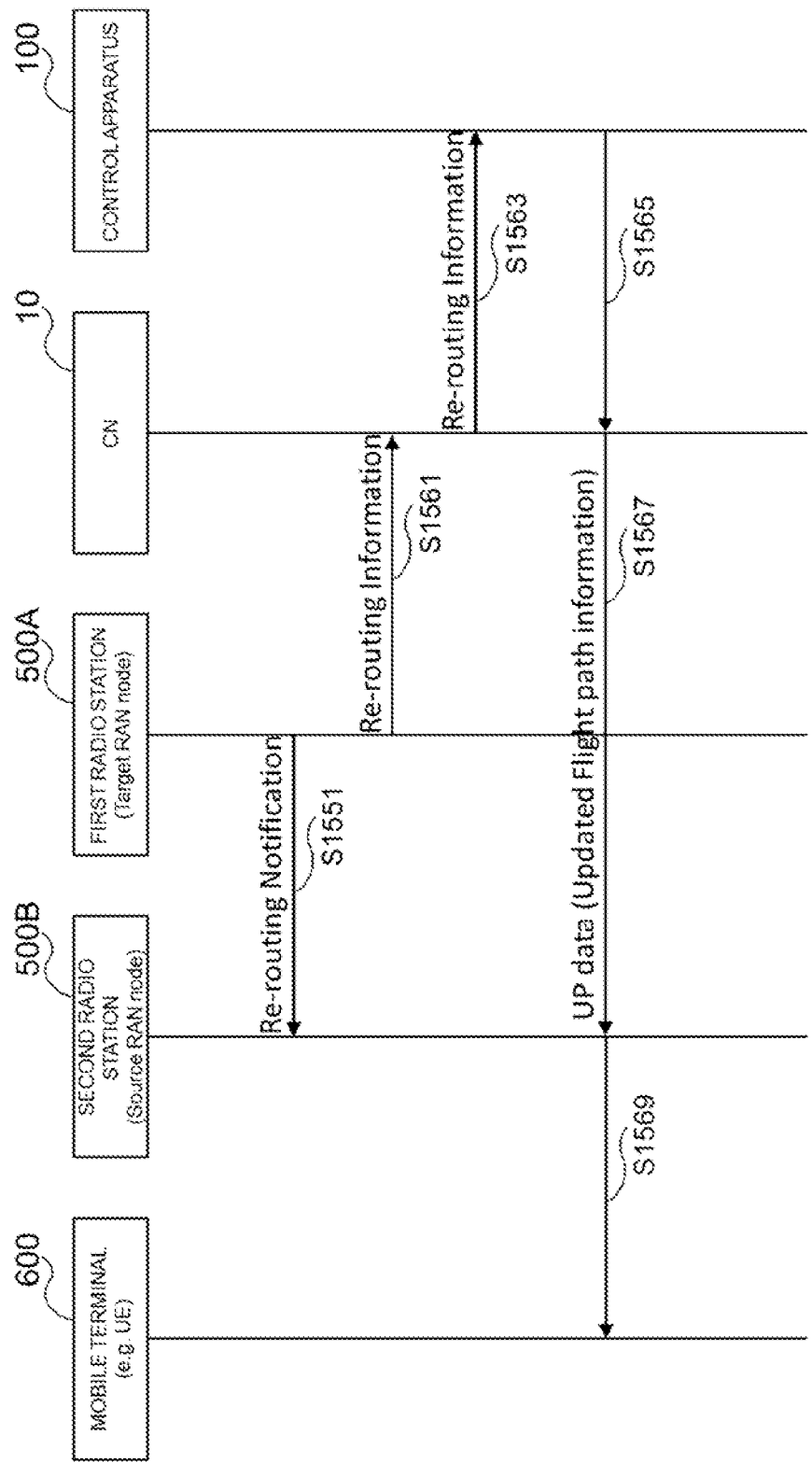
FIG. 24 is a sequence diagram for illustrating a first example of notification of a change of a flight path of the mobile terminal according to the fourth example aspect.

FIG. 24 is a sequence diagram for illustrating a first example of notification of change of the flight path of the mobile terminal 600 according to the fourth example aspect.

When the first radio station 500A (target RAN node) cannot allocate the radio resource for the mobile terminal 600 in the first radio station 500A, the first radio station 500A notifies the second radio station 500B (source RAN node) of the change of the flight path of the mobile terminal 600 (S1551).

The first radio station 500A (target RAN node) transmits information (re-routing information) for the change of the flight path of the mobile terminal 600 to the CN 10 (S1561), and the CN 10 transmits the information (re-routing information) to the control apparatus 100 (S1563).

The control apparatus 100 updates the flight path information, and transmits the updated flight path information as user plane data to the mobile terminal 600 via the CN 10 and the second radio station 500B (S1565, S1567, and S1569).

Second Example

The first radio station 500A (first communication processing section 543) may notify the first CN node 200, which is configured to notify the second radio station 500B of the change of the flight path, of the change of the flight path to thereby notify the second radio station 500B of the change of the flight path.

Figure 25:
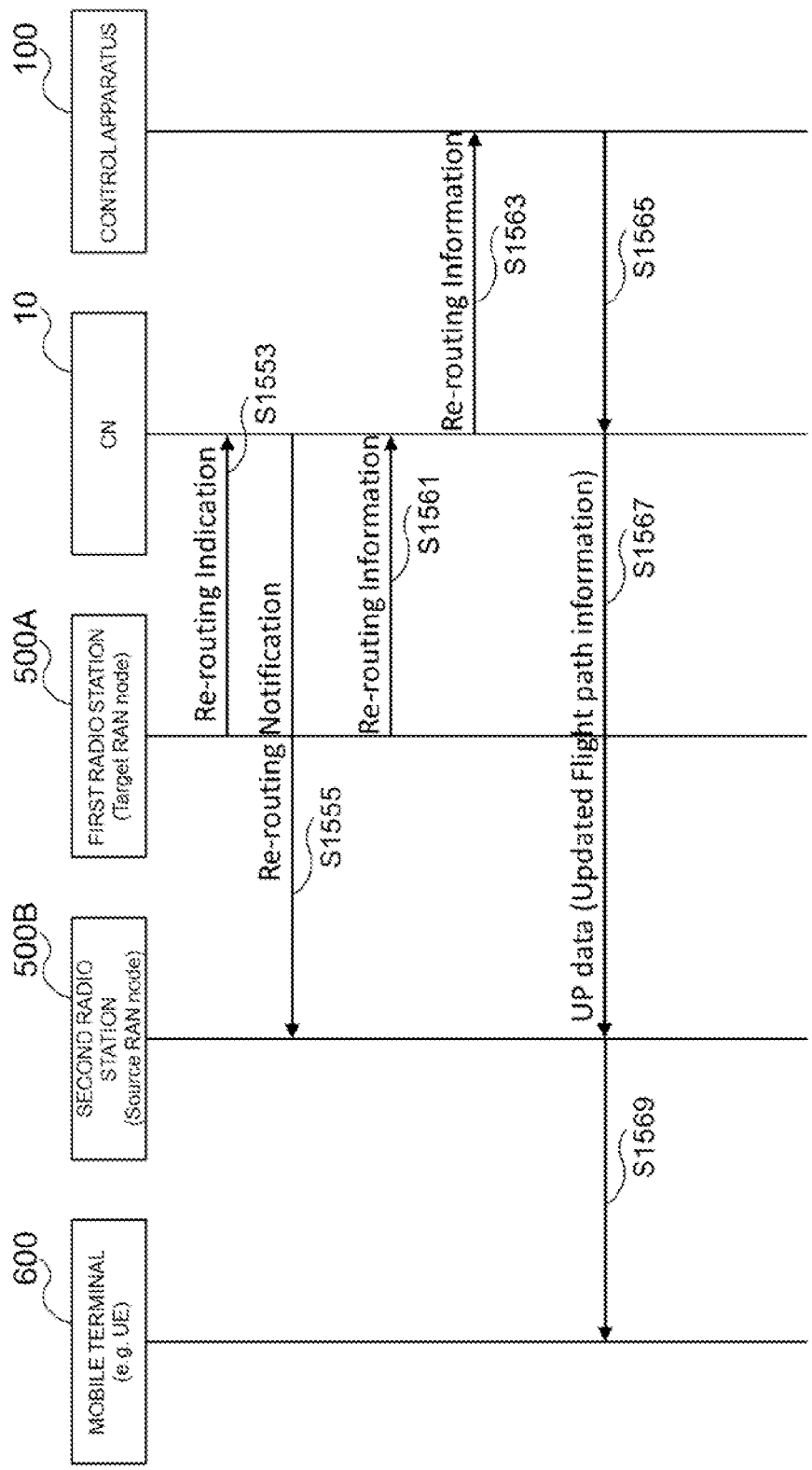
FIG. 25 is a sequence diagram for illustrating a second example of notification of a change of the flight path of the mobile terminal according to the fourth example aspect.

FIG. 25 is a sequence diagram for illustrating a second example of notification of the change of the flight path of the mobile terminal 600 according to the fourth example aspect.

When the first radio station 500A (target RAN node) cannot allocate the radio resource for the mobile terminal 600 in the first radio station 500A, the first radio station 500A notifies the CN 10 (first CN node 200) of the change of the flight path of the mobile terminal 600 (S1553).

The CN 10 (first CN node 200) notifies the second radio station 500B (source RAN node) of the change of the flight path of the mobile terminal 600 (S1555).

Steps S1561 to S1569 are the same as those of the first example of FIG. 24. Thus, overlapping description is omitted herein.

Note that the notification of Step S1553 and the transmission of Step S1561 may be collectively performed. For example, based on reception of the notification of Step S1553, the CN 10 may start the processing of Step S1555 and the processing of Step S1561.

Notification to Control Apparatus 100

For example, the control apparatus 100 is notified of the change of the flight path of the mobile terminal 600.

First Example

For example, the first radio station 500A (first communication processing section 543) notifies the CN 10 of the change of the flight path, and the CN 10 may notify the control apparatus 100 of the change of the flight path.

Specifically, for example, as described with reference to FIG. 24 and FIG. 25, the first radio station 500A (target RAN node) transmits information (re-routing information) for the change of the flight path of the mobile terminal 600 to the CN 10 (S1561), and the CN 10 transmits the information (re-routing information) to the control apparatus 100 (S1563).

Second Example

After the handover, the mobile terminal 600 (communication processing section 635) may notify the control apparatus 100 of the change of the flight path of the mobile terminal 600.

Figure 26:
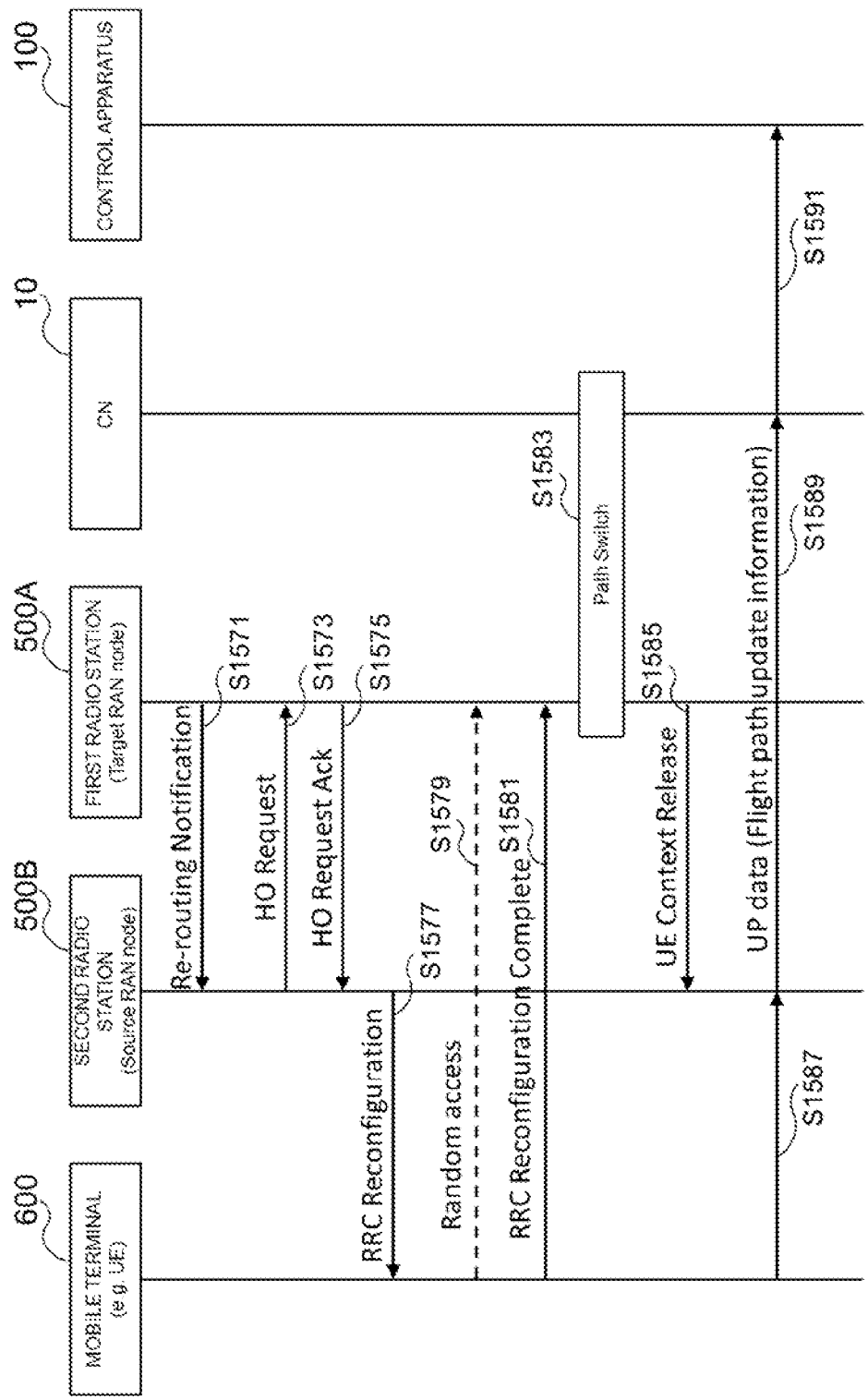
FIG. 26 is a sequence diagram for illustrating a second example of notification of a flight path change to the control apparatus according to the fourth example aspect.

FIG. 26 is a sequence diagram for illustrating a second example of notification of a flight path change of the control apparatus 100 according to the fourth example aspect.

When the first radio station 500A (target RAN node) cannot allocate the radio resource for the mobile terminal 600 in the first cell in the first radio station 500A, the first radio station 500A notifies the second radio station 500B (source RAN node) of the change of the flight path of the mobile terminal 600 (S1571). Note that the change of the flight path may indicate, for example, the second cell different from the first cell in the first radio station 500A.

The second radio station 500B transmits a Handover Request message to the first radio station 500A (S1573).

In response to reception of the Handover Request message, the first radio station 500A transmits a Handover Request Acknowledge message to the second radio station 500B (S1575).

In response to reception of the Handover Request Acknowledge message, the second radio station 500B transmits an RRC Reconfiguration message to the mobile terminal 600 (S1577).

The mobile terminal 600 performs random access to the target cell (cell of the first radio station 500A) (S1579). In addition, the mobile terminal 600 transmits an RRC Reconfiguration Complete message to the first radio station 500A (S1581). As an example, the target cell is a cell included in the information indicating the change of the flight path notified in Step S1571.

The first radio station 500A and the CN 10 perform path switch (S1583). The first radio station 500A transmits a UE Context Release message to the second radio station 500B (S1585).

The mobile terminal 600 transmits, as the user plane data, update information of the flight path (that is, information for the change of the flight path of the mobile terminal 600) to the control apparatus 100 via the second radio station 500B and the CN 10 (S1587, S1589, and S1591).

In the above, the change of the flight path in the fourth example aspect is described. According to the change of the flight path as described above, even when the radio resource cannot be allocated in the original flight path, the radio resource can be allocated. Thus, the mobile terminal 600 can more securely communicate during a flight. As a result, it can be made easier to ensure the flight of the mobile terminal 600 and safety of crew members boarding the mobile terminal 600.

(3) Landing (3-1) Determination of Allocation of Radio Resource in First Radio Station As described above, for example, the first radio station 500A (control section 541) determines whether or not the radio resource for the mobile terminal 600 in the first radio station 500A can be allocated.

For example, the first radio station 500A (control section 541) determines that the radio resource can be allocated, or determines that the radio resource cannot be allocated.

(3-2) Notification of Landing of Mobile Terminal 600

When the first radio station 500A (first communication processing section 543) cannot allocate the radio resource, the first radio station 500A notifies the second radio station 500B or the first CN node 200 of landing of the mobile terminal 600.

(a) Notification

For example, as the notification of the landing of the mobile terminal 600, the first radio station 500A (first communication processing section 543) instructs or requests the second radio station 500B or the first CN node 200 to perform the landing of the mobile terminal 600.

Alternatively, as the notification of the landing of the mobile terminal 600, the first radio station 500A (first communication processing section 543) may transmit assistance information used to determine whether or not to let the mobile terminal 600 perform landing to the second radio station 500B or the first CN node 200.

(b) Notification of Second Radio Station 500B

For example, when the radio resource cannot be allocated, the first radio station 500A (first communication processing section 543) notifies the second radio station 500B of the landing of the mobile terminal 600.

For example, the second radio station 500B (first communication processing section 543) notifies the mobile terminal 600 of the landing of the mobile terminal 600 according to the notification of the landing of the mobile terminal 600 by the first radio station 500A. For example, as the notification of the landing of the mobile terminal 600, the second radio station 500B (first communication processing section 543) instructs or requests the mobile terminal 600 to perform the landing of the mobile terminal 600.

For example, the mobile terminal 600 (flight control section 631) controls the landing of the mobile terminal 600 according to a notification of the landing of the mobile terminal 600 by the second radio station 500B.

Notification to Control Apparatus

For example, the control apparatus 100 may be notified of the landing of the mobile terminal 600.

First Example

For example, the first radio station 500A (first communication processing section 543) may notify the CN 10 of the landing of the mobile terminal 600, and the CN 10 may notify the control apparatus 100 of the landing of the mobile terminal 600.

Figure 27:
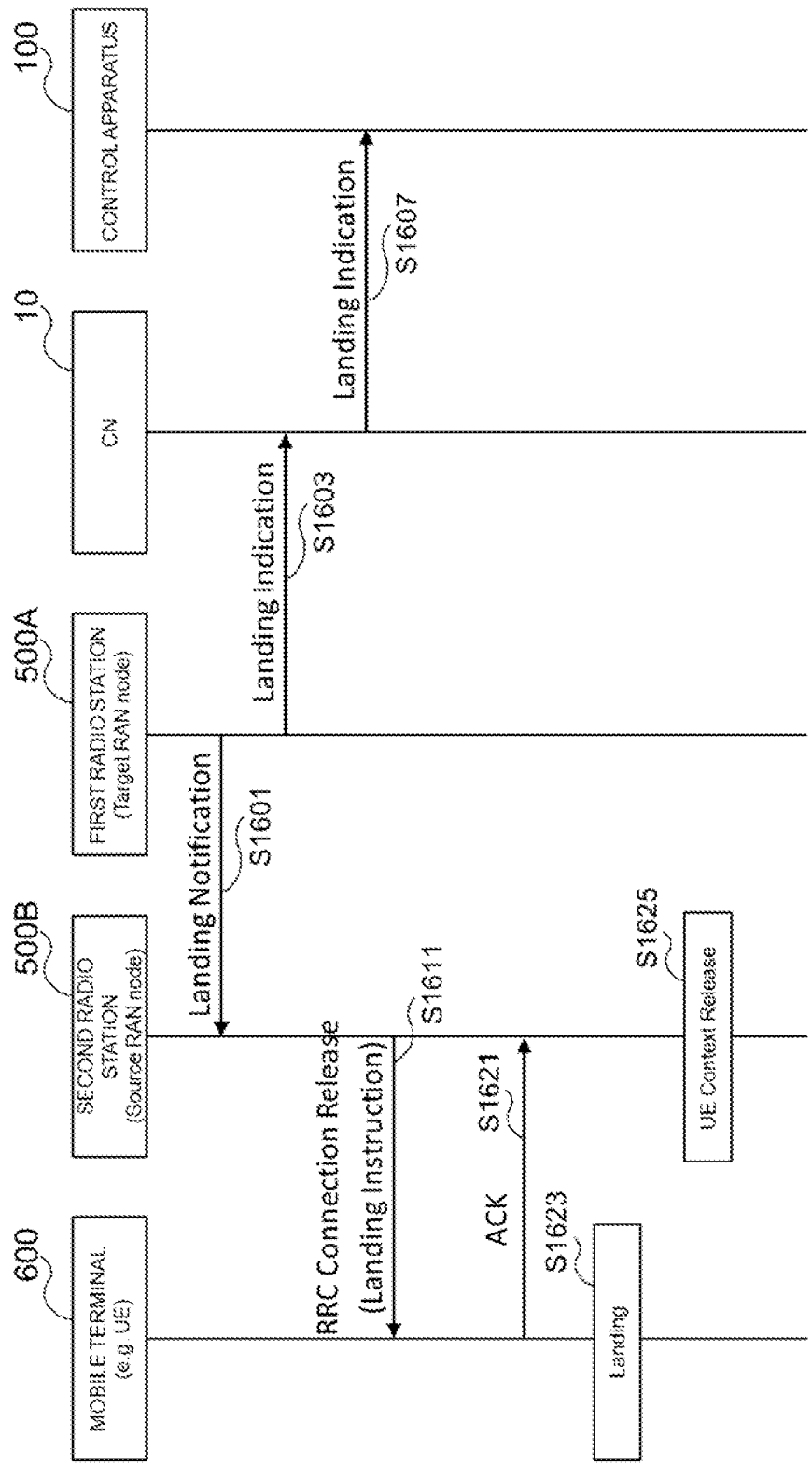
FIG. 27 is a sequence diagram for illustrating a first example of processing for landing of the mobile terminal according to the fourth example aspect.

FIG. 27 is a sequence diagram for illustrating a first example of processing for the landing of the mobile terminal 600 according to the fourth example aspect.

When the radio resource for the mobile terminal 600 in the first radio station 500A cannot be allocated, the first radio station 500A notifies the second radio station 500B of the landing of the mobile terminal 600 (S1601).

The first radio station 500A notifies the CN 10 of the landing of the mobile terminal 600 (S1603), and the CN 10 notifies the control apparatus 100 of the landing of the mobile terminal 600 (S1607).

The second radio station 500B transmits an RRC Connection Release message including landing instruction to the mobile terminal 600 according to the notification of the landing of the mobile terminal 600 by the first radio station 500A (S1611).

The mobile terminal 600 transmits an Acknowledge message for the RRC Connection Release message to the second radio station 500B (S1621).

The mobile terminal 600 lands (S1623).

The second radio station 500B performs a UE Context Release (S1625).

Second Example

The second radio station 500B (first communication processing section 543) may notify the CN 10 of the landing of the mobile terminal 600, and the CN 10 may notify the control apparatus 100 of the landing of the mobile terminal 600.

Figure 28:
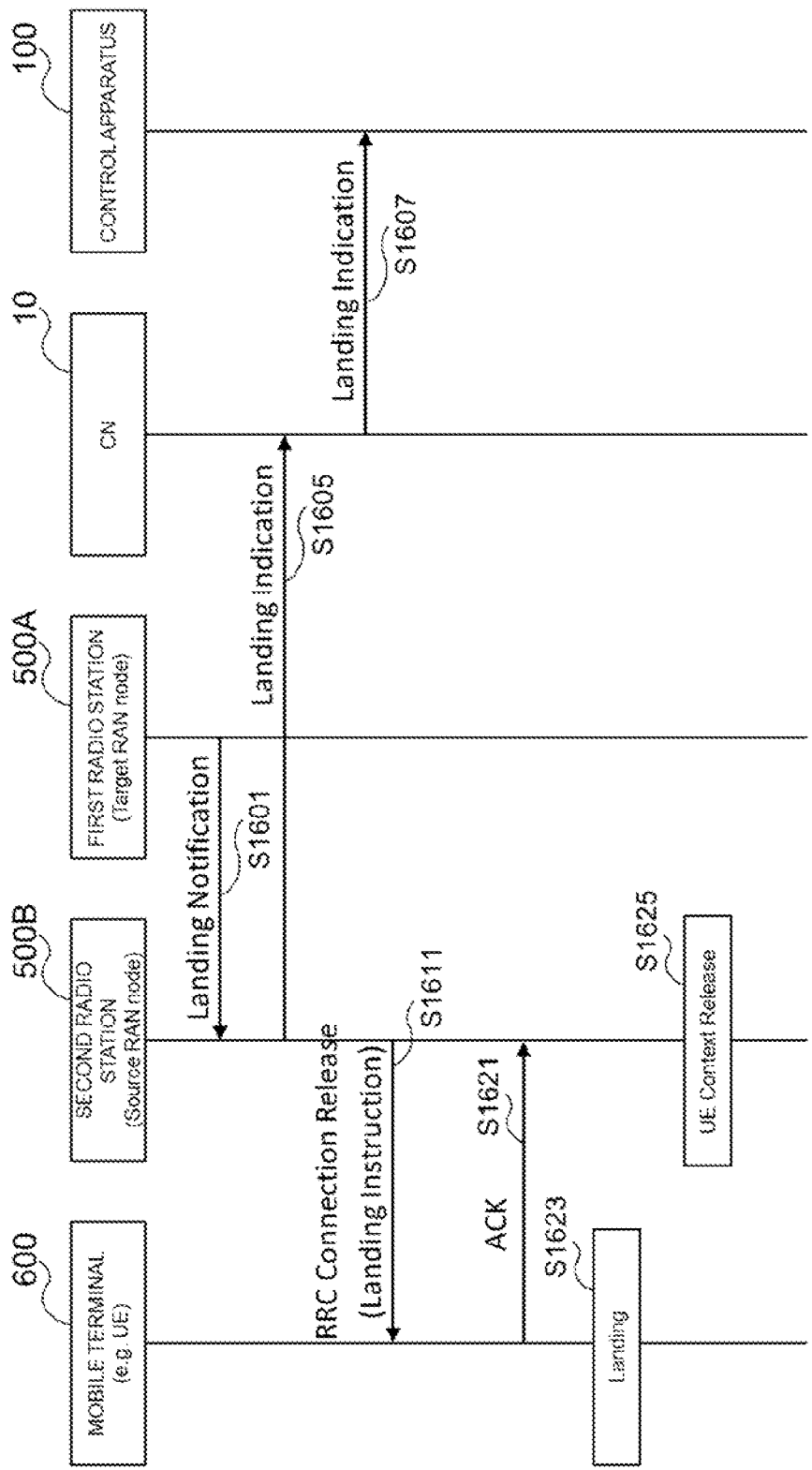
FIG. 28 is a sequence diagram for illustrating a second example of processing for landing of the mobile terminal according to the fourth example aspect.

FIG. 28 is a sequence diagram for illustrating a second example of processing for the landing of the mobile terminal 600 according to the fourth example aspect.

In the second example, unlike the first example of FIG. 26, the second radio station 500B notifies the CN 10 of the landing of the mobile terminal 600 (S1605).

Other processing in the second example is the same as the processing of the first example in FIG. 26. Thus, overlapping description is omitted herein.

Third Example

The mobile terminal 600 (communication processing section 635) may notify the control apparatus 100 of the landing of the mobile terminal 600.

Figure 29:
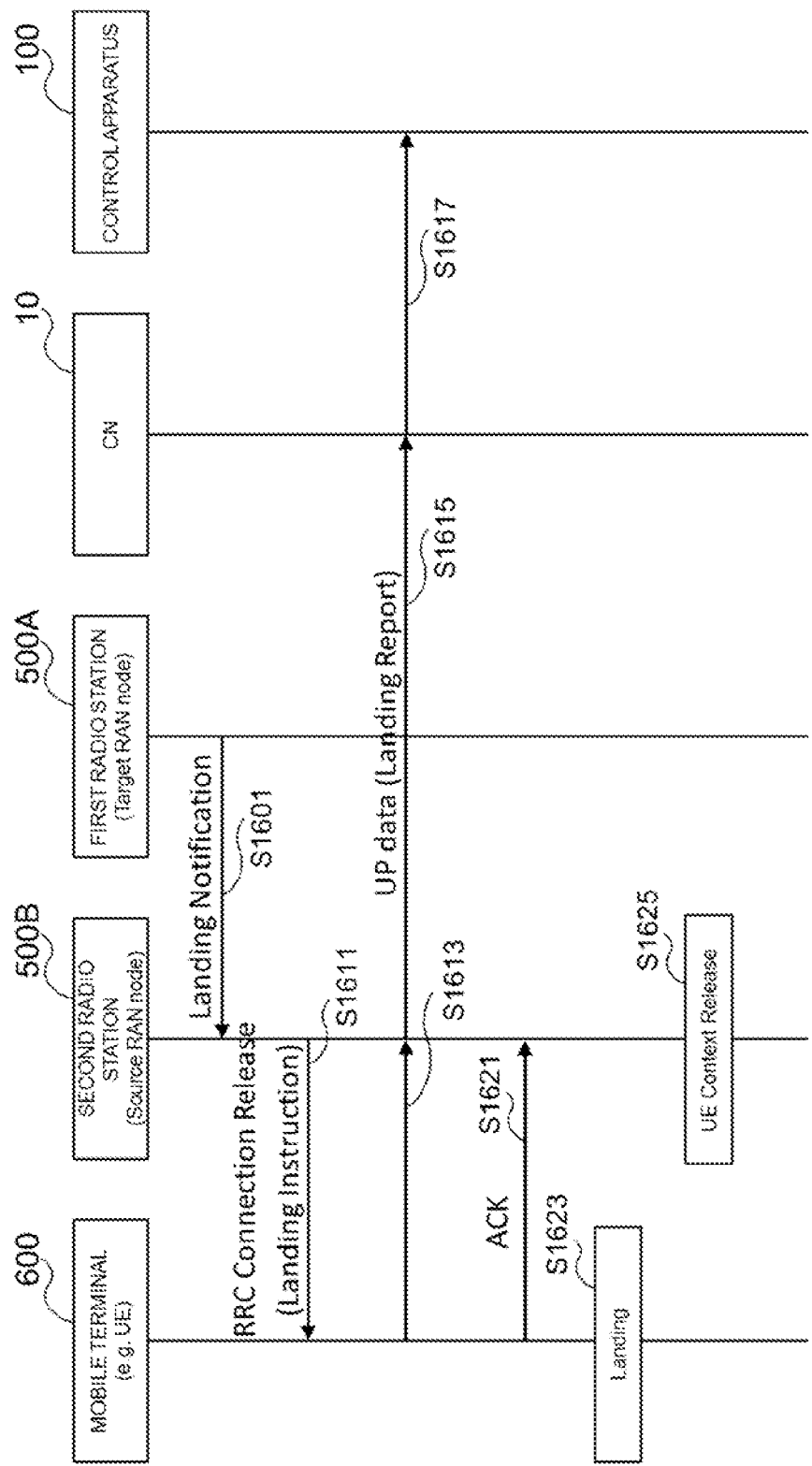
FIG. 29 is a sequence diagram for illustrating a third example of processing for landing of the mobile terminal according to the fourth example aspect.

FIG. 29 is a sequence diagram for illustrating a third example of processing for the landing of the mobile terminal 600 according to the fourth example aspect.

In the third example, unlike the first example of FIG. 26 and the second example of FIG. 27, the mobile terminal 600 notifies the control apparatus 100 of the landing of the mobile terminal 600 via the second radio station 500B and the CN 10 by using user plane data (S1613, S1615, and S1617).

Other processing in the third example is the same as the processing of the first example of FIG. 26 and the second example of FIG. 27. Thus, overlapping description is omitted herein.

(c) Notification to First CN Node 200

For example, when the radio resource cannot be allocated, the first radio station 500A (first communication processing section 543) notifies the first CN node 200 of the landing of the mobile terminal 600.

As a first example, the first CN node 200 (communication processing section 233) notifies the mobile terminal 600 of the landing of the mobile terminal 600 via the second radio station 500B according to the notification of the landing of the mobile terminal 600 by the first radio station 500A. For example, as the notification of the landing of the mobile terminal 600, the first CN node 200 (communication processing section 233) instructs or requests the mobile terminal 600 to perform the landing of the mobile terminal 600. For example, the first CN node 200 (communication processing section 233) notifies the mobile terminal 600 of the landing of the mobile terminal 600 via the second radio station 500B by using a non access stratum (NAS) message.

As a second example, the first CN node 200 (communication processing section 233) may notify the second radio station 500B of the landing of the mobile terminal 600 according to the notification of the landing of the mobile terminal 600 by the first radio station 500A. As the notification of the landing of the mobile terminal 600, the first CN node 200 (communication processing section 233) may instruct or request the second radio station 500B to perform the landing of the mobile terminal 600. The second radio station 500B (first communication processing section 543) may notify the mobile terminal 600 of the landing of the mobile terminal 600 according to the notification of the landing of the mobile terminal 600 by the first CN node 200. As the notification of the landing of the mobile terminal 600, the second radio station 500B (first communication processing section 543) may instruct or request the mobile terminal 600 to perform the landing of the mobile terminal 600.

As a third example, the CN 10 may notify the control apparatus 100 of the landing of the mobile terminal 600 according to the notification of the landing of the mobile terminal 600 by the first radio station 500A. The control apparatus 100 (communication processing section 133) may notify the mobile terminal 600 of the landing of the mobile terminal 600 according to the notification of the landing of the mobile terminal 600 by the CN 10. As the notification of the landing of the mobile terminal 600, the control apparatus 100 (communication processing section 133) may instruct or request the mobile terminal 600 to perform the landing of the mobile terminal 600.

For example, the mobile terminal 600 (flight control section 631) controls the landing of the mobile terminal 600 according to the notification of the landing of the mobile terminal 600.

Flow of Processing (Notification from First CN Node 200)

Figure 30:
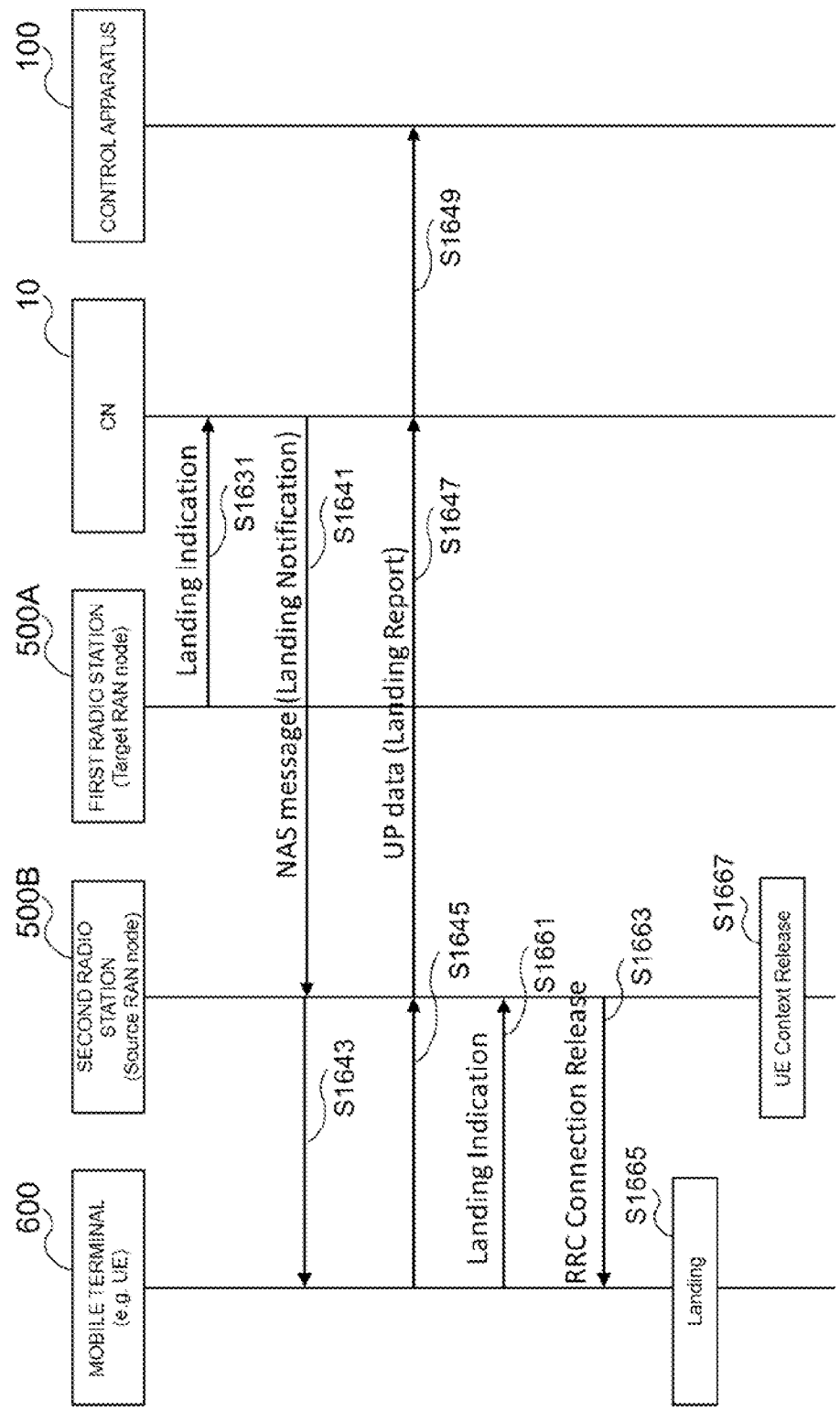
FIG. 30 is a sequence diagram for illustrating a fourth example of processing for landing of the mobile terminal according to the fourth example aspect.

FIG. 30 is a sequence diagram for illustrating a fourth example of processing for the landing of the mobile terminal 600 according to the fourth example aspect.

When the radio resource for the mobile terminal 600 in the first radio station 500A cannot be allocated, the first radio station 500A notifies the CN 10 (first CN node 200) of the landing of the mobile terminal 600 (S1631).

The CN 10 (first CN node 200) notifies the mobile terminal 600 of the landing of the mobile terminal 600 via the second radio station 500B by using a NAS message according to the notification of the landing of the mobile terminal 600 by the first radio station 500A (S1641 and S1643).

The mobile terminal 600 notifies the control apparatus 100 of the landing of the mobile terminal 600 via the second radio station 500B and the CN 10 by using user plane data (S1645, S1647, and S1649).

The mobile terminal 600 notifies the second radio station 500B of the landing of the mobile terminal 600 (S1661).

The second radio station 500B transmits an RRC Connection Release message to the mobile terminal 600 (S1663).

The mobile terminal 600 lands (S1665).

The second radio station 500B performs UE Context Release (S1667).

Flow of Processing (Notification from Control Apparatus 100)

Figure 31:
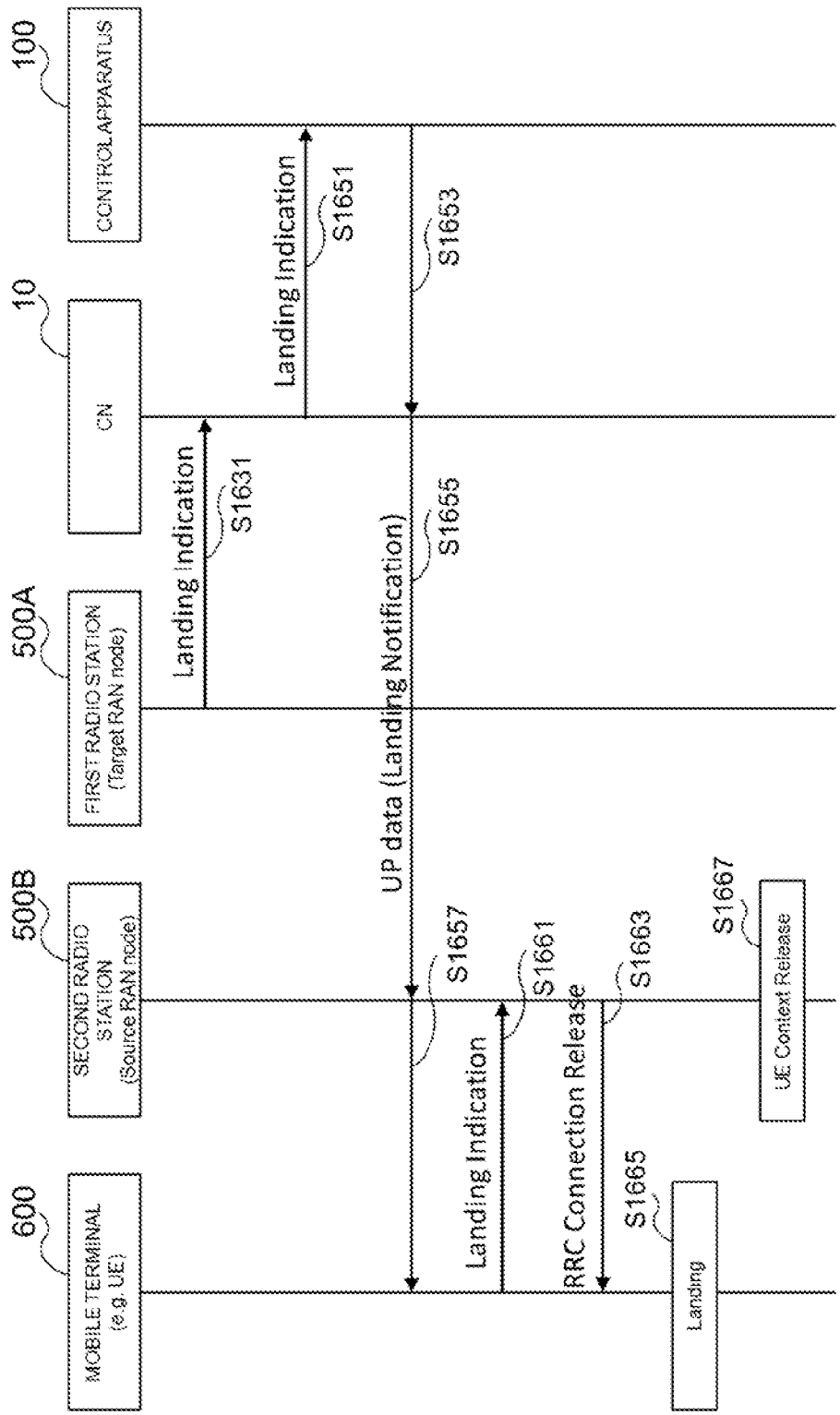
FIG. 31 is a sequence diagram for illustrating a fifth example of processing for landing of the mobile terminal according to the fourth example aspect.

FIG. 31 is a sequence diagram for illustrating a fifth example of processing for the landing of the mobile terminal 600 according to the fourth example aspect.

In the fifth example, unlike the fourth example of FIG. 30, the CN 10 notifies the control apparatus 100 of the landing of the mobile terminal 600 according to the notification of the landing of the mobile terminal 600 by the first radio station 500A (S1653). In addition, the control apparatus 100 notifies the mobile terminal 600 of the landing of the mobile terminal 600 via the CN 10 and the second radio station 500B by using user plane data (S1653, S1655, and S1657).

Other processing in the fifth example is the same as the processing of the fourth example of FIG. 30. Thus, overlapping description is omitted herein.

(3-3) Landing Point

For example, the landing of the mobile terminal 600 is the landing of the mobile terminal 600 at a landing point.

For example, the flight path information includes information indicating the landing point. The mobile terminal 600 (flight control section 631) lands at the landing point, based on the flight path information.

Alternatively, the second radio station 500B (control section 541) may determine the landing point. The mobile terminal 600 (flight control section 631) may land at the landing point determined by the second radio station 500B.

Alternatively, the mobile terminal 600 (flight control section 631) may determine the landing point. The mobile terminal 600 (flight control section 631) may land at the landing point determined by the mobile terminal 600 itself. The mobile terminal 600 (flight control section 631) may determine the landing point, based on a predetermined condition. Information for the predetermined condition may be included in the flight path information, or may be separately provided by the second radio station 500B or the control apparatus 100 without being included in the flight path information.

In the above, the landing of the mobile terminal 600 in the fourth example aspect is described. According to the landing as described above, even if a radio resource cannot be allocated, it is possible to let the mobile terminal 600 perform landing safely. Accordingly, it can be made easier to ensure the flight of the mobile terminal 600 and safety of crew members boarding the mobile terminal 600.

8. Fifth Example Aspect

Next, with reference to FIG. 32 to FIG. 34, the fifth example aspect of the present disclosure will be described. The first example aspect described above is a specific example aspect, whereas the fifth example aspect is a more generalized example aspect for transmission and reception of capability information in particular.

8.1. Configuration of Core Network Node

Figure 32:
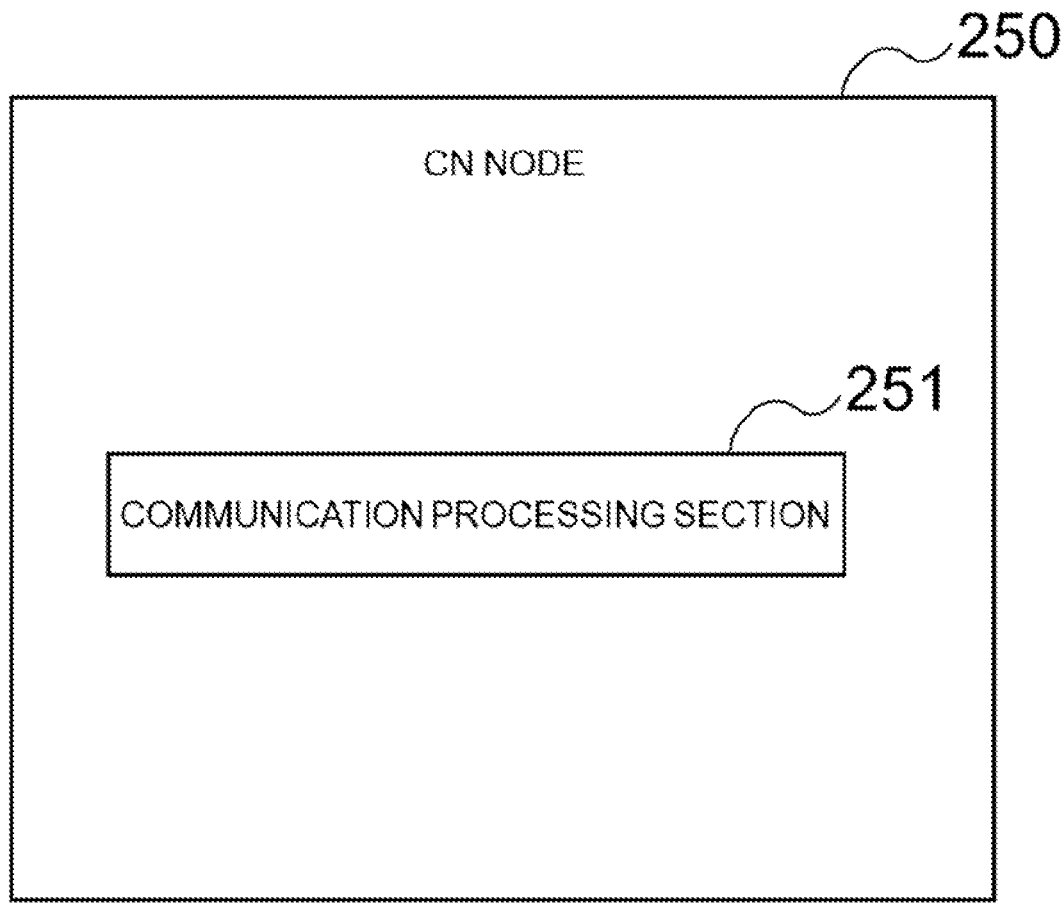
FIG. 32 is a block diagram illustrating an example of a schematic configuration of a core network node according to a fifth example aspect.

FIG. 32 is a block diagram illustrating an example of a schematic configuration of a CN node 250 according to the fifth example aspect. With reference to FIG. 32, the CN node 250 includes a communication processing section 251.

(1) Communication Processing Section 251

The communication processing section 251 communicates with another node (for example, a radio station). Specific operation of the communication processing section 251 will be described later.

(2) Implementation Example

The communication processing section 251 may be implemented with one or more processors and a memory. The memory may be included in the one or more processors, or may be outside of the one or more processors. The communication processing section 251 may be implemented with a controller, and the controller may include one or more processors and a memory.

The CN node 250 may include a network adapter, a network interface card, a transmitter, a receiver, a transceiver, and/or the like. In addition, the CN node 250 may include a hard disk.

The CN node 250 may include a memory storing programs (one or more instructions), and one or more processors that can execute the programs (the one or more instructions). The one or more processors may execute the program, and thereby perform operation of the communication processing section 251. The program may be a program for causing the processor(s) to execute the operation of the communication processing section 251.

The CN node 250 may include a transceiver and a controller. The controller may perform the operation of the communication processing section 251, and may transmit and receive information or a message via the transceiver.

Note that the CN node 250 may be virtualized. In other words, the CN node 250 may be implemented as a virtual machine. In this case, the CN node 250 (the virtual machine) may operate as a physical machine (hardware) including a processor, a memory, and the like, and as a virtual machine on a hypervisor.

8.2. Configuration of Radio Station

Figure 33:
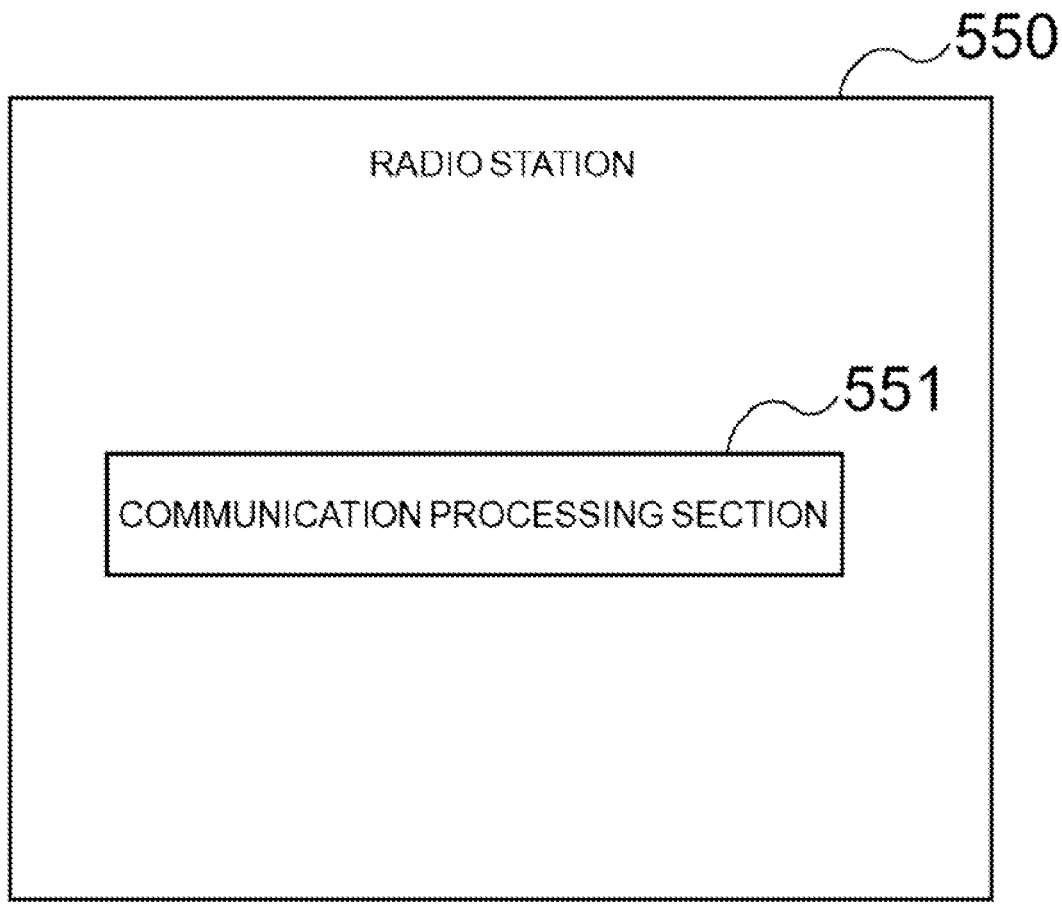
FIG. 33 is a block diagram illustrating an example of a schematic configuration of a radio station according to the fifth example aspect.

FIG. 33 is a block diagram illustrating an example of a schematic configuration of a radio station 550 according to the fifth example aspect. With reference to FIG. 33, the radio station 550 includes a communication processing section 551.

(1) Communication Processing Section 551

The communication processing section 551 communicates with another node (for example, a CN node). Specific operation of the communication processing section 551 will be described later.

(2) Implementation Example

The communication processing section 551 may be implemented with one or more processors and a memory. The memory may be included in the one or more processors, or may be outside of the one or more processors. The communication processing section 551 may be implemented with a controller, and the controller may include one or more processors and a memory.

The radio station 550 may include a network adapter, a network interface card, a transmitter, a receiver, a transceiver, and/or the like for wired communication. The radio station 550 may include an antenna, a radio frequency (RF) circuit, a transmitter, a receiver, a transceiver, and/or the like for radio communication. In addition, the radio station 550 may include a hard disk.

The radio station 550 may include a memory storing programs (one or more instructions), and one or more processors that can execute the programs (the one or more instructions). The one or more processors may execute the program, and thereby perform operation of the communication processing section 551. The program may be a program for causing the processor(s) to execute the operation of the communication processing section 551.

The radio station 550 may include a transceiver and a controller. The controller may perform the operation of the communication processing section 551, and may transmit and receive information or a message via the transceiver.

Note that the radio station 550 may be partially or entirely virtualized. In other words, a part or all of the radio station 550 may be implemented as a virtual machine. In this case, a part or all of the radio station 550 (the virtual machine) may operate as a physical machine (hardware) including a processor, a memory, and the like, and as a virtual machine on a hypervisor.

8.3. Configuration of Mobile Terminal

Figure 34:
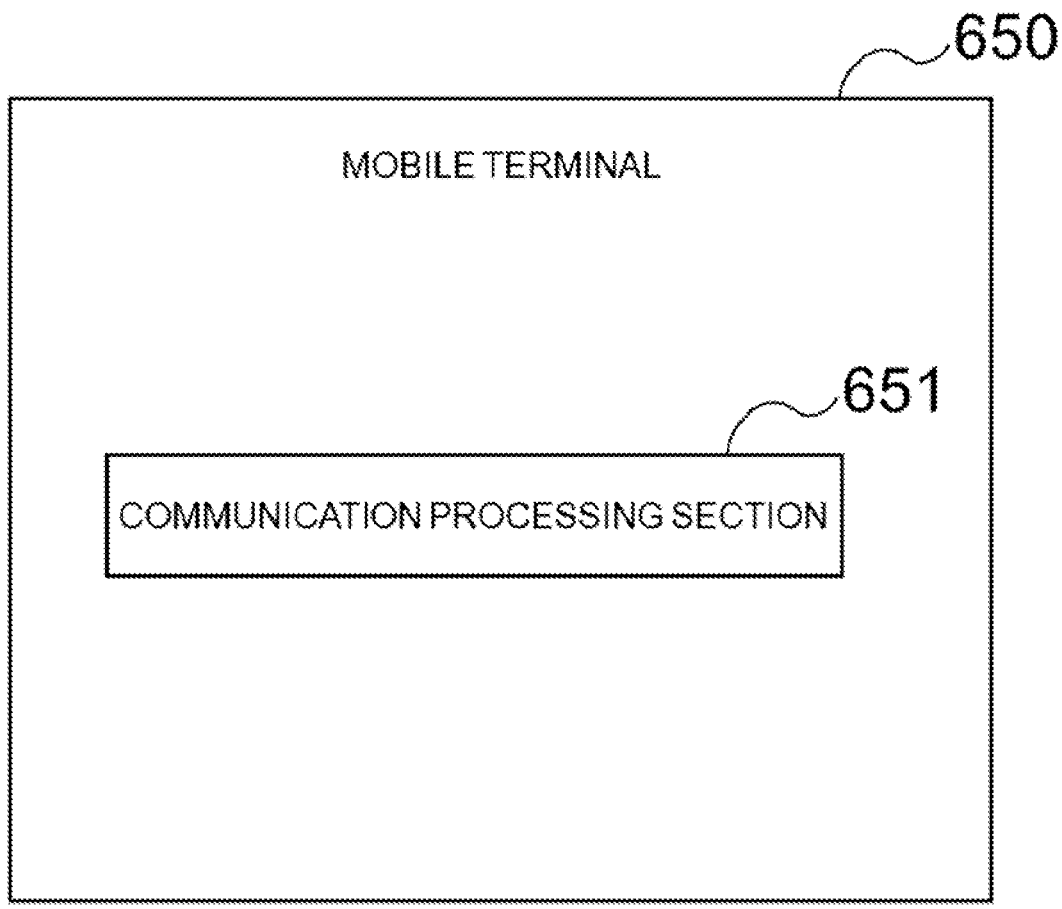
FIG. 34 is a block diagram illustrating an example of a schematic configuration of a mobile terminal according to the fifth example aspect.

FIG. 34 is a block diagram illustrating an example of a schematic configuration of a mobile terminal 650 according to the fifth example aspect. With reference to FIG. 34, the mobile terminal 650 includes a communication processing section 651.

(1) Communication Processing Section 651

The communication processing section 651 communicates with another node (for example, a radio station). Specific operation of the communication processing section 651 will be described later.

(2) Implementation Example

The communication processing section 651 may be implemented with one or more processors and a memory. The memory may be included in the one or more processors, or may be outside of the one or more processors. As an example, the communication processing section 651 may be implemented in an SoC. The communication processing section 651 may be implemented with a controller, and the controller may include one or more processors and a memory.

The mobile terminal 650 may include an antenna, a radio frequency (RF) circuit, a transmitter, a receiver, a transceiver, and/or the like for radio communication. In addition, the mobile terminal 650 may include a hard disk.

The mobile terminal 650 may include a memory storing programs (one or more instructions), and one or more processors that can execute the programs (the one or more instructions). The one or more processors may execute the program, and thereby perform operation of the communication processing section 651. The program may be a program for causing the processor(s) to execute the operation of the communication processing section 651.

The mobile terminal 650 may include a transceiver and a controller. The controller may perform the operation of the communication processing section 651, and may transmit and receive information or a message via the transceiver.

Note that, when the mobile terminal 650 is not an apparatus to be attached to the flight apparatus but is the flight apparatus itself, the mobile terminal 650 may further include a flight section. The flight section may be implemented with a battery, a motor, an ESC, and the like.

8.4. Operation Example

The radio station 550 (communication processing section 551) transmits, to the CN node 250, first capability information indicating whether or not to support the operation of the radio station 550 for performing flight management of a manned flight vehicle capable of flying using a radio communication network (for example, a radio communication network using specifications of 3GPP). The CN node 250 (communication processing section 251) receives the first capability information from the radio station 550. Note that the mobile terminal 690 (communication processing section 651) communicates with the radio station 550.

For example, transmission and reception of the first capability information in the fifth example aspect is the same as the transmission and reception of the first capability information in the first example aspect. Thus, overlapping description is omitted herein.

Note that the transmission and reception of the first capability information in the fifth example aspect is not limited to the example the same as the first example aspect.

In the above, transmission and reception of capability information according to the fifth example aspect is described. When the first capability information is not transmitted from the radio station 550 to the first CN node 250, the first CN node 250 may request information (for example, resource information) for the flight management to the radio station 550, regardless of whether or not to support the operation of the radio station 550 for performing flight management of a manned flight vehicle that can fly using a radio communication network (for example, a radio communication network using specifications of 3GPP). Here, if the radio station 550 is incapable of providing the information for the flight management, the request for the information for the flight management becomes useless. Thus, at the time of transmission and reception of the information for the flight management, useless signaling may occur, and a communication resource and a processing resource of each node may be useless. In contrast, when the first capability information is transmitted from the radio station 550 to the first CN node 250 as described above, the first CN node 250 can determine whether or not to support the operation of the radio station 550 for performing flight management of a manned flight vehicle capable of flying using a radio communication network (for example, a radio communication network using specifications of 3GPP). Thus, occurrence of useless signaling can be prevented, and accordingly, a communication resource and a processing resource of each node can be prevented from becoming useless.

9. Sixth Example Aspect

Next, with reference to FIG. 35 to FIG. 39, the sixth example aspect of the present disclosure will be described. The first example aspect described above is a specific example aspect, whereas the sixth example aspect is a more generalized example aspect for transmission and reception of resource information in particular.

9.1. Configuration of Control Apparatus

Figure 35:
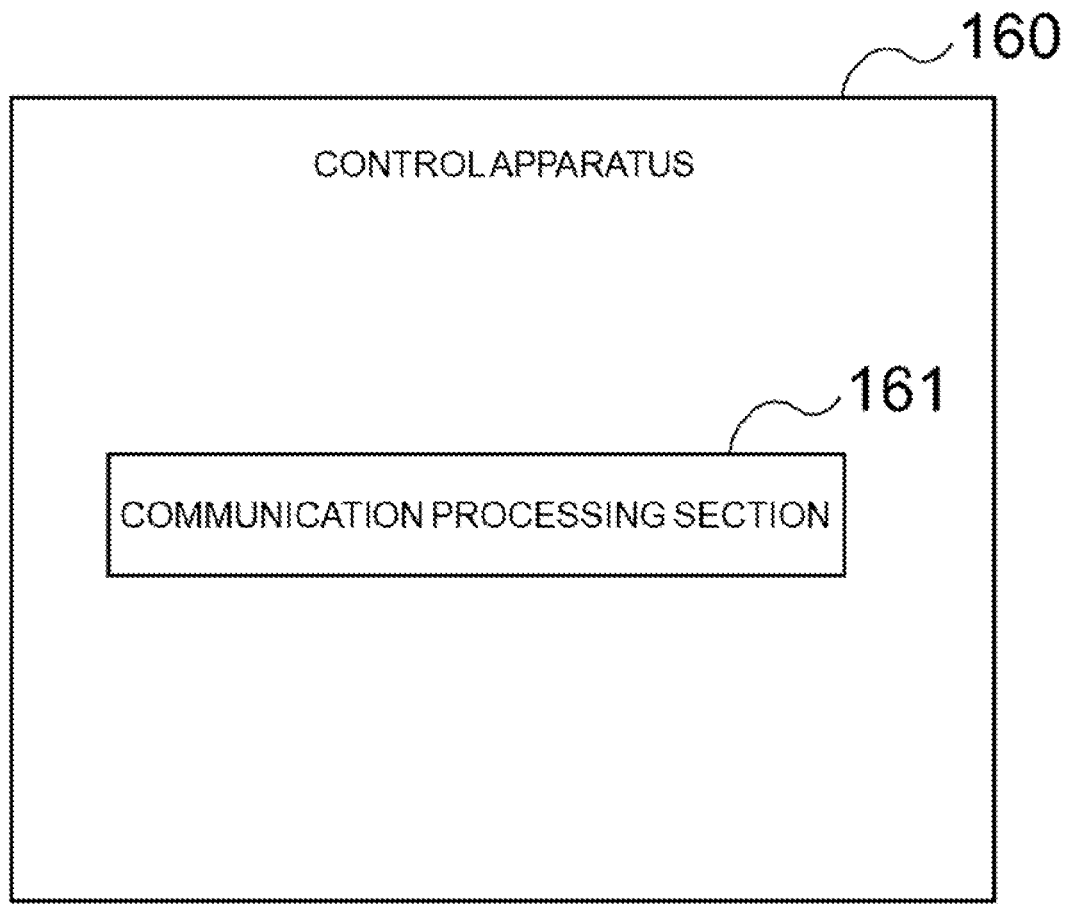
FIG. 35 is a block diagram illustrating an example of a schematic configuration of a control apparatus according to the sixth example aspect.

FIG. 35 is a block diagram illustrating an example of a schematic configuration of a control apparatus 160 according to the sixth example aspect. With reference to FIG. 35, the control apparatus 160 includes a communication processing section 161.

(1) Communication Processing Section 161

The communication processing section 161 communicates with another node (for example, a CN node). Specific operation of the communication processing section 161 will be described later.

(2) Implementation Example

The communication processing section 161 may be implemented with one or more processors and a memory. The memory may be included in the one or more processors, or may be outside of the one or more processors. The communication processing section 161 may be implemented with a controller, and the controller may include one or more processors and a memory.

The control apparatus 160 may include a network adapter, a network interface card, a transmitter, a receiver, a transceiver, and/or the like. In addition, the control apparatus 160 may include a hard disk.

The control apparatus 160 may include a memory storing programs (one or more instructions), and one or more processors that can execute the programs (the one or more instructions). The one or more processors may execute the program, and thereby perform operation of the communication processing section 161. The program may be a program for causing the processor(s) to execute the operation of the communication processing section 161.

The control apparatus 160 may include a transceiver and a controller. The controller may perform the operation of the communication processing section 161, and may transmit and receive information or a message via the transceiver.

Note that the control apparatus 160 may be virtualized. In other words, the control apparatus 160 may be implemented as a virtual machine. In this case, the control apparatus 160 (the virtual machine) may operate as a physical machine (hardware) including a processor, a memory, and the like, and as a virtual machine on a hypervisor.

9.2. Configuration of First Core Network Node

Figure 36:
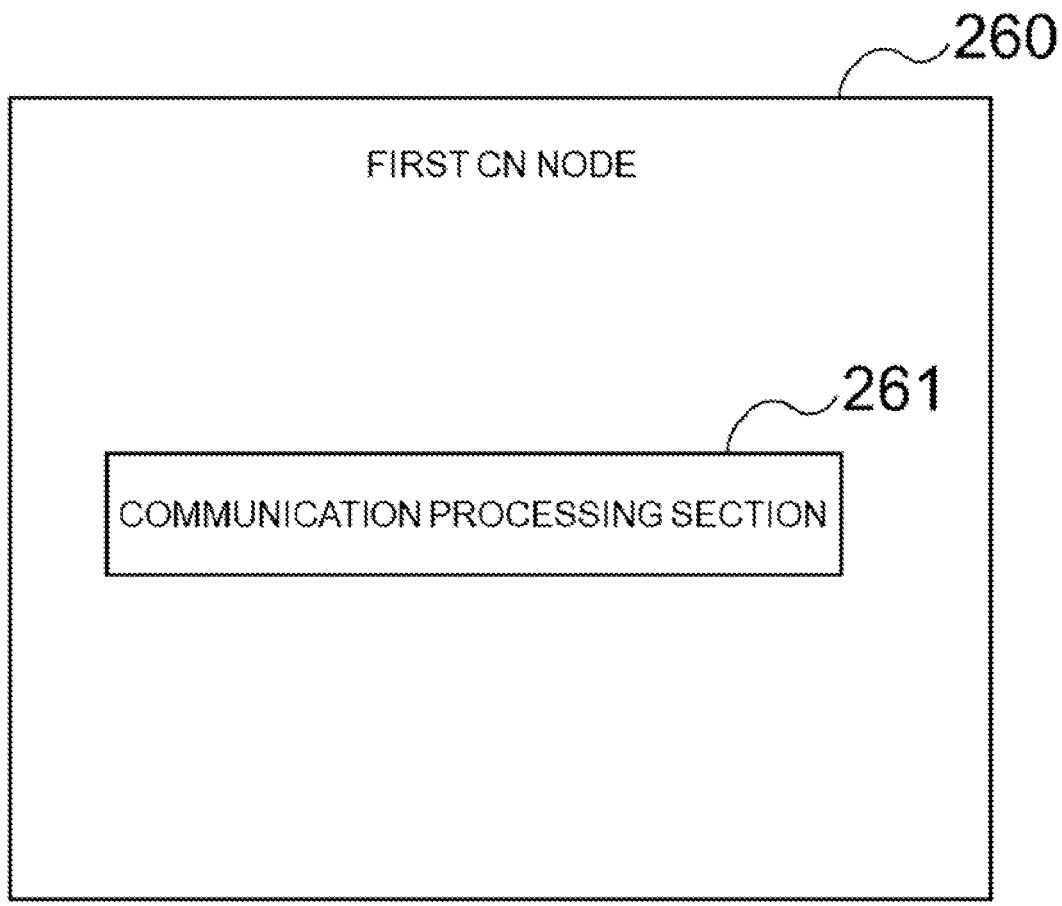
FIG. 36 is a block diagram illustrating an example of a schematic configuration of a first core network node according to the sixth example aspect.

FIG. 36 is a block diagram illustrating an example of a schematic configuration of a first CN node 260 according to the sixth example aspect. With reference to FIG. 36, the first CN node 260 includes a communication processing section 261.

(1) Communication Processing Section 261

The communication processing section 261 communicates with another node (for example, a radio station or a CN node). Specific operation of the communication processing section 261 will be described later.

(2) Implementation Example

The communication processing section 261 may be implemented with one or more processors and a memory. The memory may be included in the one or more processors, or may be outside of the one or more processors. The communication processing section 261 may be implemented with a controller, and the controller may include one or more processors and a memory.

The first CN node 260 may include a network adapter, a network interface card, a transmitter, a receiver, a transceiver, and/or the like. In addition, the first CN node 260 may include a hard disk.

The first CN node 260 may include a memory storing programs (one or more instructions), and one or more processors that can execute the programs (the one or more instructions). The one or more processors may execute the program, and thereby perform operation of the communication processing section 261. The program may be a program for causing the processor(s) to execute the operation of the communication processing section 261.

The first CN node 260 may include a transceiver and a controller. The controller may perform the operation of the communication processing section 261, and may transmit and receive information or a message via the transceiver.

Note that the first CN node 260 may be virtualized. In other words, the first CN node 260 may be implemented as a virtual machine. In this case, the first CN node 260 (the virtual machine) may operate as a physical machine (hardware) including a processor, a memory, and the like, and as a virtual machine on a hypervisor.

9.3. Configuration of Second Core Network Node

Figure 37:
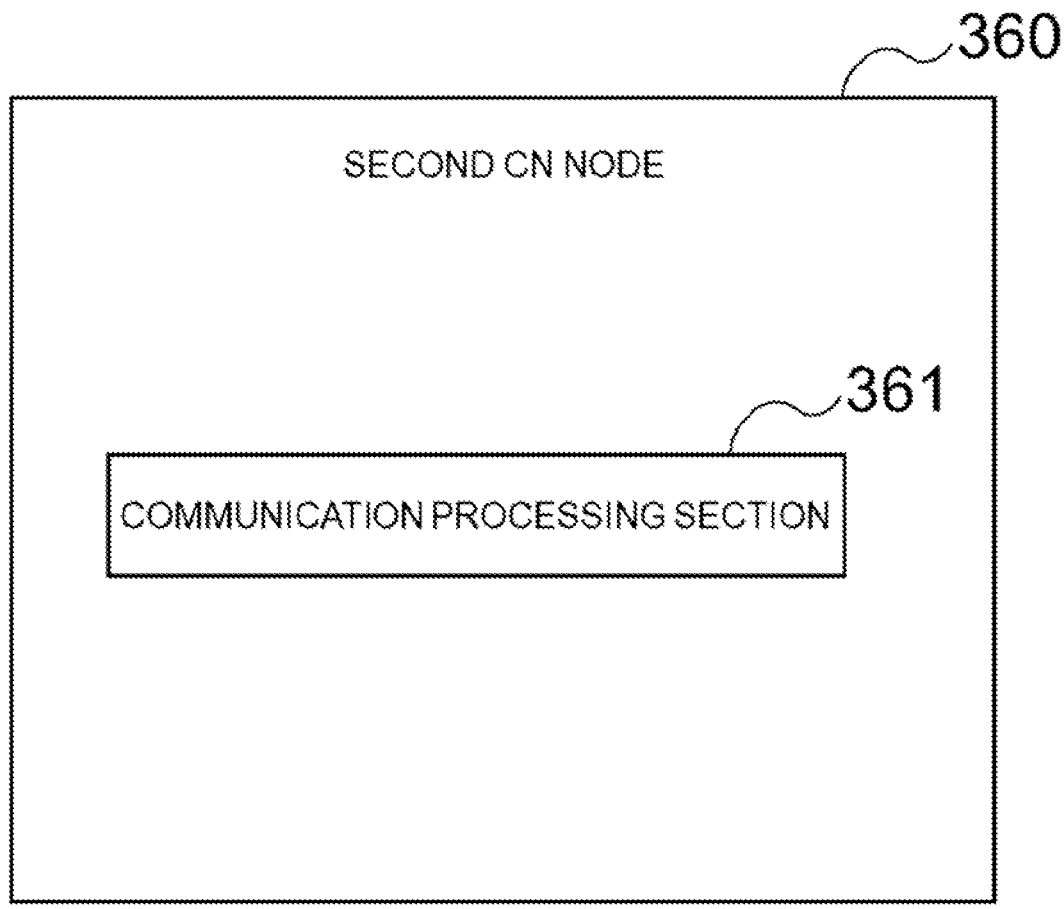
FIG. 37 is a block diagram illustrating an example of a schematic configuration of a second core network node according to the sixth example aspect.

FIG. 37 is a block diagram illustrating an example of a schematic configuration of a second CN node 360 according to the sixth example aspect. With reference to FIG. 37, the second CN node 360 includes a communication processing section 361.

(1) Communication Processing Section 361

The communication processing section 361 communicates with another node (for example, a CN node or a control apparatus). Specific operation of the communication processing section 361 will be described later.

(2) Implementation Example

The communication processing section 361 may be implemented with one or more processors and a memory. The memory may be included in the one or more processors, or may be outside of the one or more processors. The communication processing section 361 may be implemented with a controller, and the controller may include one or more processors and a memory.

The second CN node 360 may include a network adapter, a network interface card, a transmitter, a receiver, a transceiver, and/or the like. In addition, the second CN node 360 may include a hard disk.

The second CN node 360 may include a memory storing programs (one or more instructions), and one or more processors that can execute the programs (the one or more instructions). The one or more processors may execute the program, and thereby perform operation of the communication processing section 361. The program may be a program for causing the processor(s) to execute the operation of the communication processing section 361.

The second CN node 360 may include a transceiver and a controller. The controller may perform the operation of the communication processing section 361, and may transmit and receive information or a message via the transceiver.

Note that the second CN node 360 may be virtualized. In other words, the second CN node 360 may be implemented as a virtual machine. In this case, the second CN node 360 (the virtual machine) may operate as a physical machine (hardware) including a processor, a memory, and the like, and as a virtual machine on a hypervisor.

9.4. Configuration of Radio Station

Figure 38:
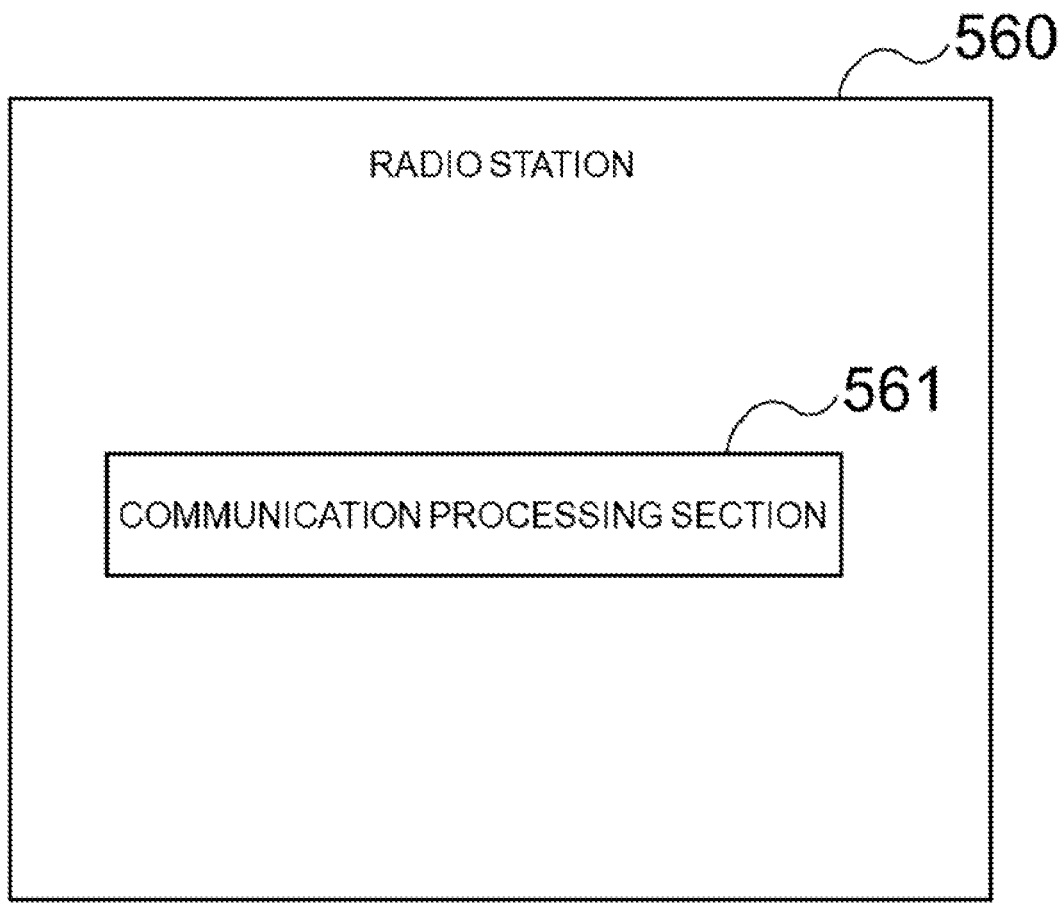
FIG. 38 is a block diagram illustrating an example of a schematic configuration of a radio station according to the sixth example aspect.

FIG. 38 is a block diagram illustrating an example of a schematic configuration of a radio station 560 according to the sixth example aspect. With reference to FIG. 38, the radio station 560 includes a communication processing section 561.

(1) Communication Processing Section 561

The communication processing section 561 communicates with another node (for example, a CN node). Specific operation of the communication processing section 561 will be described later.

(2) Implementation Example

Description for an example of implementation of the radio station 560 according to the sixth example aspect is the same as the description for the example of the implementation of the radio station 550 according to the fifth example aspect except for differences of reference signs. Thus, overlapping description is omitted herein.

9.5. Configuration of Mobile Terminal

Figure 39:
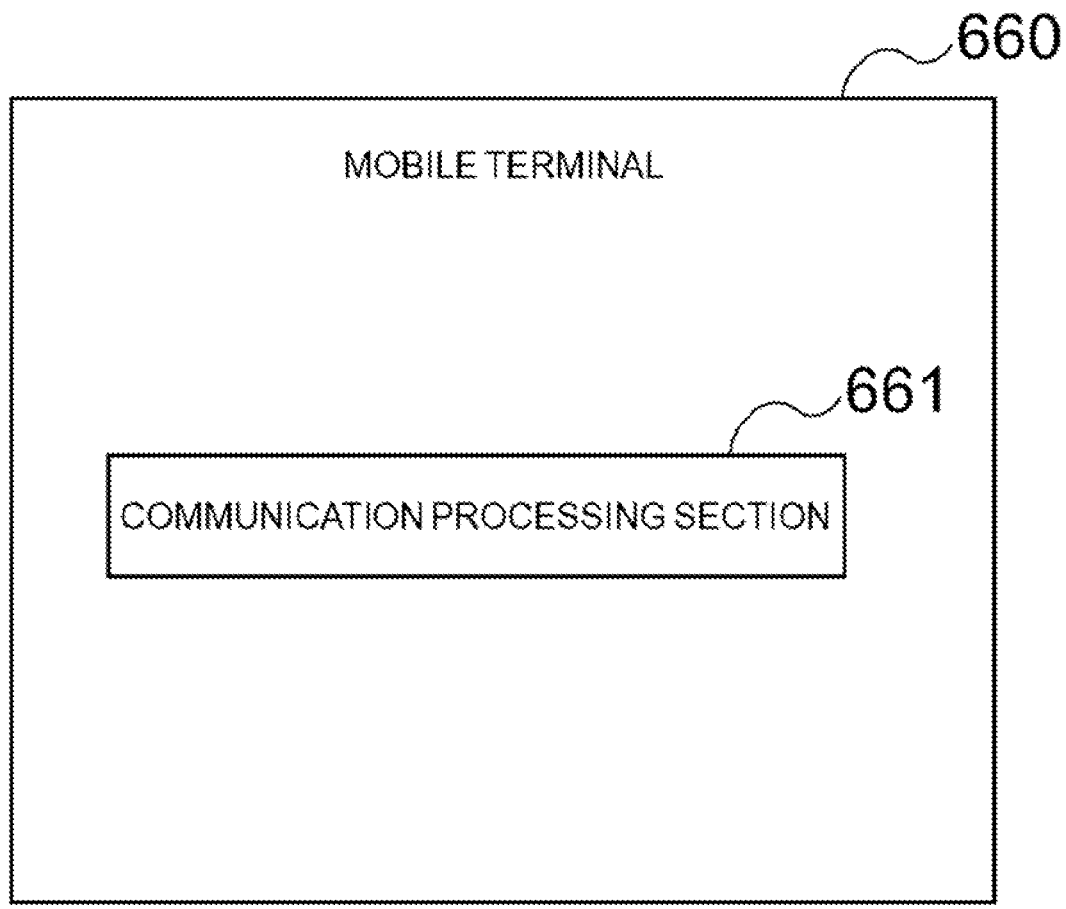
FIG. 39 is a block diagram illustrating an example of a schematic configuration of a mobile terminal according to the sixth example aspect.

FIG. 39 is a block diagram illustrating an example of a schematic configuration of a mobile terminal 660 according to the sixth example aspect. With reference to FIG. 39, the mobile terminal 660 includes a communication processing section 661.

(1) Communication Processing Section 661

The communication processing section 661 communicates with another node (for example, a radio station). Specific operation of the communication processing section 661 will be described later.

(2) Implementation Example

Description for an example of implementation of the mobile terminal 660 according to the sixth example aspect is the same as the description for the example of the implementation of the mobile terminal 650 according to the fifth example aspect except for differences of reference signs. Thus, overlapping description is omitted herein.

9.6. Operation Example

The radio station 560 (communication processing section 561) transmits resource information related to availability of a radio resource for at least one time period to the first CN node 260. The first CN node 260 (communication processing section 261) receives the resource information from the radio station 560, and transmits the resource information to the second CN node 360. The second CN node 360 (communication processing section 361) receives the resource information from the first CN node 260, and transmits the resource information to the control apparatus 160 that generates or acquires the flight path information for the mobile terminal. The control apparatus 160 (communication processing section 161) receives the resource information from the second CN node 360. Note that the mobile terminal 660 (communication processing section 661) communicates with the radio station 560.

For example, transmission and reception of the resource information in sixth example aspect is the same as the transmission and reception of the resource information in the first example aspect. Thus, overlapping description is omitted herein.

Note that the transmission and reception of the resource information in the sixth example aspect is not limited to the example the same as the first example aspect.

In the above, transmission and reception of the resource information according to the sixth example aspect is described. When the resource information is not transmitted to the control apparatus 160, the control apparatus 160 plans a flight of the mobile terminal 660 (for example, determines a flight path of the mobile terminal 660) without knowing availability of the radio resource. Thus, it may be difficult for the control apparatus 160 to determine the flight path in which the radio resource can be allocated. In contrast, when the resource information is transmitted to the control apparatus 160 as described above, the control apparatus 160 can know availability of the radio resource to a certain degree, and accordingly, it can be made easier for the control apparatus 160 to determine the flight path in which the radio resource can be allocated. As a result, it can be made easier to determine the flight path in which the flight of the mobile terminal 660 and safety of crew members boarding the mobile terminal 660 are allocated.

10. Seventh Example Aspect

Next, with reference to FIG. 40 to FIG. 44, the seventh example aspect of the present disclosure will be described. The second example aspect described above is a specific example aspect, whereas the seventh example aspect is a more generalized example aspect.

10.1. Configuration of Control Apparatus

Figure 40:
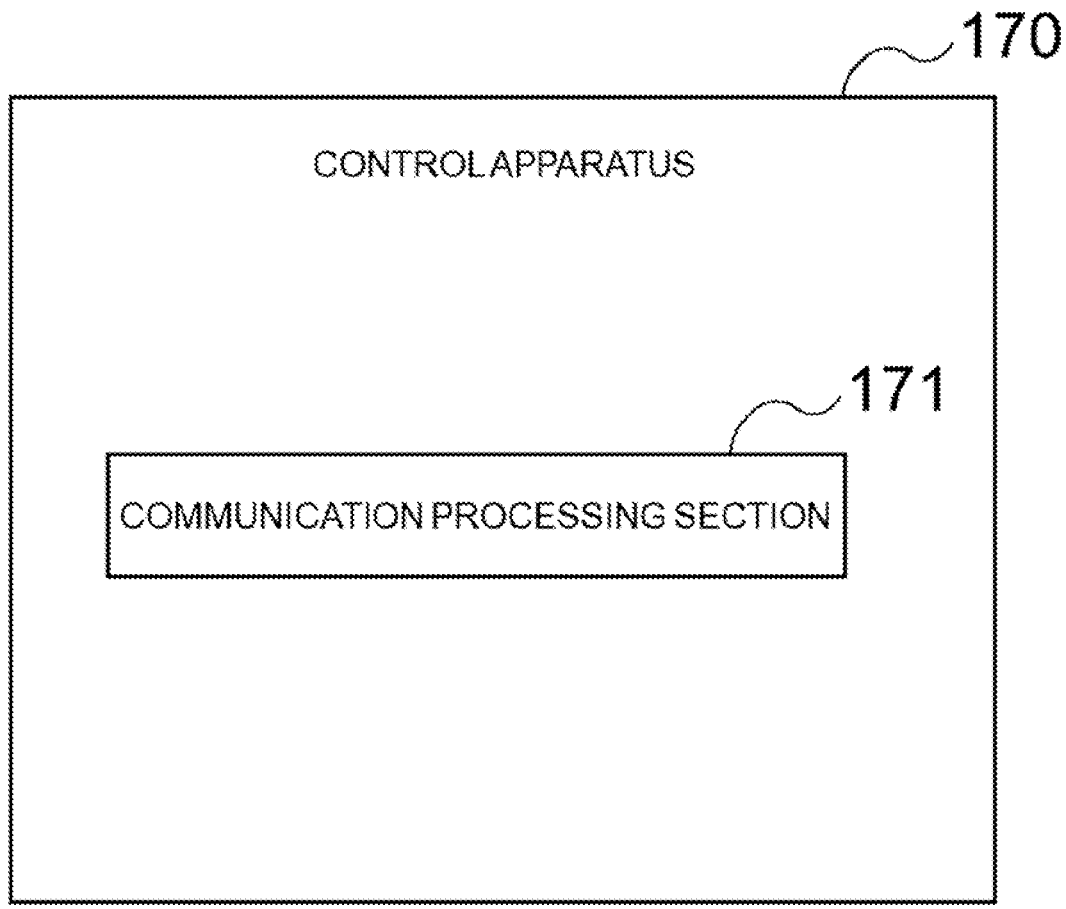
FIG. 40 is a block diagram illustrating an example of a schematic configuration of a control apparatus according to the seventh example aspect.

FIG. 40 is a block diagram illustrating an example of a schematic configuration of a control apparatus 170 according to the seventh example aspect. With reference to FIG. 40, the control apparatus 170 includes a communication processing section 171.

(1) Communication Processing Section 171

The communication processing section 171 communicates with another node (for example, a CN node). Specific operation of the communication processing section 171 will be described later.

(2) Implementation Example

Description for an example of implementation of the control apparatus 170 according to the seventh example aspect is the same as the description for the example of the implementation of the control apparatus 160 according to the sixth example aspect except for differences of reference signs. Thus, overlapping description is omitted herein.

10.2. Configuration of First Core Network Node

Figure 41:
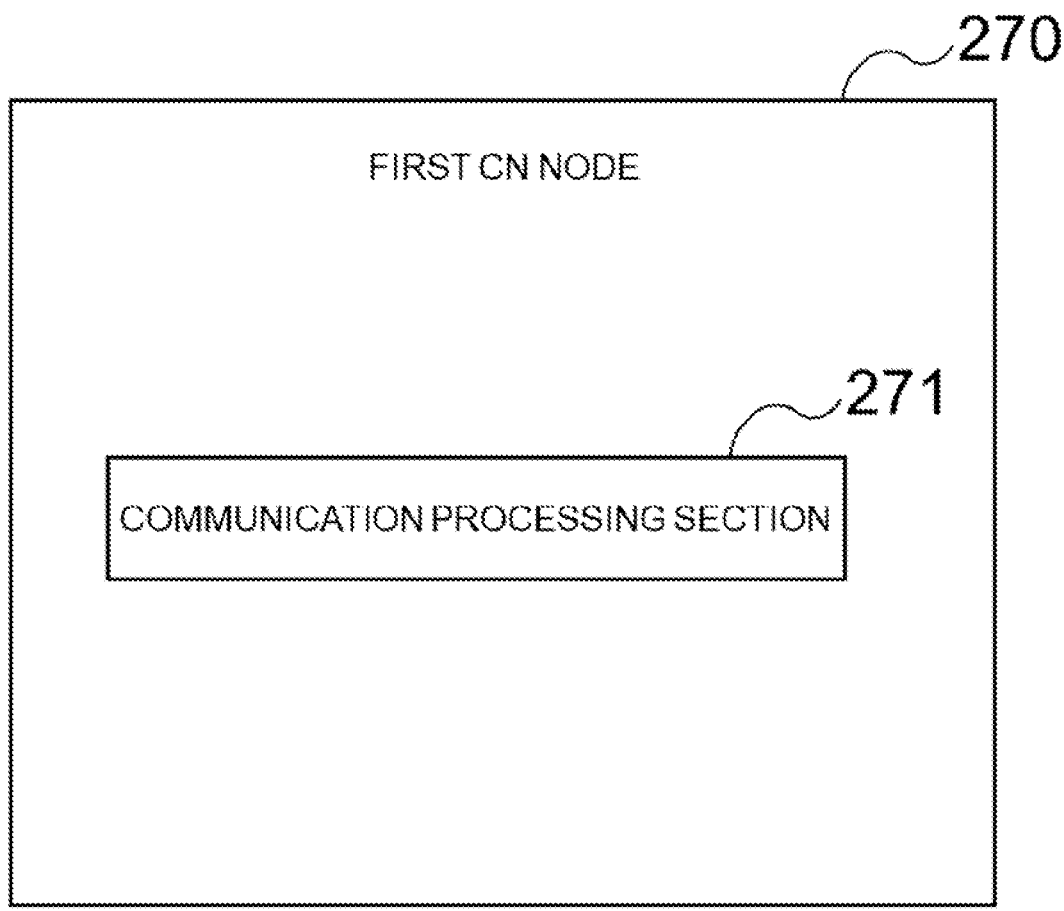
FIG. 41 is a block diagram illustrating an example of a schematic configuration of a first core network node according to the seventh example aspect.

FIG. 41 is a block diagram illustrating an example of a schematic configuration of a first CN node 270 according to the seventh example aspect. With reference to FIG. 41, the first CN node 270 includes a communication processing section 271.

(1) Communication Processing Section 271

The communication processing section 271 communicates with another node (for example, a radio station or a CN node). Specific operation of the communication processing section 271 will be described later.

(2) Implementation Example

Description for an example of implementation of the first CN node 270 according to the seventh example aspect is the same as the description for the example of the implementation of the first CN node 260 according to the sixth example aspect except for differences of reference signs. Thus, overlapping description is omitted herein.

10.3. Configuration of Second Core Network Node

Figure 42:
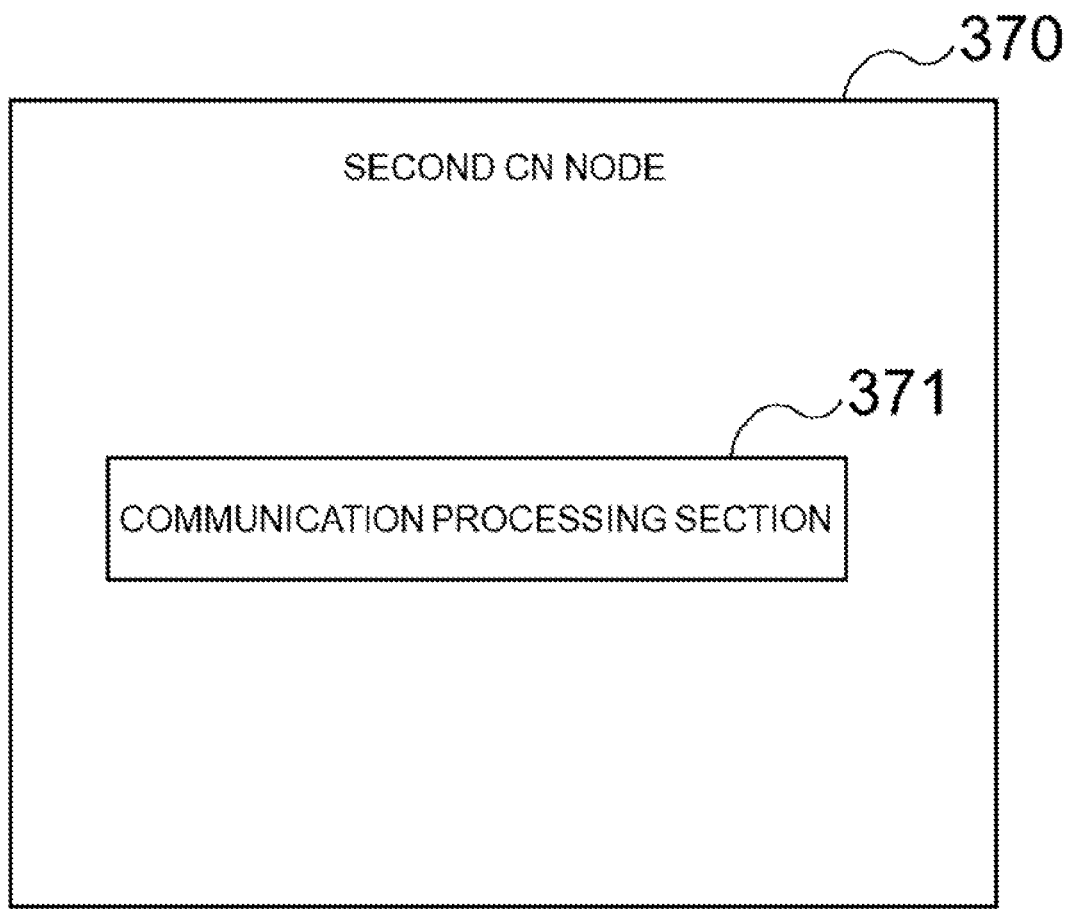
FIG. 42 is a block diagram illustrating an example of a schematic configuration of a second core network node according to the seventh example aspect.

FIG. 42 is a block diagram illustrating an example of a schematic configuration of a second CN node 370 according to the seventh example aspect. With reference to FIG. 42, the second CN node 370 includes a communication processing section 371.

(1) Communication Processing Section 371

The communication processing section 371 communicates with another node (for example, a CN node or a control apparatus). Specific operation of the communication processing section 371 will be described later.

(2) Implementation Example

Description for an example of implementation of the second CN node 370 according to the seventh example aspect is the same as the description for the example of the implementation of the second CN node 360 according to the sixth example aspect except for differences of reference signs. Thus, overlapping description is omitted herein.

10.4. Configuration of Radio Station

Figure 43:
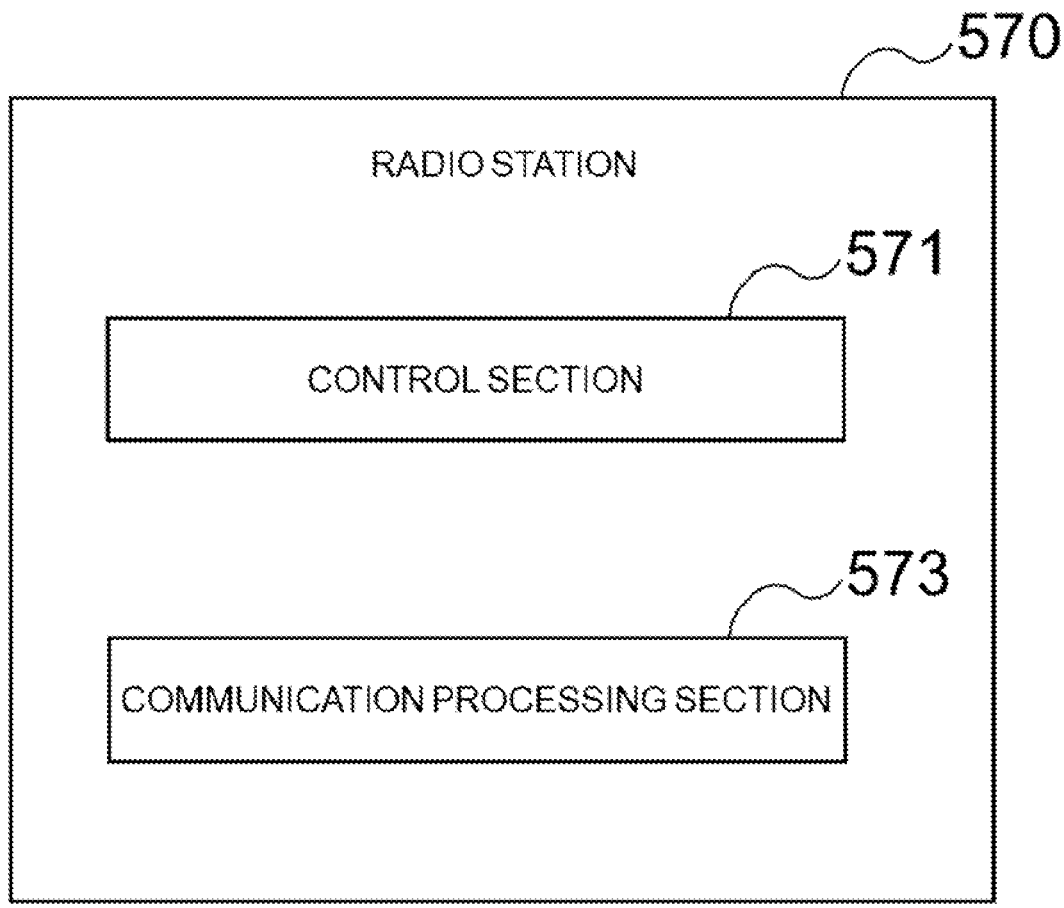
FIG. 43 is a block diagram illustrating an example of a schematic configuration of a radio station according to the seventh example aspect.

FIG. 43 is a block diagram illustrating an example of a schematic configuration of a radio station 570 according to the seventh example aspect. With reference to FIG. 43, the radio station 570 includes a control section 571 and a communication processing section 573.

(1) Control Section 571

The control section 571 performs control in the radio station 570. Specific operation of the control section 571 will be described later.

(2) Communication Processing Section 573

The communication processing section 573 communicates with another node (for example, a CN node). Specific operation of the communication processing section 573 will be described later.

(3) Implementation Example

The control section 571 and the communication processing section 573 may be implemented with one or more processors and a memory. The control section 571 and the communication processing section 573 may be implemented with the same processor, or may be implemented with separate processors. The memory may be included in the one or more processors, or may be outside of the one or more processors. The control section 571 and the communication processing section 573 may be implemented with a controller, and the controller may include one or more processors and a memory.

The radio station 570 may include a network adapter, a network interface card, a transmitter, a receiver, a transceiver, and/or the like for wired communication. The radio station 570 may include an antenna, a radio frequency (RF) circuit, a transmitter, a receiver, a transceiver, and/or the like for radio communication. In addition, the radio station 570 may include a hard disk.

The radio station 570 may include a memory storing programs (one or more instructions), and one or more processors that can execute the programs (the one or more instructions). The one or more processors may execute the program, and thereby perform operation of the control section 571 and the communication processing section 573. The program may be a program for causing the processor(s) to execute the operation of the control section 571 and the communication processing section 573.

The radio station 570 may include a transceiver and a controller. The controller may perform the operation of the control section 571 and the communication processing section 573, and may transmit and receive information or a message via the transceiver.

Note that the radio station 570 may be partially or entirely virtualized. In other words, a part or all of the radio station 570 may be implemented as a virtual machine. In this case, a part or all of the radio station 570 (the virtual machine) may operate as a physical machine (hardware) including a processor, a memory, and the like, and as a virtual machine on a hypervisor.

10.5. Configuration of Mobile Terminal

Figure 44:
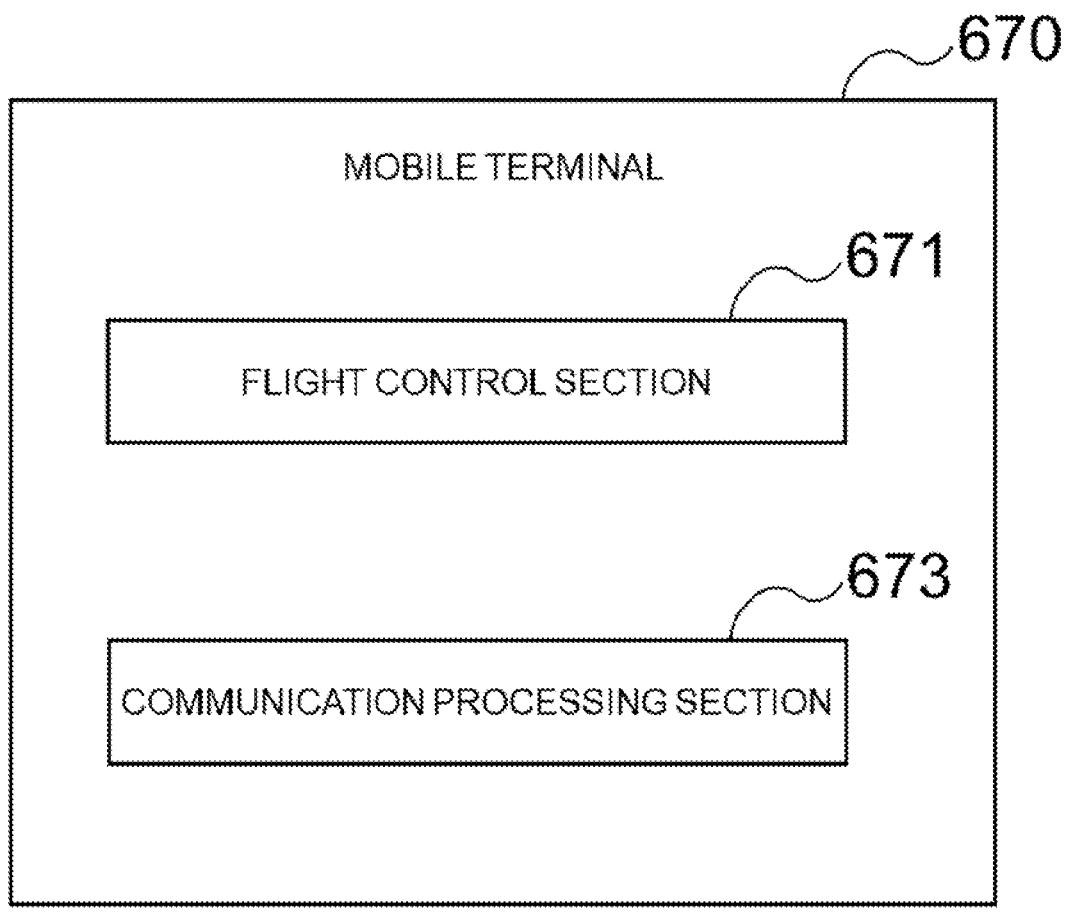
FIG. 44 is a block diagram illustrating an example of a schematic configuration of a mobile terminal according to the seventh example aspect.

FIG. 44 is a block diagram illustrating an example of a schematic configuration of a mobile terminal 670 according to the seventh example aspect. With reference to FIG. 44, the mobile terminal 670 includes a flight control section 671 and a communication processing section 673.

(1) Flight Control Section 671

The flight control section 671 performs control of the flight of the mobile terminal 670. Specific operation of the flight control section 671 will be described later.

(2) Communication Processing Section 673

The communication processing section 673 communicates with another node (for example, a radio station). Specific operation of the communication processing section 673 will be described later.

(3) Implementation Example

The flight control section 671 and the communication processing section 673 may be implemented with one or more processors and a memory. The flight control section 671 and the communication processing section 673 may be implemented with the same processor, or may be implemented with separate processors. The memory may be included in the one or more processors, or may be outside of the one or more processors. As an example, the flight control section 671 and the communication processing section 673 may be implemented in an SoC. The flight control section 671 and the communication processing section 673 may be implemented with a controller, and the controller may include one or more processors and a memory. As an example, the flight control section 671 may be implemented with a flight controller. The communication processing section 673 may be implemented with the flight controller, or may be implemented with another controller.

The mobile terminal 670 may include an antenna, a radio frequency (RF) circuit, a transmitter, a receiver, a transceiver, and/or the like for radio communication. In addition, the mobile terminal 670 may include a hard disk.

The mobile terminal 670 may include a memory storing programs (one or more instructions), and one or more processors that can execute the programs (the one or more instructions). The one or more processors may execute the program, and thereby perform operation of the flight control section 671 and the communication processing section 673. The program may be a program for causing the processor(s) to execute the operation of the flight control section 671 and the communication processing section 673.

The mobile terminal 670 may include a transceiver and a controller. The controller may perform the operation of the flight control section 671 and the communication processing section 673, and may transmit and receive information or a message via the transceiver.

Note that, when the mobile terminal 670 is not an apparatus to be attached to the flight apparatus but is the flight apparatus itself, the mobile terminal 670 may further include a flight section. The flight section may be implemented with a battery, a motor, an ESC, and the like.

10.6. Operation Example

The mobile terminal 670 moves according to the flight path information.

The control apparatus 170 (communication processing section 171) transmits a first request message for requesting allocation of the radio resource for the mobile terminal 670 to a core network connected to the radio station 570 that allocates the radio resource.

The second CN node 370 (communication processing section 371) receives the first request message from the control apparatus. In response to reception of the first request message, the second CN node 370 (communication processing section 371) transmits a third request message for requesting the allocation to the first CN node 270 or to a third CN node that transmits a further request message to the first CN node 270.

The first CN node 270 (communication processing section 271) included in the core network transmits a second request message for requesting allocation of a radio resource for the mobile terminal 670 that moves according to the flight path information to the radio station 570 that allocates the radio resource.

The radio station 570 (communication processing section 573) receives the second request message from the first CN node. In response to reception of the second request message, the radio station 570 (control section 571) performs the allocation.

Note that the mobile terminal 670 (communication processing section 673) communicates with the radio station 560.

For example, the above-described operation of the seventh example aspect is the same as the operation of the second example aspect. Thus, overlapping description is omitted herein.

Note that the above-described operation of the seventh example aspect is not limited to the example the same as the operation of the second example aspect.

In the above, the seventh example aspect is described. When allocation of a radio resource for the mobile terminal 670 moving according to the flight path information is not requested, the radio resource is not allocated, which may make it difficult for the mobile terminal 670 to continuously communicate during a flight. As a result, it may be difficult to appropriately control the flight of the mobile terminal 670 from the outside. In contrast, when allocation of a radio resource for the mobile terminal 670 is requested in advance according to the flight path information as described above, the radio resource on the flight path of the mobile terminal 670 is allocated in advance, and thus the mobile terminal 670 can more easily continuously communicate during a flight. As a result, it can be made easier to ensure the flight of the mobile terminal 670 and safety of crew members boarding the mobile terminal 670.

11. Eighth Example Aspect

Next, with reference to FIG. 45 to FIG. 48, the eighth example aspect of the present disclosure will be described.

The third example aspect described above is a specific example aspect, whereas the eighth example aspect is a more generalized example aspect.

11.1. Configuration of Control Apparatus

Figure 45:
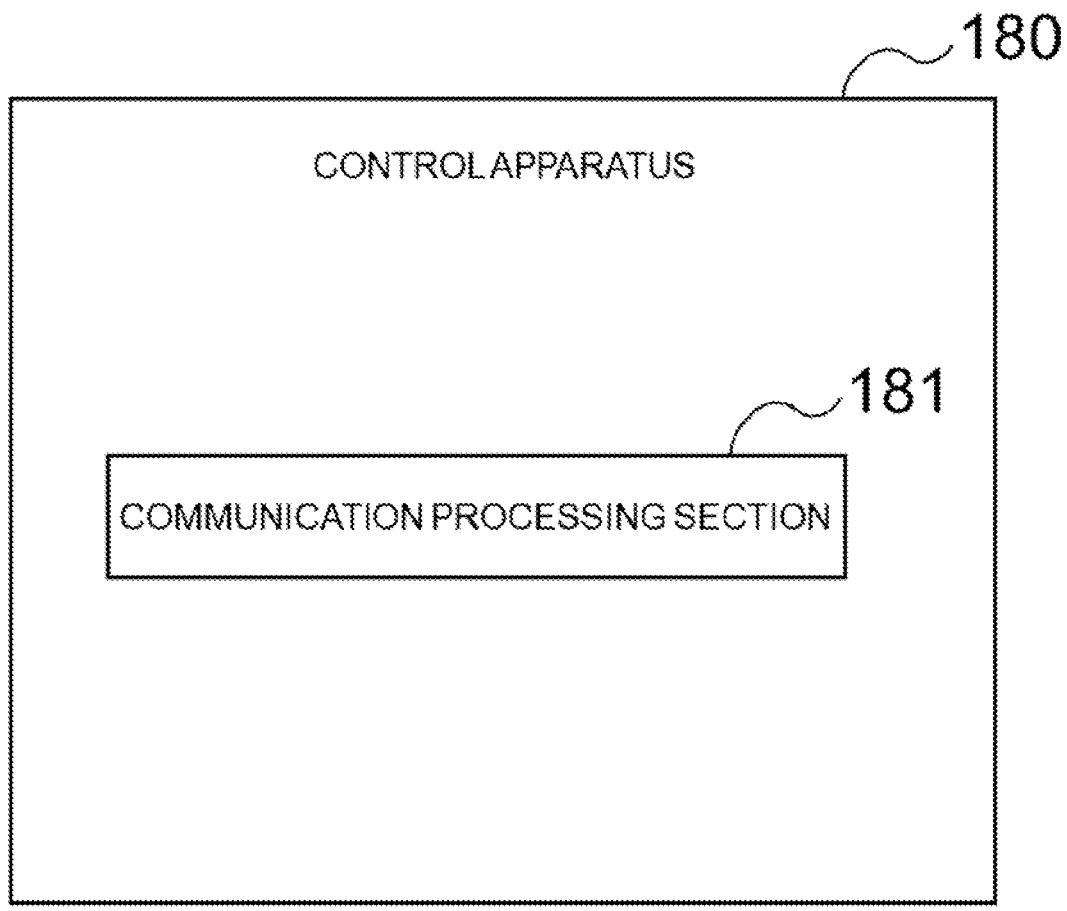
FIG. 45 is a block diagram illustrating an example of a schematic configuration of a control apparatus according to the eighth example aspect.

FIG. 45 is a block diagram illustrating an example of a schematic configuration of a control apparatus 180 according to the eighth example aspect. With reference to FIG. 45, the control apparatus 180 includes a communication processing section 181.

(1) Communication Processing Section 181

The communication processing section 181 communicates with another node (for example, a CN node). Specific operation of the communication processing section 181 will be described later.

(2) Implementation Example

Description for an example of implementation of the control apparatus 180 according to the eighth example aspect is the same as the description for the example of the implementation of the control apparatus 160 according to the sixth example aspect except for differences of reference signs. Thus, overlapping description is omitted herein.

11.2. Configuration of First Core Network Node

Figure 46:
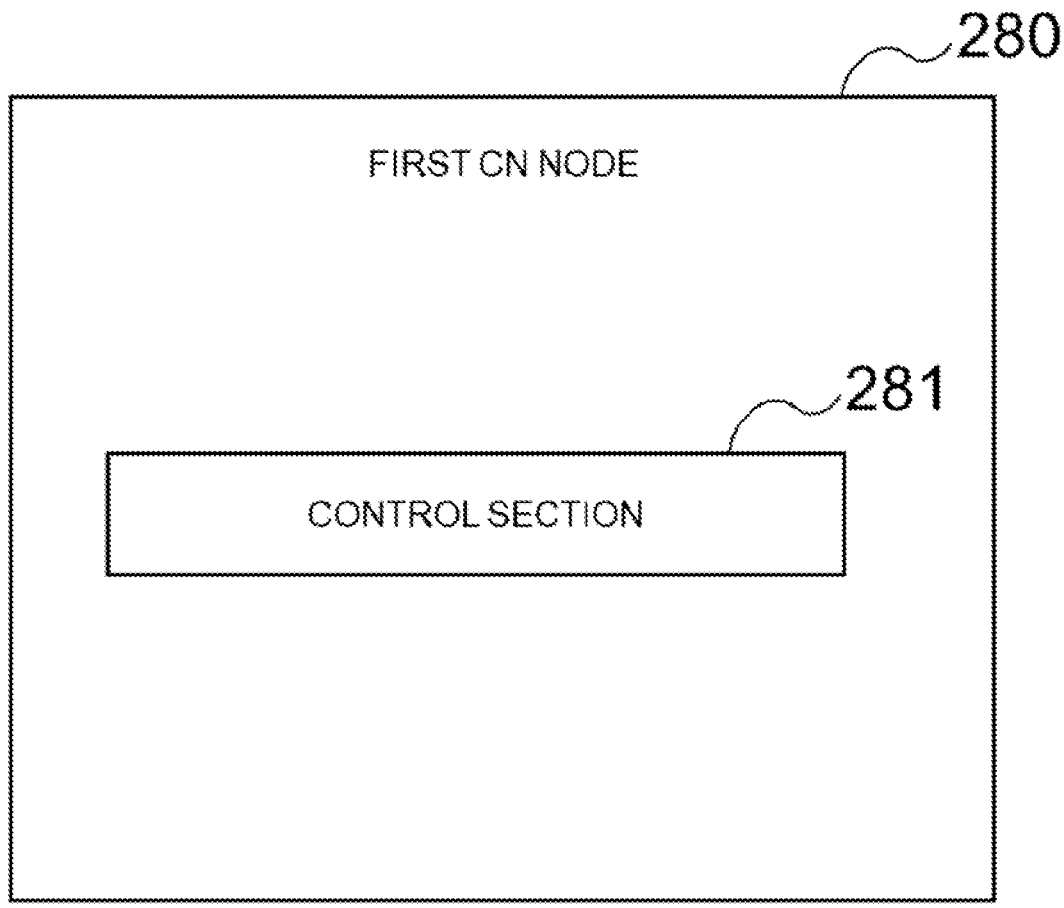
FIG. 46 is a block diagram illustrating an example of a schematic configuration of a first core network node according to the eighth example aspect.

FIG. 46 is a block diagram illustrating an example of a schematic configuration of a first CN node 280 according to the eighth example aspect. With reference to FIG. 46, the first CN node 280 includes a control section 281.

(1) Control Section 281

The control section 281 performs control in the first CN node 280. Specific operation of the control section 281 will be described later.

(2) Implementation Example

The control section 281 may be implemented with one or more processors and a memory. The memory may be included in the one or more processors, or may be outside of the one or more processors. The control section 281 may be implemented with a controller, and the controller may include one or more processors and a memory.

The first CN node 280 may include a network adapter, a network interface card, a transmitter, a receiver, a transceiver, and/or the like. In addition, the first CN node 280 may include a hard disk.

The first CN node 280 may include a memory storing programs (one or more instructions), and one or more processors that can execute the programs (the one or more instructions). The one or more processors may execute the program, and thereby perform operation of the control section 281. The program may be a program for causing the processor(s) to execute the operation of the control section 281.

The first CN node 280 may include a transceiver and a controller. The controller may perform the operation of the control section 281, and may transmit and receive information or a message via the transceiver.

Note that the first CN node 280 may be virtualized. In other words, the first CN node 280 may be implemented as a virtual machine. In this case, the first CN node 280 (the virtual machine) may operate as a physical machine (hardware) including a processor, a memory, and the like, and as a virtual machine on a hypervisor.

11.3. Configuration of Second Core Network Node

Figure 47:
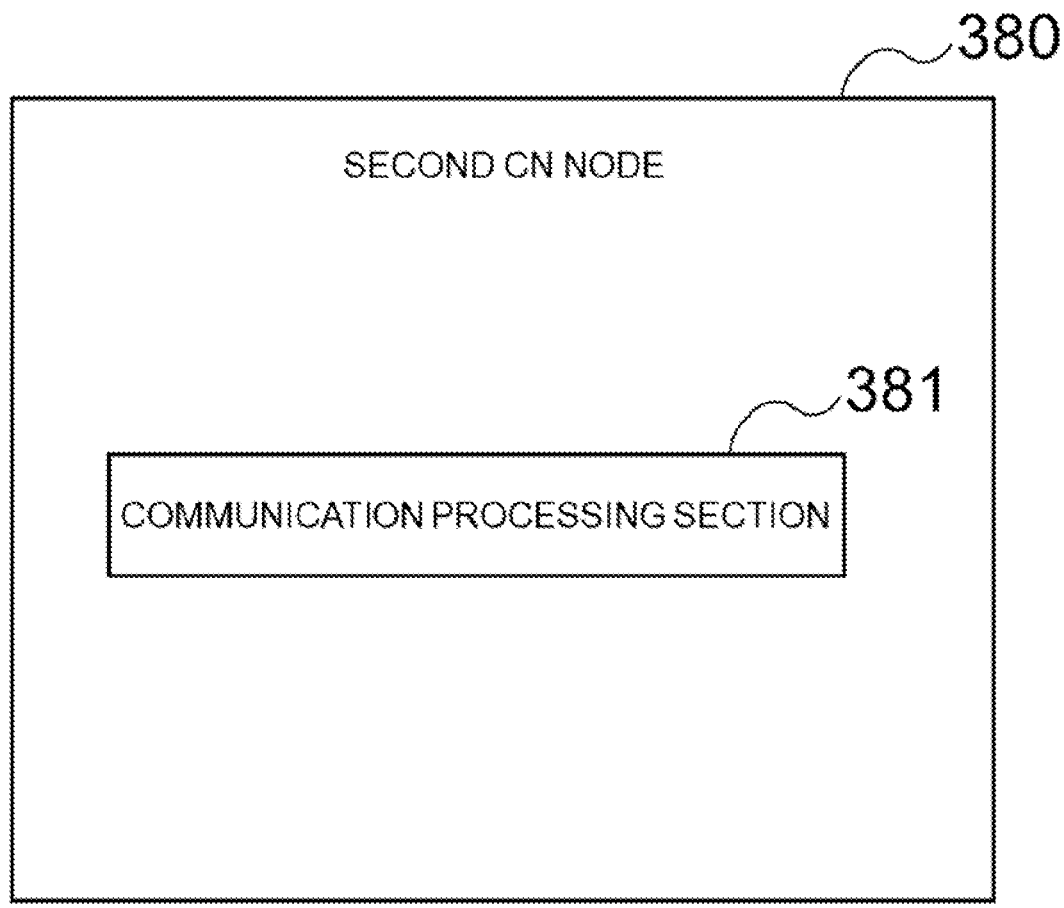
FIG. 47 is a block diagram illustrating an example of a schematic configuration of a second core network node according to the eighth example aspect.

FIG. 47 is a block diagram illustrating an example of a schematic configuration of a second CN node 380 according to the eighth example aspect. With reference to FIG. 47, the second CN node 380 includes a communication processing section 381.

(1) Communication Processing Section 381

The communication processing section 381 communicates with another node (for example, a CN node or a control apparatus). Specific operation of the communication processing section 381 will be described later.

(2) Implementation Example

Description for an example of implementation of the second CN node 380 according to the eighth example aspect is the same as the description for the example of the implementation of the second CN node 360 according to the sixth example aspect except for differences of reference signs. Thus, overlapping description is omitted herein.

11.4. Configuration of Mobile Terminal

Figure 48:
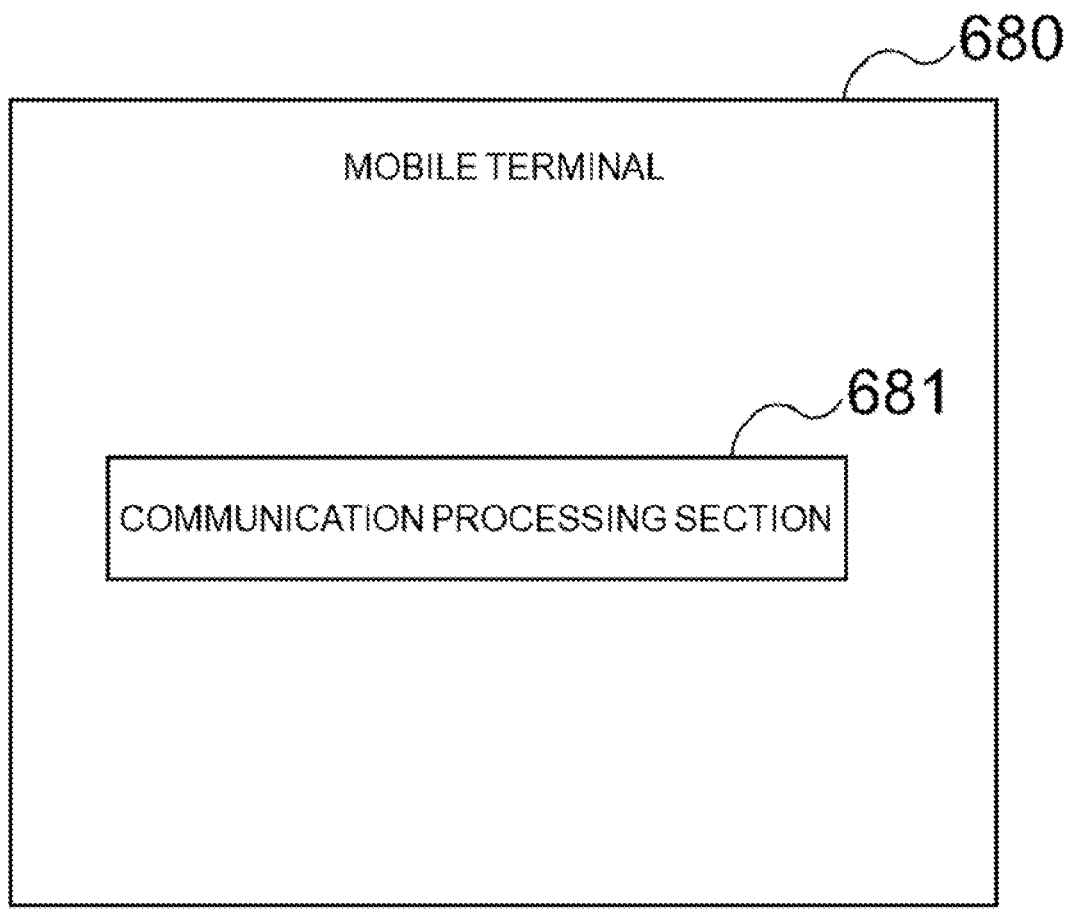
FIG. 48 is a block diagram illustrating an example of a schematic configuration of a mobile terminal according to the eighth example aspect.

FIG. 48 is a block diagram illustrating an example of a schematic configuration of a mobile terminal 680 according to the eighth example aspect. With reference to FIG. 48, the mobile terminal 680 includes a communication processing section 681.

(1) Communication Processing Section 681

The communication processing section 681 communicates with another node (for example, a radio station). Specific operation of the communication processing section 681 will be described later.

(2) Implementation Example

Description for an example of implementation of the mobile terminal 680 according to the eighth example aspect is the same as the description for the example of the implementation of the mobile terminal 650 according to the fifth example aspect except for differences of reference signs. Thus, overlapping description is omitted herein.

11.5. Operation Example

The control apparatus 180 (communication processing section 181) transmits a first request message for requesting paging of the mobile terminal 680 to the core network for the flight of the mobile terminal 680 in which the radio resource is allocated.

The second CN node 380 (communication processing section 381) receives the first request message. In response to reception of the first request message, the second CN node 380 (communication processing section 381) transmits a second request message requesting the paging to the first CN node 280 or to a third CN node that transmits a further request message to the first CN node 280.

In response to reception of the first request message in the core network, the first CN node 280 (control section 281) included in the core network performs the paging via the radio station 580.

The mobile terminal 680 (communication processing section 681) transmits a message for requesting start of communication for the flight of the mobile terminal 680 in which a radio resource is allocated to the first CN node 280.

For example, the above-described operation of the eighth example aspect is the same as the operation of the third example aspect. Thus, overlapping description is omitted herein.

Note that the above-described operation of the eighth example aspect is not limited to the example the same as the operation of the third example aspect.

In the present example aspect, at least one of the mobile terminal 680 and the control apparatus 180 requests start of communication, based on at least one of the flight path information and the flight related information. At least one of the flight path information and the flight related information is information for securing that the radio resource in the flight path of the mobile terminal 680 is allocated, and thus by performing the request for start of communication based on these, the mobile terminal 680 may be able to more easily continuously communicate during a flight. As a result, it can be made easier to ensure the flight of the mobile terminal 680 and safety of crew members boarding the mobile terminal 680.

For example, when the paging of the mobile terminal 680 is not requested, the flight of the mobile terminal 680 is voluntarily started in the mobile terminal 680. Thus, it may be difficult for the control apparatus 180 to control the flight of the mobile terminal 680 from the start time point. In contrast, as described in the eighth example aspect, when the paging of the mobile terminal 680 is requested, the flight of the mobile terminal 680 is started in response to a request from the network. Thus, the control apparatus 180 is enabled to control the flight of the mobile terminal 680 from the start time point.

As described in the eighth example aspect, when the mobile terminal 680 transmits a message for requesting start of communication for the flight of the mobile terminal 680 to the first CN node 280, the mobile terminal 680 is enabled to communicate from the start time of the flight.

12. Ninth Example Aspect

Next, with reference to FIG. 49 to FIG. 51, the ninth example aspect of the present disclosure will be described. The fourth example aspect described above is a specific example aspect, whereas the ninth example aspect is a more generalized example aspect.

12.1. Configuration of Core Network Node

Figure 49:
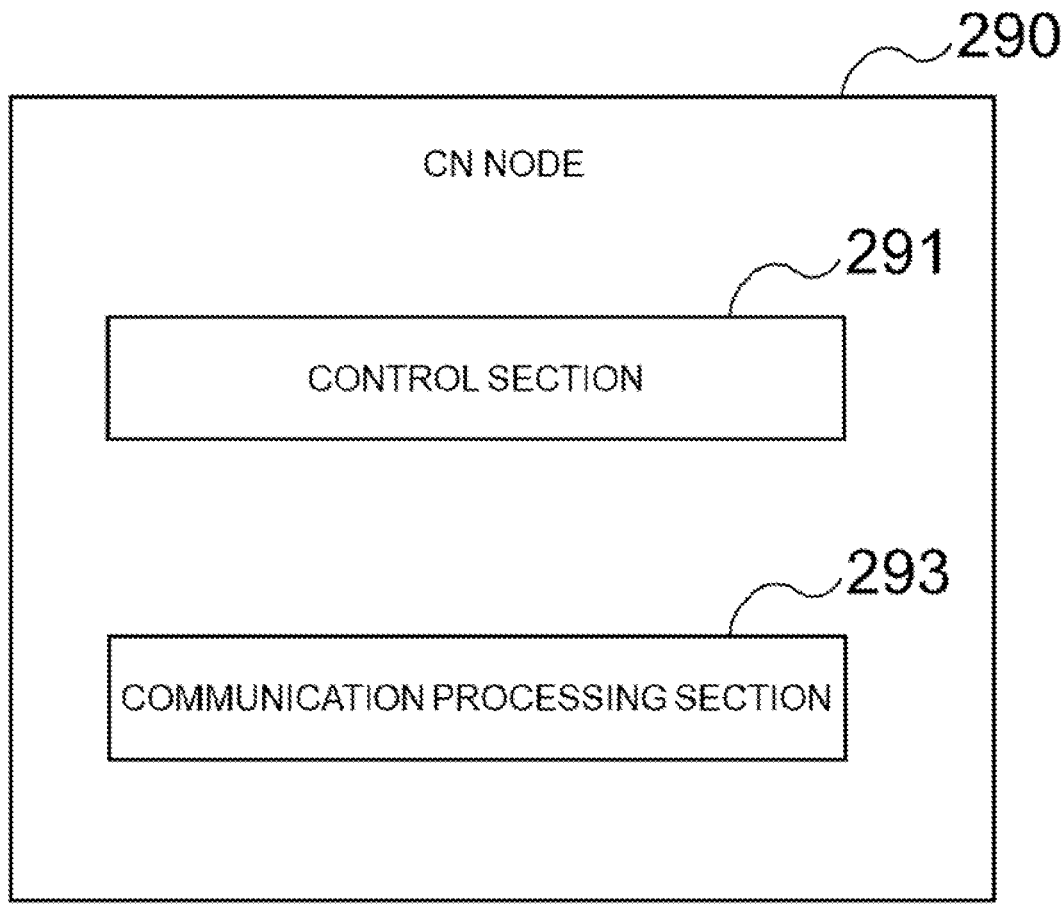
FIG. 49 is a block diagram illustrating an example of a schematic configuration of a core network node according to a ninth example aspect.

FIG. 49 is a block diagram illustrating an example of a schematic configuration of a CN node 290 according to the ninth example aspect. With reference to FIG. 49, the CN node 290 includes a control section 291 and a communication processing section 293.

(1) Control Section 291

The control section 291 performs control in the CN node 290. Specific operation of the control section 291 will be described later.

(2) Communication Processing Section 293

The communication processing section 293 communicates with another node (for example, a radio station). Specific operation of the communication processing section 293 will be described later.

(3) Implementation Example

The control section 291 and the communication processing section 293 may be implemented with one or more processors and a memory. The control section 291 and the communication processing section 293 may be implemented with the same processor, or may be implemented with separate processors. The memory may be included in the one or more processors, or may be outside of the one or more processors. The control section 291 and the communication processing section 293 may be implemented with a controller, and the controller may include one or more processors and a memory.

The CN node 290 may include a network adapter, a network interface card, a transmitter, a receiver, a transceiver, and/or the like. In addition, the CN node 290 may include a hard disk.

The CN node 290 may include a memory storing programs (one or more instructions), and one or more processors that can execute the programs (the one or more instructions). The one or more processors may execute the program, and thereby perform operation of the control section 291 and the communication processing section 293. The program may be a program for causing the processor(s) to execute the operation of the control section 291 and the communication processing section 293.

The CN node 290 may include a transceiver and a controller. The controller may perform the operation of the control section 291 and the communication processing section 293, and may transmit and receive information or a message via the transceiver.

Note that the CN node 290 may be virtualized. In other words, the CN node 290 may be implemented as a virtual machine. In this case, the CN node 290 (the virtual machine) may operate as a physical machine (hardware) including a processor, a memory, and the like, and as a virtual machine on a hypervisor.

12.2. Configuration of Radio Station

Figure 50:
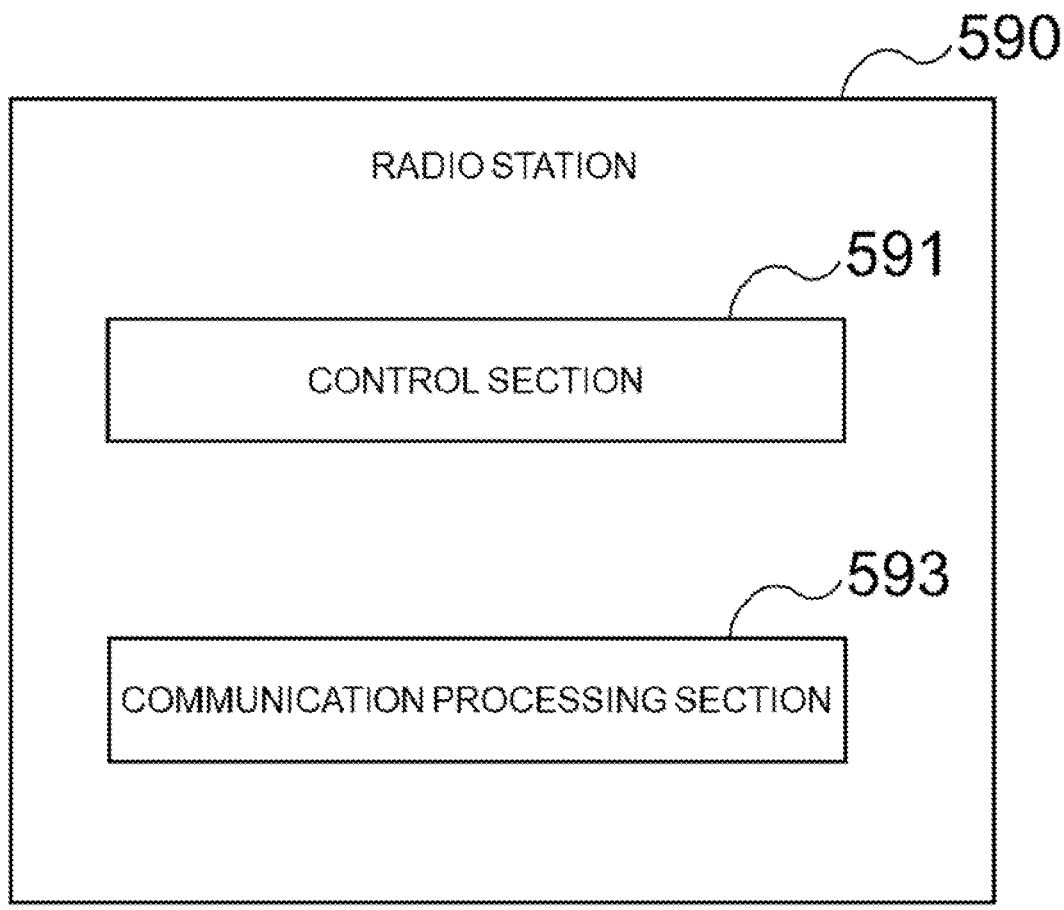
FIG. 50 is a block diagram illustrating an example of a schematic configuration of a radio station according to the ninth example aspect.

FIG. 50 is a block diagram illustrating an example of a schematic configuration of a radio station 590 according to the ninth example aspect. With reference to FIG. 50, the radio station 590 includes a control section 591 and a communication processing section 593.

(1) Control Section 591

The control section 591 performs control in the radio station 590. Specific operation of the control section 591 will be described later.

(2) Communication Processing Section 593

The communication processing section 593 communicates with another node (for example, a CN node). Specific operation of the communication processing section 593 will be described later.

(3) Implementation Example

Description for an example of implementation of the radio station 590 according to the ninth example aspect is the same as the description for the example of the implementation of the radio station 570 according to the seventh example aspect except for differences of reference signs. Thus, overlapping description is omitted herein.

12.3. Configuration of Mobile Terminal

Figure 51:
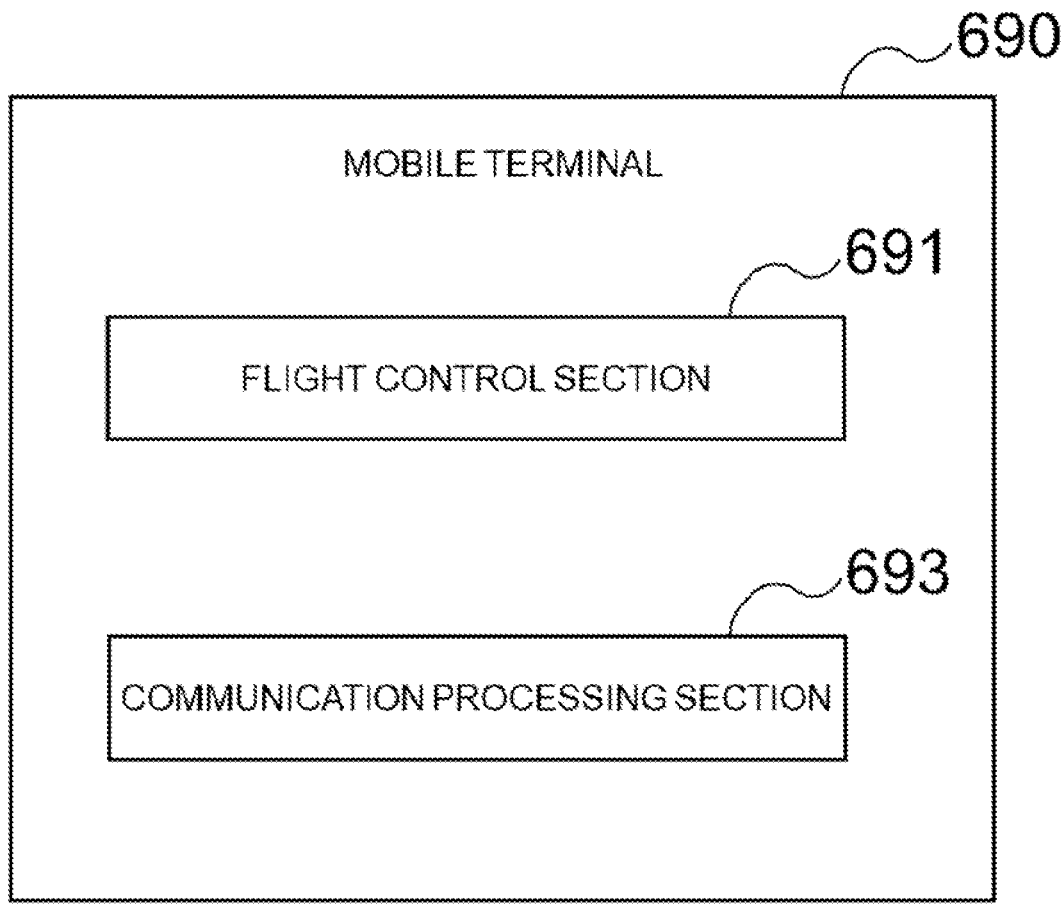
FIG. 51 is a block diagram illustrating an example of a schematic configuration of a mobile terminal according to the ninth example aspect.

FIG. 51 is a block diagram illustrating an example of a schematic configuration of a mobile terminal 690 according to the ninth example aspect. With reference to FIG. 51, the mobile terminal 690 includes a flight control section 691 and a communication processing section 693.

(1) Flight Control Section 691

The flight control section 691 performs control of the flight of the mobile terminal 690. Specific operation of the flight control section 691 will be described later.

(2) Communication Processing Section 693

The communication processing section 693 communicates with another node (for example, a radio station). Specific operation of the communication processing section 693 will be described later.

(3) Implementation Example

Description for an example of implementation of the mobile terminal 690 according to the ninth example aspect is the same as the description for the example of the implementation of the mobile terminal 670 according to the seventh example aspect except for differences of reference signs. Thus, overlapping description is omitted herein.

12.4. Operation Example

The mobile terminal 690 moves according to the flight path information.

A first radio station 590A (control section 591) controls a handover of the mobile terminal 690, the handover being a handover according to the flight path information from a second radio station 590B to the first radio station 590A. The first radio station 590A (communication processing section 593) causes the second radio station 500B to transmit a message including information related to acceptance of the handover without receiving a request message for the handover transmitted from the second radio station 590B.

The second radio station 590B (control section 591) controls a handover of the mobile terminal 690, the handover being a handover according to the flight path information from a second radio station 590B to the first radio station 590A. The second radio station 590B (communication processing section 593) receives the message including information related to acceptance of the handover without transmitting a request message for the handover.

The CN node 290 (control section 291) generates a request message for a handover of the mobile terminal 690, the handover being a handover according to the flight path information from the second radio station 590B to the first radio station 590A. The CN node 290 (communication processing section 293) transmits the request message to the first radio station 590A without receiving the request message from the second radio station 590B. The request message triggers transmission, by the first radio station 590A, of a message including information related to acceptance of the handover to the second radio station 590B without receiving a request message for the handover transmitted from the second radio station 590B.

The mobile terminal 690 (flight control section 691) controls movement of the mobile terminal 600 according to the flight path information. The mobile terminal 690 (communication processing section 693) communicates with the second radio station 590B.

For example, the above-described operation of the ninth example aspect is the same as the operation of the fourth example aspect. Thus, overlapping description is omitted herein.

Note that the above-described operation of the ninth example aspect is not limited to the example the same as the operation of the fourth example aspect.

In the above, the ninth example aspect is described. For example, when the message including the acceptance information is not transmitted to the second radio station 590B, as with a general procedure, the second radio station 590B transmits a request message for the handover without knowing whether or not the radio resource for the mobile terminal 690 in the first radio station 590A is allocated. Thus, even if the request message is transmitted, the radio resource is not necessarily allocated, and the mobile terminal 690 may not necessarily be able to communicate in the target cell during a flight. In contrast, when the message including the acceptance information is transmitted to the second radio station 590B as described above, the second radio station 590B can transmit a request message for the handover or start execution of the handover without transmitting the request message, knowing that the radio resource for the mobile terminal 690 in the first radio station 590A is allocated. Thus, the mobile terminal 690 is enabled to more securely communicate in the target cell during a flight. As a result, it can be made easier to allocate the flight of the mobile terminal 690 and safety of crew members boarding the mobile terminal 690.

In the above, the example aspects of the present disclosure are described. However, the present disclosure is not limited to these example aspects. It should be understood by those of ordinary skill in the art that these example embodiments are merely examples and that various alterations are possible without departing from the scope and the spirit of the present disclosure.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

A component or a module including one or more constituent elements of each node described in the Specification may be provided. Moreover, methods including processing of the one or more constituent elements may be provided, and programs for causing a processor to execute processing of the one or more constituent elements may be provided. Moreover, non-transitory computer readable recording media (non-transitory computer readable recording medium) having recorded thereon the programs may be provided. It is apparent that such components, modules, methods, programs, and non-transitory computer readable recording media are also included in the present disclosure.

The whole or part of the example aspects disclosed above can be described as, but not limited to, the following supplementary notes.

<Supplementary Note A>
(Supplementary Note A1)
A radio station including:
a communication processing section configured to transmit first capability information indicating whether or not to support operation of the radio station for performing flight management of a manned flight vehicle capable of flying using a radio communication network to a core network node.

(Supplementary Note A2)
The radio station according to supplementary note A1, wherein
the operation of the radio station includes providing resource information related to availability of a radio resource for at least one time period.

(Supplementary Note A3)
The radio station according to supplementary note A2, wherein
the resource information is information related to availability of a radio resource for each time period.

(Supplementary Note A4)
The radio station according to supplementary note A2 or A3, wherein
the resource information is information related to availability of a radio resource for each frequency band for at least one time period.

(Supplementary Note A5)
The radio station according to any one of supplementary notes A2 to A4, wherein
the resource information is information related to availability of a radio resource for each time period and for each frequency band.

(Supplementary Note A6)
The radio station according to any one of supplementary notes A2 to A5, wherein
the resource information is information indicating whether or not the radio resource is available.

(Supplementary Note A7)
The radio station according to any one of supplementary notes A2 to A6, wherein
the resource information is information indicating a degree of availability of the radio resource.

(Supplementary Note A8)
The radio station according to any one of supplementary notes A2 to A7, wherein
the core network node is a core network node configured to request the resource information to the radio station, or receive the resource information from the radio station.

(Supplementary Note A9)
The radio station according to any one of supplementary notes A1 to A8, wherein
the core network node is a core network node configured to manage at least one of access and mobility of a mobile terminal.

(Supplementary Note A10)
The radio station according to any one of supplementary notes A1 to A9, wherein
the core network node is an access and mobility management function (AMF), and
the radio station is an NG-radio access network (RAN) node.

(Supplementary Note A11)
The radio station according to any one of supplementary notes A1 to A10, wherein the communication processing section is configured to transmit an NG SETUP REQUEST message including the first capability information to the core network node.

(Supplementary Note A12)

The radio station according to any one of supplementary notes A1 to A11, wherein
the communication processing section is configured to receive second capability information indicating whether or not to support operation of the core network node for performing flight management of the manned flight vehicle capable of flying using the radio communication network from the core network node.

(Supplementary Note A13)

The radio station according to supplementary note A12, wherein
the communication processing section is configured to receive an NG SETUP RESPONSE message including the second capability information from the core network node.

(Supplementary Note A14)

A core network node including:
a communication processing section configured to receive first capability information indicating whether or not to support operation of a radio station for performing flight management of a manned flight vehicle capable of flying using a radio communication network from the radio station.

(Supplementary Note A15)

The core network node according to supplementary note A14, wherein
the communication processing section is configured to receive an NG SETUP REQUEST message including the first capability information from the radio station.

(Supplementary Note A16)

The core network node according to supplementary note A14 or A15, wherein
the communication processing section is configured to transmit second capability information indicating whether or not to support operation of the core network node for performing flight management of the manned flight vehicle capable of flying using the radio communication network to the radio station.

(Supplementary Note A17)

The core network node according to supplementary note A16, wherein
the communication processing section is configured to receive an NG SETUP RESPONSE message including the second capability information from the core network node.

(Supplementary Note A18)

A mobile terminal including:
a communication processing section configured to communicate with a radio station configured to transmit first capability information indicating whether or not to support operation of the radio station for performing flight management of a manned flight vehicle capable of flying using a radio communication network to a core network node.

(Supplementary Note A19)

A system including:
a radio station; and
a core network node, wherein
the radio station is configured to transmit first capability information indicating whether or not to support operation of the radio station for performing flight management of a manned flight vehicle capable of flying using a radio communication network to the core network node, and
the core network node is configured to receive the first capability information.

(Supplementary Note A20)

A method including:
transmitting first capability information indicating whether or not to support operation of a radio station for performing flight management of a manned flight vehicle capable of flying using a radio communication network to a core network node.

(Supplementary Note A21)

A method including:
receiving first capability information indicating whether or not to support operation of a radio station for performing flight management of a manned flight vehicle capable of flying using a radio communication network from the radio station.

(Supplementary Note A22)

A method including:
communicating with a radio station configured to transmit first capability information indicating whether or not to support operation of the radio station for performing flight management of a manned flight vehicle capable of flying using a radio communication network to a core network node.

(Supplementary Note A23)

A method including:
transmitting, by a radio station, first capability information indicating whether or not to support operation of the radio station for performing flight management of a manned flight vehicle capable of flying using a radio communication network to the core network node; and
receiving, by the core network node, the first capability information.

(Supplementary Note A24)

A program that causes a processor to execute:
transmitting first capability information indicating whether or not to support operation of a radio station for performing flight management of a manned flight vehicle capable of flying using a radio communication network to a core network node.

(Supplementary Note A25)

A program that causes a processor to execute:
receiving first capability information indicating whether or not to support operation of a radio station for performing flight management of a manned flight vehicle capable of flying using a radio communication network from the radio station.

(Supplementary Note A26)

A program that causes a processor to execute:
communicating with a radio station configured to transmit first capability information indicating whether or not to support operation of the radio station for performing flight management of a manned flight vehicle capable of flying using a radio communication network to a core network node.

(Supplementary Note A27)

A non-transitory computer readable recording medium having recorded thereon a program that causes a processor to execute:
transmitting first capability information indicating whether or not to support operation of a radio station for performing flight management of a manned flight vehicle capable of flying using a radio communication network to a core network node.

(Supplementary Note A28)

A non-transitory computer readable recording medium having recorded thereon a program that causes a processor to execute:

receiving first capability information indicating whether or not to support operation of a radio station for performing flight management of a manned flight vehicle capable of flying using a radio communication network from the radio station.

(Supplementary Note A29)

A non-transitory computer readable recording medium having recorded thereon a program that causes a processor to execute:

communicating with a radio station configured to transmit first capability information indicating whether or not to support operation of the radio station for performing flight management of a manned flight vehicle capable of flying using a radio communication network to a core network node.

<Supplementary Note B>

(Supplementary Note B1)

A radio station including:

a communication processing section configured to transmit resource information related to availability of a radio resource for at least one time period to a first core network node.

(Supplementary Note B2)

The radio station according to supplementary note B1, wherein the resource information is information related to availability of a radio resource for each time period.

(Supplementary Note B3)

The radio station according to supplementary note B1 or B2, wherein the resource information is information related to availability of a radio resource for each frequency band for at least one time period.

(Supplementary Note B4)

The radio station according to any one of supplementary notes B1 to B3, wherein the resource information is information related to availability of a radio resource for each time period and for each frequency band.

(Supplementary Note B5)

The radio station according to any one of supplementary notes B1 to B4, wherein the resource information is information indicating whether or not the radio resource is available.

(Supplementary Note B6)

The radio station according to any one of supplementary notes B1 to B5, wherein the resource information is information indicating a degree of availability of the radio resource.

(Supplementary Note B7)

The radio station according to any one of supplementary notes B1 to B6, wherein the resource information is information transmitted from the first core network node to a control apparatus configured to generate or acquire flight path information for a mobile terminal.

(Supplementary Note B8)

The radio station according to supplementary note B7, wherein the resource information is information transmitted from the first core network node to a second core network node, and transmitted from the second core network node to the control apparatus.

(Supplementary Note B9)

The radio station according to supplementary note B8, wherein the second core network node is a core network node used by an apparatus located outside of a core network including a first core network node and a second core network node to interact with the core network, and the control apparatus is located outside of the core network.

(Supplementary Note B10)

The radio station according to supplementary note B8 or B9, wherein the second core network node is a network exposure function (NEF).

(Supplementary Note B11)

The radio station according to any one of supplementary notes B1 to B10, wherein the communication processing section is configured to transmit the resource information to the first core network node in response to a request for the resource information from the first core network node.

(Supplementary Note B12)

The radio station according to any one of supplementary notes B1 to B11, wherein the communication processing section is configured to periodically transmit the resource information to the first core network node.

(Supplementary Note B13)

The radio station according to supplementary note B12, wherein the communication processing section is configured to receive period information indicating a period of transmission of the resource information from the first core network node, and transmit the resource information to the first core network node with the period indicated by the period information.

(Supplementary Note B14)

The radio station according to any one of supplementary notes B1 to B13, wherein the communication processing section is configured to receive target information indicating a target of the resource information from the first core network node, and transmit the resource information for the target indicated by the target information to the first core network node.

(Supplementary Note B15)

The radio station according to supplementary note B14, wherein the target includes one or more time periods or one or more frequency bands.

(Supplementary Note B16)

The radio station according to any one of supplementary notes B1 to B15, wherein the first core network node is a core network node configured to manage at least one of access and mobility of a mobile terminal.

(Supplementary Note B17)

The radio station according to any one of supplementary notes B1 to B16, wherein the first core network node is an access and mobility management function (AMF), and the radio station is an NG-radio access network (RAN) node.

(Supplementary Note B18)

A first core network node including:

a communication processing section configured to receive resource information related to availability of a radio resource for at least one time period from a radio station, and transmit the resource information to a second core network node.

(Supplementary Note B19)

The first core network node according to supplementary note B18, wherein
the resource information is information transmitted from the second core network node to a control apparatus configured to generate or acquire flight path information for a mobile terminal.

(Supplementary Note B20)

The first core network node according to supplementary note B18 or B19, wherein
the communication processing section is configured to indirectly transmit the resource information to the second core network node by transmitting the resource information to a third core network node configured to transmit the resource information to the second core network node.

(Supplementary Note B21)

The first core network node according to any one of supplementary notes B18 to B20, wherein
the communication processing section is configured to transmit a message for requesting the resource information to the radio station in response to a request for the resource information from the second core network node.

(Supplementary Note B22)

The first core network node according to any one of supplementary notes B18 to B20, wherein
the communication processing section is configured to receive period information indicating a period of transmission of the resource information from the second core network node, and transmit the period information to the radio station.

(Supplementary Note B23)

The first core network node according to any one of supplementary notes B18 to B22, wherein
the communication processing section is configured to receive target information indicating a target of the resource information from the second core network node, transmit the target information to the radio station, and receive the resource information for the target indicated by the target information from the radio station.

(Supplementary Note B24)

A control apparatus including:
a communication processing section configured to receive, from a second core network node, resource information related to availability of a radio resource of at least one time period, the resource information being transmitted from a radio station to a first core network node and transmitted from the first core network node to the second core network node.

(Supplementary Note B25)

The control apparatus according to supplementary note B24, wherein
the communication processing section is configured to transmit a message for requesting the resource information to the second core network node.

(Supplementary Note B26)

The control apparatus according to supplementary note B24 or B25, wherein
the communication processing section is configured to transmit period information indicating a period of transmission of the resource information to the second core network node.

(Supplementary Note B27)

The control apparatus according to any one of supplementary notes B24 to B26, wherein
the communication processing section is configured to transmit target information indicating a target of the resource information to the second core network node, and receive the resource information for the target indicated by the target information from the second core network node.

(Supplementary Note B28)

A second core network node including:
a communication processing section configured to receive, from a first core network node, resource information related to availability of a radio resource of at least one time period, the resource information being transmitted from a radio station to the first core network node, and transmit the resource information to a control apparatus configured to generate or acquire flight path information for a mobile terminal.

(Supplementary Note B29)

The second core network node according to supplementary note B28, wherein
the communication processing section is configured to indirectly receive the resource information from the first core network node by receiving the resource information from a third core network node configured to receive the resource information from the first core network node.

(Supplementary Note B30)

A mobile terminal including:
a communication processing section configured to communicate with a radio station configured to transmit resource information related to availability of a radio resource for at least one time period to a first core network node.

(Supplementary Note B31)

A system including:
a radio station;
a first core network node;
a second core network node, and
a control apparatus, wherein
the radio station is configured to transmit resource information related to availability of a radio resource for at least one time period to the first core network node,
the first core network node is configured to transmit the resource information to the second core network node, and
the second core network node is configured to transmit the resource information to the control apparatus.

(Supplementary Note B32)

A method including:
transmitting resource information related to availability of a radio resource for at least one time period to a first core network node.

(Supplementary Note B33)

A method including:
receiving resource information related to availability of a radio resource for at least one time period from a radio station, and transmitting the resource information to a second core network node.

(Supplementary Note B34)

A method including:
receiving, from a second core network node, resource information related to availability of a radio resource of at least one time period, the resource information being transmitted from a radio station to a first core network node and transmitted from the first core network node to the second core network node.

(Supplementary Note B35)

A method including:

receiving, from a first core network node, resource information related to availability of a radio resource of at least one time period, the resource information being transmitted from a radio station to the first core network node, and transmitting the resource information to a control apparatus configured to generate or acquire flight path information for a mobile terminal.

(Supplementary Note B36)

A method including:

communicating with a radio station configured to transmit resource information related to availability of a radio resource for at least one time period to a first core network node.

(Supplementary Note B37)

A method including:

transmitting, by a radio station, resource information related to availability of a radio resource for at least one time period to a first core network node;

transmitting, by the first core network node, the resource information to a second core network node; and transmitting, by the second core network node, the resource information to a control apparatus.

(Supplementary Note B38)

A program that causes a processor to execute:

transmitting resource information related to availability of a radio resource for at least one time period to a first core network node.

(Supplementary Note B39)

A program that causes a processor to execute:

receiving resource information related to availability of a radio resource for at least one time period from a radio station, and transmitting the resource information to a second core network node.

(Supplementary Note B40)

A program that causes a processor to execute:

receiving, from a second core network node, resource information related to availability of a radio resource of at least one time period, the resource information being transmitted from a radio station to a first core network node and transmitted from the first core network node to the second core network node.

(Supplementary Note B41)

A program that causes a processor to execute:

receiving, from a first core network node, resource information related to availability of a radio resource of at least one time period, the resource information being transmitted from a radio station to the first core network node, and transmitting the resource information to a control apparatus configured to generate or acquire flight path information for a mobile terminal.

(Supplementary Note B42)

A program that causes a processor to execute:

communicating with a radio station configured to transmit resource information related to availability of a radio resource for at least one time period to a first core network node.

(Supplementary Note B43)

A non-transitory computer readable recording medium having recorded thereon a program that causes a processor to execute:

transmitting resource information related to availability of a radio resource for at least one time period to a first core network node.

(Supplementary Note B44)

A non-transitory computer readable recording medium having recorded thereon a program that causes a processor to execute:

receiving resource information related to availability of a radio resource for at least one time period from a radio station, and transmitting the resource information to a second core network node.

(Supplementary Note B45)

A non-transitory computer readable recording medium having recorded thereon a program that causes a processor to execute:

receiving, from a second core network node, resource information related to availability of a radio resource of at least one time period, the resource information being transmitted from a radio station to a first core network node and transmitted from the first core network node to the second core network node.

(Supplementary Note B46)

A non-transitory computer readable recording medium having recorded thereon a program that causes a processor to execute:

receiving, from a first core network node, resource information related to availability of a radio resource of at least one time period, the resource information being transmitted from a radio station to the first core network node, and transmitting the resource information to a control apparatus configured to generate or acquire flight path information for a mobile terminal.

(Supplementary Note B47)

A non-transitory computer readable recording medium having recorded thereon a program that causes a processor to execute:

communicating with a radio station configured to transmit resource information related to availability of a radio resource for at least one time period to a first core network node.

<Supplementary Note C>

(Supplementary Note C1)

A control apparatus including:

a communication processing section configured to transmit a first request message requesting allocation of a radio resource for a mobile terminal configured to move according to flight path information to a core network connected to a radio station configured to allocate the radio resource.

(Supplementary Note C2)

The control apparatus according to supplementary note C1, wherein the first request message includes first identification information for identifying the mobile terminal.

(Supplementary Note C3)

The control apparatus according to supplementary note C1 or C2, wherein the allocation is allocation of a radio resource for flight of the mobile terminal, and the first request message includes second identification information for identifying the flight.

(Supplementary Note C4)

The control apparatus according to any one of supplementary notes C1 to C3, wherein the radio resource is a radio resource in a specific frequency band, and the first request message includes frequency information indicating the specific frequency band.

(Supplementary Note C5)
The control apparatus according to any one of supplementary notes C1 to C4, wherein
the radio resource is a radio resource in a specific time period, and
the first request message includes time period information indicating the specific time period.

(Supplementary Note C6)
The control apparatus according to any one of supplementary notes C1 to C5, wherein
the first request message includes location information indicating a location, and the radio station is associated to the location information.

(Supplementary Note C7)
The control apparatus according to supplementary note C6, wherein
the location information is a cell identifier, Global Positioning System (GPS) information, or information indicating a waypoint of flight of the mobile terminal.

(Supplementary Note C8)
The control apparatus according to any one of supplementary notes C1 to C7, wherein
the core network includes a first core network node configured to transmit a second request message requesting the allocation to the radio station in response to reception of the first request message in the core network.

(Supplementary Note C9)
The control apparatus according to supplementary note C8, wherein
the core network further includes a second core network node configured to transmit, in response to reception of the first request message, a third request message requesting the allocation to the first core network node or to a third core network node configured to transmit a further request message to the first core network node.

(Supplementary Note C10)
The control apparatus according to supplementary note C9, wherein
the second core network node is a core network node used by an apparatus located outside of the core network to interact with the core network, and the control apparatus is located outside of the core network.

(Supplementary Note C11)
The control apparatus according to supplementary note C9 or C10, wherein
the second core network node is a network exposure function (NEF).

(Supplementary Note C12)
The control apparatus according to any one of supplementary notes C8 to C11, wherein
the first core network node is a core network node configured to manage at least one of access and mobility of the mobile terminal.

(Supplementary Note C13)
The control apparatus according to any one of supplementary notes C8 to C12, wherein
the first core network node is an access and mobility management function (AMF), and
the radio station is an NG-radio access network (RAN) node.

(Supplementary Note C14)
The control apparatus according to any one of supplementary notes C1 to C13, wherein
the control apparatus is configured to receive a response message for the allocation from the core network.

(Supplementary Note C15)
The control apparatus according to supplementary note C14, wherein
the response message includes information indicating whether or not the radio resource is allocated, or information indicating an allocated radio resource.

(Supplementary Note C16)
A first core network node included in a core network, the first core network node including:
a communication processing section configured to transmit a second request message requesting allocation of a radio resource for a mobile terminal configured to move according to flight path information to a radio station configured to allocate the radio resource.

(Supplementary Note C17)
The first core network node according to supplementary note C16, wherein
the second request message includes first identification information for identifying the mobile terminal.

(Supplementary Note C18)
The first core network node according to supplementary note C16 or C17, wherein
the allocation is allocation of a radio resource for flight of the mobile terminal, and
the second request message includes second identification information for identifying the flight.

(Supplementary Note C19)
The first core network node according to any one of supplementary notes C16 to C18, wherein
the radio resource is a radio resource in a specific frequency band, and
the second request message includes frequency information indicating the specific frequency band.

(Supplementary Note C20)
The first core network node according to any one of supplementary notes C16 to C19, wherein
the radio resource is a radio resource in a specific time period, and
the second request message includes time period information indicating the specific time period.

(Supplementary Note C21)
The first core network node according to any one of supplementary notes C16 to C20, wherein
the communication processing section is configured to transmit the second request message to the radio station in response to reception of a first request message requesting the allocation in the core network.

(Supplementary Note C22)
The first core network node according to any one of supplementary notes C16 to C21, wherein
the communication processing section is configured to receive a response message for the allocation of the radio resource from the radio station.

(Supplementary Note C23)
A radio station including:
a communication processing section configured to receive a request message requesting allocation of a radio resource for a mobile terminal configured to move according to flight path information from a first core network node; and
a control section configured to perform the allocation in response to reception of the request message.

(Supplementary Note C24)
The radio station according to supplementary note C23, wherein
the communication processing section is configured to transmit a response message for the allocation to the first core network node.

(Supplementary Note C25)
A second core network node including:
a communication processing section configured to receive a first request message requesting allocation of a radio resource for a mobile terminal configured to move according to flight path information from a control apparatus, wherein
the communication processing section is configured to transmit, in response to reception of the first request message, a third request message requesting the allocation to a first core network node configured to transmit a second request message requesting the allocation to a radio station or to a third core network node configured to transmit a further request message to the first core network node.

(Supplementary Note C26)
A mobile terminal including:
a flight control section configured to control movement of the mobile terminal according to flight path information; and
a communication processing section configured to communicate with a radio station configured to receive a request message requesting allocation of a radio resource for the mobile terminal from a first core network node and perform the allocation in response to reception of the request message.

(Supplementary Note C27)
A system including:
a control apparatus;
a core network including a first core network node and a second core network node; and
a radio station, wherein
the control apparatus is configured to transmit a first request message requesting allocation of a radio resource for a mobile terminal configured to move according to flight path information to the second core network node,
the second core network node is configured to receive the first request message from the control apparatus, and transmit, in response to reception of the first request message, a third request message requesting the allocation to the first core network node or to a third core network node configured to transmit a further request message to the first core network node,
the first core network node is configured to transmit a second request message requesting the allocation to the radio station, and
the radio station is configured to receive the second request message from the first core network node, and perform the allocation in response to reception of the second request message.

(Supplementary Note C28)
A method including:
transmitting a first request message requesting allocation of a radio resource for a mobile terminal configured to move according to flight path information to a core network connected to a radio station configured to allocate the radio resource.

(Supplementary Note C29)
A method including:
transmitting a second request message requesting allocation of a radio resource for a mobile terminal configured to move according to flight path information to a radio station configured to allocate the radio resource.

(Supplementary Note C30)
A method including:
receiving a request message requesting allocation of a radio resource for a mobile terminal configured to move according to flight path information from a first core network node; and
performing the allocation in response to reception of the request message.

(Supplementary Note C31)
A method including:
receiving a first request message requesting allocation of a radio resource for a mobile terminal configured to move according to flight path information from a control apparatus; and
transmitting, in response to reception of the first request message, a third request message requesting the allocation to a first core network node configured to transmit a second request message requesting the allocation to a radio station or to a third core network node configured to transmit a further request message to the first core network node.

(Supplementary Note C32)
A method including:
controlling movement of a mobile terminal according to flight path information; and
communicating with a radio station configured to receive a request message requesting allocation of a radio resource for the mobile terminal from a first core network node and perform the allocation in response to reception of the request message.

(Supplementary Note C33)
A method including:
transmitting, by a control apparatus, a first request message requesting allocation of a radio resource for a mobile terminal configured to move according to flight path information to a second core network node;
receiving, by the second core network node, the first request message from the control apparatus, and transmitting, by the second core network node, in response to reception of the first request message, a third request message requesting the allocation to a first core network node or to a third core network node configured to transmit a further request message to the first core network node;
transmitting, by the first core network node, a second request message requesting the allocation to a radio station; and
receiving, by the radio station, the second request message from the first core network node and performing the allocation in response to reception of the second request message.

(Supplementary Note C34)
A program that causes a processor to execute:
transmitting a first request message requesting allocation of a radio resource for a mobile terminal configured to move according to flight path information to a core network connected to a radio station configured to allocate the radio resource.

(Supplementary Note C35)
A program that causes a processor to execute:
transmitting a second request message requesting allocation of a radio resource for a mobile terminal configured to move according to flight path information to a radio station configured to allocate the radio resource.

(Supplementary Note C36)
A program that causes a processor to execute:
receiving a request message requesting allocation of a radio resource for a mobile terminal configured to move according to flight path information from a first core network node; and
performing the allocation in response to reception of the request message.

(Supplementary Note C37)
A program that causes a processor to execute:
receiving a first request message requesting allocation of a radio resource for a mobile terminal configured to move according to flight path information from a control apparatus; and
transmitting, in response to reception of the first request message, a third request message requesting the allocation to a first core network node configured to transmit a second request message requesting the allocation to a radio station or to a third core network node configured to transmit a further request message to the first core network node.

(Supplementary Note C38)
A program that causes a processor to execute:
controlling movement of a mobile terminal according to flight path information; and
communicating with a radio station configured to receive a request message requesting allocation of a radio resource for the mobile terminal from a first core network node and perform the allocation in response to reception of the request message.

(Supplementary Note C39)
A non-transitory computer readable recording medium having recorded thereon a program that causes a processor to execute:
transmitting a first request message requesting allocation of a radio resource for a mobile terminal configured to move according to flight path information to a core network connected to a radio station configured to allocate the radio resource.

(Supplementary Note C40)
A non-transitory computer readable recording medium having recorded thereon a program that causes a processor to execute:
transmitting a second request message requesting allocation of a radio resource for a mobile terminal configured to move according to flight path information to a radio station configured to allocate the radio resource.

(Supplementary Note C41)
A non-transitory computer readable recording medium having recorded thereon a program that causes a processor to execute:
receiving a request message requesting allocation of a radio resource for a mobile terminal configured to move according to flight path information from a first core network node; and
performing the allocation in response to reception of the request message.

(Supplementary Note C42)
A non-transitory computer readable recording medium having recorded thereon a program that causes a processor to execute:
receiving a first request message requesting allocation of a radio resource for a mobile terminal configured to move according to flight path information from a control apparatus; and
transmitting, in response to reception of the first request message, a third request message requesting the allocation to a first core network node configured to transmit a second request message requesting the allocation to a radio station or to a third core network node configured to transmit a further request message to the first core network node.

(Supplementary Note C43)
A non-transitory computer readable recording medium having recorded thereon a program that causes a processor to execute:
controlling movement of a mobile terminal according to flight path information; and
communicating with a radio station configured to receive a request message requesting allocation of a radio resource for the mobile terminal from a first core network node and perform the allocation in response to reception of the request message.

<Supplementary Note D>
(Supplementary Note D1)
A control apparatus including:
a communication processing section configured to transmit a first request message requesting paging of a mobile terminal to a core network for flight of the mobile terminal in which a radio resource is allocated.

(Supplementary Note D2)
The control apparatus according to supplementary note D1, wherein
the first request message includes first identification information for identifying the mobile terminal.

(Supplementary Note D3)
The control apparatus according to supplementary note D2, wherein
the first request message includes second identification information for identifying the flight.

(Supplementary Note D4)
The control apparatus according to any one of supplementary notes D1 to D3, wherein
the first request message includes flight related information related to the flight.

(Supplementary Note D5)
The control apparatus according to supplementary note D4, wherein
the flight related information includes first identification information for identifying the mobile terminal or second identification information for identifying the flight.

(Supplementary Note D6)
The control apparatus according to supplementary note D4 or D5, wherein
the flight related information includes path information indicating a path of the flight.

(Supplementary Note D7)
The control apparatus according to supplementary note D6, wherein
the path information indicates, as the path of the flight, one or more cells on the path of the flight, the one or more cells being used by the mobile terminal in the flight.

(Supplementary Note D8)
The control apparatus according to supplementary note D6 or D7, wherein
the path information indicates a waypoint of the flight as the path of the flight.

(Supplementary Note D9)
The control apparatus according to any one of supplementary notes D4 to D8, wherein
the flight related information includes time information indicating time for the flight.

(Supplementary Note D10)

The control apparatus according to supplementary note D9, wherein the time information indicates a time period in which the radio resource is allocated for the mobile terminal for one or more cells on the path of the flight, each of the one or more cells being used by the mobile terminal in the flight.

(Supplementary Note D11)

The control apparatus according to supplementary note D9 or D10, wherein the time information indicates time at which the mobile terminal passes through for each of a plurality of waypoints of the flight.

(Supplementary Note D12)

The control apparatus according to any one of supplementary notes D4 to D11, wherein the flight related information includes configuration information indicating a configuration for the mobile terminal for one or more cells on the path of the flight, each of the one or more cells being used by the mobile terminal in the flight.

(Supplementary Note D13)

The control apparatus according to any one of supplementary notes D4 to D12, wherein the flight related information includes attribute information of a session for communication in the flight.

(Supplementary Note D14)

The control apparatus according to any one of supplementary notes D4 to D13, wherein the flight related information includes radio resource information indicating the radio resource for communication in the flight.

(Supplementary Note D15)

The control apparatus according to any one of supplementary notes D1 to D14, wherein the core network includes a first core network node configured to perform the paging via a radio station in response to reception of the first request message in the core network.

(Supplementary Note D16)

The control apparatus according to supplementary note D15, wherein the core network further includes a second core network node configured to transmit, in response to reception of the first request message, a second request message requesting the paging to the first core network node or to a third core network node configured to transmit a further request message to the first core network node.

(Supplementary Note D17)

The control apparatus according to supplementary note D16, wherein the second core network node is a core network node used by an apparatus located outside of the core network to interact with the core network, and the control apparatus is located outside of the core network.

(Supplementary Note D18)

The control apparatus according to supplementary note D16 or D17, wherein the second core network node is a network exposure function (NEF).

(Supplementary Note D19)

The control apparatus according to any one of supplementary notes D15 to D18, wherein the first core network node is a core network node configured to manage at least one of access and mobility of the mobile terminal.

(Supplementary Note D20)

The control apparatus according to any one of supplementary notes D15 to D19, wherein the first core network node is an access and mobility management function (AMF), and the radio station is an NG-radio access network (RAN) node.

(Supplementary Note D21)

A first core network node included in a core network, the first core network node including:

a control section configured to perform paging of a mobile terminal via a radio station in response to reception by the core network of a first request message transmitted by a control apparatus for flight of the mobile terminal in which a radio resource is allocated, the first request message requesting the paging of the mobile terminal.

(Supplementary Note D22)

A second core network node including:

a communication processing section configured to receive a first request message transmitted by a control apparatus for flight of a mobile terminal in which a radio resource is allocated, and the first request message requesting paging of the mobile terminal, wherein the communication processing section is configured to transmit, in response to reception of the first request message, a second request message requesting the paging to a first core network node configured to perform the paging, or to a third core network node configured to transmit a further request message to the first core network node.

(Supplementary Note D23)

A mobile terminal including:

a communication processing section configured to transmit to a first core network node a message for requesting start of communication for flight of the mobile terminal in which a radio resource is allocated.

(Supplementary Note D24)

A system including:

a control apparatus;

a core network including a first core network node and a second core network node; and a radio station, wherein the control apparatus is configured to transmit to the second core network node a first request message requesting paging of a mobile terminal for flight of the mobile terminal in which a radio resource is allocated, the second core network node is configured to receive the first request message, and transmit, in response to reception of the first request message, a second request message requesting the paging to a first core network node configured to perform the paging or to a third core network node configured to transmit a further request message to the first core network node, and the first core network node is configured to perform the paging via the radio station.

(Supplementary Note D25)

A method including:

transmitting a first request message requesting paging of a mobile terminal to a core network for flight of the mobile terminal in which a radio resource is allocated.

(Supplementary Note D26)

A method including:

performing paging of a mobile terminal via a radio station in response to reception by a core network of a first request message transmitted by a control apparatus for flight of the mobile terminal in which a radio resource is allocated, the first request message requesting the paging of the mobile terminal.

(Supplementary Note D27)

A method including:

receiving a first request message transmitted by a control apparatus for flight of a mobile terminal in which a radio resource is allocated, and the first request message requesting paging of the mobile terminal; and transmitting, in response to reception of the first request message, a second request message requesting the paging to a first core network node configured to perform the paging, or to a third core network node configured to transmit a further request message to the first core network node.

(Supplementary Note D28)

A method including:

transmitting a message for requesting start of communication for flight of a mobile terminal in which a radio resource is allocated to a first core network node.

(Supplementary Note D29)

A method including:

transmitting, by a control apparatus, a first request message requesting paging of a mobile terminal to a second core network node for flight of the mobile terminal in which a radio resource is allocated;

receiving, by the second core network node, the first request message, and transmitting, by the second core network node, in response to reception of the first request message, a second request message requesting the paging to a first core network node configured to perform the paging, or to a third core network node configured to transmit a further request message to the first core network node; and performing the paging via a radio station by the first core network node.

(Supplementary Note D30)

A program that causes a processor to execute:

transmitting a first request message requesting paging of a mobile terminal to a core network for flight of the mobile terminal in which a radio resource is allocated.

(Supplementary Note D31)

A program that causes a processor to execute:

performing paging of a mobile terminal via a radio station in response to reception by a core network of a first request message transmitted by a control apparatus for flight of the mobile terminal in which a radio resource is allocated, the first request message requesting the paging of the mobile terminal.

(Supplementary Note D32)

A program that causes a processor to execute:

receiving a first request message transmitted by a control apparatus for flight of a mobile terminal in which a radio resource is allocated, and the first request message requesting paging of the mobile terminal; and transmitting, in response to reception of the first request message, a second request message requesting the paging to a first core network node configured to perform the paging, or to a third core network node configured to transmit a further request message to the first core network node.

(Supplementary Note D33)

A program that causes a processor to execute:

transmitting a message for requesting start of communication for flight of a mobile terminal in which a radio resource is allocated to a first core network node.

(Supplementary Note D34)

A non-transitory computer readable recording medium having recorded thereon a program that causes a processor to execute:

transmitting a first request message requesting paging of a mobile terminal to a core network for flight of the mobile terminal in which a radio resource is allocated.

(Supplementary Note D35)

A non-transitory computer readable recording medium having recorded thereon a program that causes a processor to execute:

performing paging of a mobile terminal via a radio station in response to reception by a core network of a first request message transmitted by a control apparatus for flight of the mobile terminal in which a radio resource is allocated, the first request message requesting the paging of the mobile terminal.

(Supplementary Note D36)

A non-transitory computer readable recording medium recording a program that causes a processor to execute:

receiving a first request message transmitted by a control apparatus for flight of a mobile terminal in which a radio resource is allocated, and the first request message requesting paging of the mobile terminal; and transmitting, in response to reception of the first request message, a second request message requesting the paging to a first core network node configured to perform the paging, or to a third core network node configured to transmit a further request message to the first core network node.

(Supplementary Note D37)

A non-transitory computer readable recording medium having recorded thereon a program that causes a processor to execute:

transmitting a message for requesting start of communication for flight of a mobile terminal in which a radio resource is allocated to a first core network node.

<Supplementary Note E>

(Supplementary Note E1)

A first radio station including:

a control section configured to, in a handover of a mobile terminal configured to move according to flight path information, control the handover according to the flight path information from a second radio station to the first radio station; and a communication processing section configured to trigger processing of transmitting a message including information related to acceptance of the handover to the second radio station without receiving a request message for the handover transmitted from the second radio station.

(Supplementary Note E2)

The first radio station according to supplementary note E1, wherein the communication processing section is configured to trigger the processing of transmitting the message to the second radio station by transmitting the message directly to the second radio station, by transmitting the message to the second radio station via a core network node, or by transmitting at least one of the message and another message including information related to acceptance of the handover to the core network node configured to transmit the message to the second radio station.

(Supplementary Note E3)
The first radio station according to supplementary note E1 or E2, wherein
the communication processing section is configured not to receive the request message before transmitting the message to the second radio station, and configured to receive the request message when transmitting the message to the second radio station.

(Supplementary Note E4)
The first radio station according to supplementary note E1 or E2, wherein
the communication processing section is configured not to receive the request message not only before transmitting the message to the second radio station but also after transmitting the message to the second radio station.

(Supplementary Note E5)
The first radio station according to supplementary note E4, wherein
the message triggers execution of the handover by the second radio station and
the mobile terminal.

(Supplementary Note E6)
The first radio station according to supplementary note E4 or E5, wherein
the message triggers transmission of a message for execution of the handover by the second radio station to the mobile terminal.

(Supplementary Note E7)
The first radio station according to any one of supplementary notes E1 to E6, wherein
the communication processing section is configured to receive a request message for the handover transmitted from a core network node, and transmit the message to the second radio station in response to reception of the request message transmitted from the core network node, and
the request message transmitted from the core network node is a message generated by the core network node without being transmitted from the second radio station to the core network node.

(Supplementary Note E8)
The first radio station according to any one of supplementary notes E1 to E7, wherein
the control section is configured to allocate a radio resource for the mobile terminal in the first radio station, and
the information related to acceptance of the handover includes information indicating that the radio resource for the mobile terminal is allocated.

(Supplementary Note E9)
The first radio station according to supplementary note E8, wherein
the control section is configured to allocate the radio resource, based on flight related information related to flight of the mobile terminal.

(Supplementary Note E10)
The first radio station according to any one of supplementary notes E1 to E7, wherein
the information related to acceptance of the handover includes information indicating that a radio resource for the mobile terminal in the first radio station is not allocated.

(Supplementary Note E11)
The first radio station according to any one of supplementary notes E8 to E10, wherein
the control section is configured to determine whether or not the radio resource is allocated, based on flight related information related to flight of the mobile terminal.

(Supplementary Note E12)
The first radio station according to supplementary note E9 or E11, wherein
the flight related information includes path information indicating a path of the flight or time information indicating time of the flight.

(Supplementary Note E13)
The first radio station according to any one of supplementary notes E8 to E12, wherein
the radio resource is a resource of at least one of time and frequency.

(Supplementary Note E14)
The first radio station according to any one of supplementary notes E8 to E12, wherein
the radio resource includes a resource of at least one of time and frequency, and a resource for processing of the first radio station.

(Supplementary Note E15)
The first radio station according to any one of supplementary notes E1 to E14, wherein
the information related to acceptance of the handover includes information related to a target cell of the handover.

(Supplementary Note E16)
The first radio station according to supplementary note E15, wherein
the information related to the target cell includes identification information for identifying the target cell, information indicating a frequency band of the target cell, or information indicating a configuration for the mobile terminal 600 in the target cell.

(Supplementary Note E17)
The first radio station according to any one of supplementary notes E1 to E16, wherein
the handover is a conditional handover (CHO).

(Supplementary Note E18)
The first radio station according to supplementary note E17, wherein
the information related to acceptance of the handover includes condition information related to a condition of the handover.

(Supplementary Note E19)
The first radio station according to any one of supplementary notes E1 to E18, wherein
the control section is configured to determine whether or not a radio resource for the mobile terminal in the first radio station is allocated, and
the communication processing section is configured to, when the radio resource is not allocated, cause the second radio station to notify of a change of a flight path of the mobile terminal.

(Supplementary Note E20)
The first radio station according to supplementary note E19, wherein
the change of the flight path is a change of the flight path of the mobile terminal in a coverage area of the first radio station.

(Supplementary Note E21)
The first radio station according to supplementary note E19 or E20, wherein
the change of the flight path is a change of a cell in which the mobile terminal uses a radio resource.

(Supplementary Note E22)

The first radio station according to supplementary note E19 or E20, wherein
- the change of the flight path is a change of a waypoint of the mobile terminal.

(Supplementary Note E23)

The first radio station according to any one of supplementary notes E1 to E22, wherein
- the control section is configured to determine whether or not a radio resource for the mobile terminal in the first radio station is allocated, and
- the communication processing section is configured to, when the radio resource is not allocated, notify the second radio station or a core network node of landing of the mobile terminal.

(Supplementary Note E24)

The first radio station according to supplementary note E23, wherein
- the communication processing section is configured to instruct or request the second radio station or the core network node to perform the landing of the mobile terminal as the notification of the landing of the mobile terminal.

(Supplementary Note E25)

The first radio station according to supplementary note E23, wherein
- the communication processing section is configured to transmit assistance information used to determine whether or not to let the mobile terminal perform landing to the second radio station or the core network node as the notification of the landing of the mobile terminal.

(Supplementary Note E26)

The first radio station according to any one of supplementary notes E23 to E25, wherein
- the landing is landing of the mobile terminal at a landing point, and
- the landing point is a landing point indicated by the flight path information, a landing point determined by the second radio station, or a landing point determined by the mobile terminal.

(Supplementary Note E27)

A second radio station including:
- a control section configured to, in a handover of a mobile terminal configured to move according to flight path information, control the handover according to the flight path information from the second radio station to a first radio station; and
- a first communication processing section configured to receive a message including information related to acceptance of the handover without transmitting a request message for the handover.

(Supplementary Note E28)

The second radio station according to supplementary note E27, wherein
- the first communication processing section is configured to receive the message
  - from the first radio station, or
  - from a core network node configured to receive the message from the first radio station or receive, from the first radio station, another message for triggering transmission of the message to the second radio station.

(Supplementary Note E29)

The second radio station according to supplementary note E27 or E28, wherein
- the first communication processing section is configured not to transmit the request message before receiving the message, and configured to transmit the request message after receiving the message.

(Supplementary Note E30)

The second radio station according to supplementary note E27 or E28, wherein
- the first communication processing section is configured not to transmit the request message not only before receiving the message but also after receiving the message.

(Supplementary Note E31)

The second radio station according to any one of supplementary notes E27, E28, and E30, further including
- a second communication processing section configured to transmit a message for execution of the handover to the mobile terminal in response to reception of the message.

(Supplementary Note E32)

The second radio station according to any one of supplementary notes E27 to E31, wherein
- the handover is a conditional handover (CHO), and
- the second radio station further includes a second communication processing section configured to transmit, to the mobile terminal, a message for execution of the handover, the message including information related to a condition of the handover.

(Supplementary Note E33)

The second radio station according to any one of supplementary notes E27 to E32, further including
- a second communication processing section configured to notify the mobile terminal of landing of the mobile terminal, in response to a notification of landing of the mobile terminal when a radio resource for the mobile terminal in the first radio station is not allocated.

(Supplementary Note E34)

The second radio station according to supplementary note E33, wherein
- the second communication processing section is configured to instruct or request the mobile terminal to perform the landing of the mobile terminal as the notification of the landing of the mobile terminal.

(Supplementary Note E35)

A core network node including:
- a control section configured to, in a handover of a mobile terminal configured to move according to flight path information, generate a request message for the handover according to the flight path information from a second radio station to a first radio station; and
- a communication processing section configured to transmit the request message to the first radio station without receiving the request message from the second radio station, wherein
- the request message triggers transmission of a message including information related to acceptance of the handover by the first radio station to the second radio station without receiving a request message for the handover transmitted from the second radio station.

(Supplementary Note E36)

The core network node according to supplementary note E35, wherein
- the communication processing section is configured to notify the mobile terminal of the landing of the mobile terminal via a second radio station or notify the second radio station of the landing of the mobile terminal, in response to a notification of the landing of the mobile terminal by the first radio station when the radio resource for the mobile terminal in the first radio station is not allocated.

(Supplementary Note E37)

A mobile terminal including:

a flight control section configured to control movement of the mobile terminal according to flight path information; and a communication processing section configured to, in a handover of the mobile terminal from a second cell of a second radio station to a first cell of a first radio station, communicate with the second radio station configured to receive a message including information related to acceptance of the handover without transmitting a request message for the handover, for the handover according to the flight path information.

(Supplementary Note E38)

The mobile terminal according to supplementary note E37, wherein the flight control section is configured to control landing of the mobile terminal in response to a notification of the landing of the mobile terminal when a radio resource for the mobile terminal in the first radio station is not allocated.

(Supplementary Note E39)

A system including:

a first radio station; and a second radio station, wherein the first radio station and the second radio station are configured to control, in a handover of a mobile terminal configured to move according to flight path information, the handover according to the flight path information from the second radio station to the first radio station, the first radio station is configured to transmit a message including information related to acceptance of the handover to the second radio station without receiving a request message for the handover transmitted from the second radio station, and the second radio station is configured to receive the message without transmitting the request message.

(Supplementary Note E40)

A method including:

controlling, in a handover of a mobile terminal configured to move according to flight path information, the handover according to the flight path information from a second radio station to a first radio station; and transmitting a message including information related to acceptance of the handover to the second radio station without receiving a request message for the handover transmitted from the second radio station.

(Supplementary Note E41)

A method including:

controlling, in a handover of a mobile terminal configured to move according to flight path information, the handover according to the flight path information from a second radio station to a first radio station; and receiving a message including information related to acceptance of the handover without transmitting a request message for the handover.

(Supplementary Note E42)

A method including:

in a handover of a mobile terminal configured to move according to flight path information, generating a request message for the handover according to the flight path information from a second radio station to a first radio station; and transmitting the request message to the first radio station without receiving the request message from the second radio station, wherein the request message triggers transmission of a message including information related to acceptance of the handover by the first radio station to the second radio station without receiving a request message for the handover transmitted from the second radio station.

(Supplementary Note E43)

A method including:

controlling movement of a mobile terminal according to flight path information; and in a handover of the mobile terminal from a second cell of a second radio station to a first cell of a first radio station, communicating with the second radio station configured to receive a message including information related to acceptance of the handover without transmitting a request message for the handover, for the handover according to the flight path information.

(Supplementary Note E44)

A method including:

controlling, by the first radio station and the second radio station, in a handover of a mobile terminal configured to move according to flight path information, the handover according to the flight path information from the second radio station to the first radio station;

transmitting, by the first radio station, a message including information related to acceptance of the handover to the second radio station without receiving a request message for the handover transmitted from the second radio station; and receiving, by the second radio station, the message without transmitting the request message.

(Supplementary Note E45)

A program that causes a processor to execute:

controlling, in a handover of a mobile terminal configured to move according to flight path information, the handover according to the flight path information from a second radio station to a first radio station; and transmitting a message including information related to acceptance of the handover to the second radio station without receiving a request message for the handover transmitted from the second radio station.

(Supplementary Note E46)

A program that causes a processor to execute:

controlling, in a handover of a mobile terminal configured to move according to flight path information, the handover according to the flight path information from a second radio station to a first radio station; and receiving a message including information related to acceptance of the handover without transmitting a request message for the handover.

(Supplementary Note E47)

A program that causes a processor to execute:

in a handover of a mobile terminal configured to move according to flight path information, generating a request message for the handover according to the flight path information from a second radio station to a first radio station; and transmitting the request message to the first radio station without receiving the request message from the second radio station, wherein the request message triggers transmission of a message including information related to acceptance of the handover by the first radio station to the second radio station without receiving a request message for the handover transmitted from the second radio station.

(Supplementary Note E48)

A program that causes a processor to execute:
controlling movement of a mobile terminal according to flight path information; and
in a handover of the mobile terminal from a second cell of a second radio station to a first cell of a first radio station, communicating with the second radio station configured to receive a message including information related to acceptance of the handover without transmitting a request message for the handover, for the handover according to the flight path information.

(Supplementary Note E49)

A non-transitory computer readable recording medium having recorded thereon a program that causes a processor to execute:
controlling, in a handover of a mobile terminal configured to move according to flight path information, the handover according to the flight path information from a second radio station to a first radio station; and
transmitting a message including information related to acceptance of the handover to the second radio station without receiving a request message for the handover transmitted from the second radio station.

(Supplementary Note E50)

A non-transitory computer readable recording medium having recorded thereon a program that causes a processor to execute:
controlling, in a handover of a mobile terminal configured to move according to flight path information, the handover according to the flight path information from a second radio station to a first radio station; and
receiving a message including information related to acceptance of the handover without transmitting a request message for the handover.

(Supplementary Note E51)

A non-transitory computer readable recording medium having recorded thereon a program that causes a processor to execute:
in a handover of a mobile terminal configured to move according to flight path information, generating a request message for the handover according to the flight path information from a second radio station to a first radio station; and
transmitting the request message to the first radio station without receiving the request message from the second radio station, wherein
the request message triggers transmission of a message including information related to acceptance of the handover by the first radio station to the second radio station without receiving a request message for the handover transmitted from the second radio station.

(Supplementary Note E52)

A non-transitory computer readable recording medium having recorded thereon a program that causes a processor to execute:
controlling movement of a mobile terminal according to flight path information; and
in a handover of the mobile terminal from a second cell of a second radio station to a first cell of a first radio station, communicating with the second radio station configured to receive a message including information related to acceptance of the handover without transmitting a request message for the handover, for the handover according to the flight path information.

This application claims priority based on JP 2019-163369 filed on Sep. 6, 2019, the entire disclosure of which is incorporated herein.

INDUSTRIAL APPLICABILITY

Continuous communication with a flying mobile terminal can be facilitated.

REFERENCE SIGNS LIST

1 System
40 Flight Path
50 Cell
100, 160, 170, 180 Control Apparatus
200, 260, 270, 280 First Core Network (CN) Node
250, 290 Core Network (CN) Node
300, 360, 370, 380 Second Core Network (CN) Node
400 Third Core Network (CN) Node
500, 550, 560, 570, 590 Radio Station
500A, 590A First Radio Station
500B, 590B Second Radio Station
600, 650, 660, 670, 680, 690 Mobile Terminal

What is claimed is:

1. A method for a network device comprising:
receiving, from a user equipment (UE) as an uncrewed aerial vehicle (UAV), a request for flight planning;
sending, to a Network Exposure Function (NEF), a request message including first information, wherein the first information indicates points for a flight;
receiving, from the NEF, a response message including second information, wherein the second information indicates a flight path based on the first information; and
sending, to the UE, a response indicating the flight path.

2. The method according to claim 1, wherein
the response includes information indicating a list of cells used in the flight of the UE.

3. The method according to claim 2, wherein
the UE performs handover to a first base station from a second base station based on the response, the first base station triggering processing of transmitting a message including information related to acceptance of the handover to the second base station without receiving a request message for the handover transmitted from the second base station.

4. The method according to claim 1, wherein
the network device communicates with the UE via application layer.

5. The method according to claim 1, wherein
the request message includes information related to time and flight path.

6. The method according to claim 1, wherein
the first information indicates waypoints of the flight.

7. The method according to claim 1, wherein
the first information indicates an identifier of the UE.

8. The method according to claim 1, wherein
the second information includes QoS information.

9. The method according to claim 1, wherein
the QoS information is obtained, from a network node, in response to a request indicating the identifier of the UE and the points for the flight.

10. A network device comprising:
a memory; and
at least one processor configured to access the memory and configured to:

receive, from a user equipment (UE) as an uncrewed aerial vehicle (UAV), a request for flight planning;

send, to a Network Exposure Function (NEF), a request message including an identifier of the UE and first information, wherein the first information indicates points for a flight;

receive, from the NEF, a response message including second information, wherein the second information indicates a flight path based on the first information; and send, to the UE, a flight message indicating the planned flight path.

11. A method for a user equipment (UE) as an uncrewed aerial vehicle (UAV) comprising:

sending, to a network device, a request for flight planning, wherein the network device sends, to a Network Exposure Function (NEF), a request message including first information, wherein the first information indicates points for a flight; and receiving, from the network device, a response including second information, wherein the second information indicates a flight path, wherein the flight path is planned by the network device based on the first information and is related to flight assistance information provided by the NEF.

12. A user equipment (UE) as an uncrewed aerial vehicle (UAV) comprising:

a memory; and at least one processor configured to access the memory and configured to:

send, to a network device, a request for a flight planning, wherein the network device sends, to a Network Exposure Function (NEF), a request message including first information, wherein the first information indicates points for a flight; and receive, from the network device, a response including second information, wherein the second information indicates a flight path, wherein the flight path is planned by the network device based on the first information and is related to a flight assistance information provided by the core network node.

* * * * *